United States Patent
Tosato et al.

(10) Patent No.: US 12,486,270 B2
(45) Date of Patent: Dec. 2, 2025

(54) RECEPTOR TYROSINE KINASE INHIBITORS FOR TREATMENT OF PROTEIN KINASE MODULATION-RESPONSIVE DISEASE OR DISORDER

(71) Applicants: THE UNITED STATES OF AMERICA, as represented by the Secretary, Department of Health and Human Services, Bethesda, MD (US); Johann Wolfgang Goethe-Universität, Frankfurt am Main (DE); Deutsches Krebsforschungszentrum, Heidelberg (DE)

(72) Inventors: Giovanna Tosato, Bethesda, MD (US); Michael J. DiPrima, Silver Spring, MD (US); Harald Schwalbe, Frankfurt (DE); Alix Tröster, Frankfurt (DE); Denis Kudlinzki, Heidelberg (DE); Nathalie Jores, Frankfurt (DE)

(73) Assignee: THE UNITED STATES OF AMERICA, as represented by the Secretary, Department of Health and Human Services, Bethesda, MD (US)

( * ) Notice: Subject to any disclaimer, the term of this patent is extended or adjusted under 35 U.S.C. 154(b) by 903 days.

(21) Appl. No.: 17/692,978

(22) Filed: Mar. 11, 2022

(65) Prior Publication Data
US 2022/0194943 A1  Jun. 23, 2022

Related U.S. Application Data

(63) Continuation-in-part of application No. PCT/US2020/050439, filed on Sep. 11, 2020.

(60) Provisional application No. 63/070,739, filed on Aug. 26, 2020, provisional application No. 62/900,240, filed on Sep. 13, 2019.

(51) Int. Cl.
| | | |
|---|---|---|
| *C07D 473/34* | (2006.01) | |
| *C07D 401/14* | (2006.01) | |
| *C07D 403/14* | (2006.01) | |
| *C07D 413/14* | (2006.01) | |

(52) U.S. Cl.
CPC ......... *C07D 473/34* (2013.01); *C07D 401/14* (2013.01); *C07D 403/14* (2013.01); *C07D 413/14* (2013.01)

(58) Field of Classification Search
CPC .. C07D 473/34; C07D 401/14; C07D 403/14; C07D 413/14; C07D 251/54; C07D 413/04; C07D 471/04; C07D 487/04; A61K 45/06; A61P 35/00
See application file for complete search history.

(56) References Cited

U.S. PATENT DOCUMENTS

2020/0165246 A1   5/2020   Deng et al.

FOREIGN PATENT DOCUMENTS

| CA | 3071900 A1 * | 2/2019 | ........... A61K 31/437 |
|---|---|---|---|
| WO | WO 2007/065664 A2 | 6/2007 | |
| WO | WO-2007062805 A1 * | 6/2007 | ........... C07D 487/04 |
| WO | WO 2013/165320 A1 | 11/2013 | |
| WO | WO 2019/024908 A1 | 2/2019 | |

OTHER PUBLICATIONS

"Biomarkers in precision cancer immunotherapy: Promise and challenges. American Society of Clinical Oncology" William B. McKean, Justin C. Moser, David Rimm, and Siwen Hu-Lieskovan Educational Book (2020), 40, p. e275-e291 (Year: 2020).*
American Cancer Society. Cancer Risk and Prevention. https://www.cancer.org/cancer/risk-prevention.html (Year: 2025).*
"Hydrophobic Core Variations Provide a Structural Framework for Tyrosine Kinase Evolution and Functional Specialization." Mohanty S, Oruganty K, Kwon A, Byrne DP, Ferries S, et al. PLOS Genetics 12(8): e1006265. https://doi.org/10.1371/journal.pgen.1006265 (Year: 2016).*
Binda, et al., "The EphA2 Receptor Drives Self-Renewal and Tumorigenicity in Stem-like Tumor-Propagating Cells from Human Glioblastomas," *Cancer Cell*, Dec. 11, 2012, 22:765-780.
DiPrima, "Eph Receptor Signaling Controls Carcinoma Cell Proliferation and Survival," *Dissertation*, Aug. 31, 2019, 192 pages.
International Search Report & Written Opinion, PCT/2020/050439, mailed Jan. 20, 2021, 18 pages.
Martiny-Baron, et al., "The small molecule specific EphB4 kinase inhibitor NVP-BHG712 inhibits VEGF driven angiogenesis," *Angiogenesis*, Aug. 29, 2010, 13:259-267.
Tröster, et al., "NVP-BHG712: Effects of Regioisomers on the Affinity and Selectivity toward the EPHrin Family," *Chemmedchem*, Jul. 20, 2018, 13:16(1629-1633).

* cited by examiner

*Primary Examiner* — Kara R. Mcmillian
*Assistant Examiner* — Sophia P Hirakis
(74) *Attorney, Agent, or Firm* — Klarquist Sparkman, LLP

(57) ABSTRACT

Ephrin type receptor tyrosine kinase inhibitors, also known as Eph tyrosine kinase receptor inhibitors, for treating cancer, an inflammatory disease, an autoimmune disease, or a degenerative disease characterized at least in part by the abnormal activity or expression of the Eph receptor tyrosine kinase. The inhibitors are particularly useful for treating certain cancers.

5 Claims, 43 Drawing Sheets
(8 of 43 Drawing Sheet(s) Filed in Color)

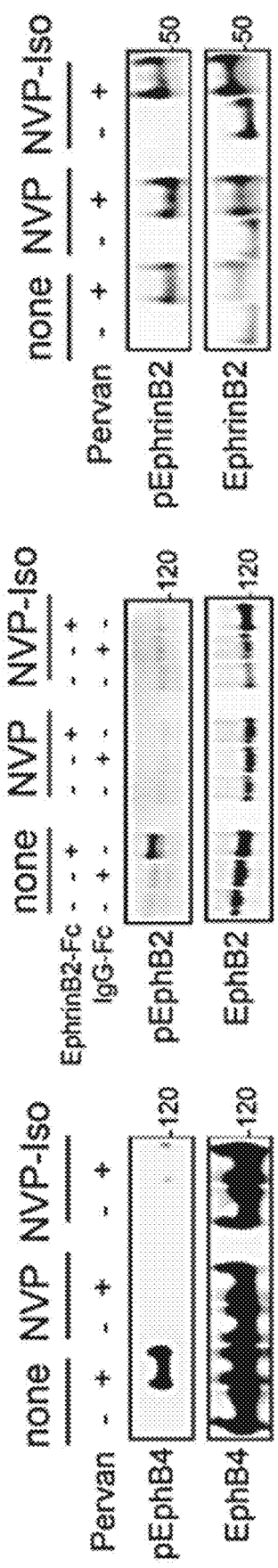

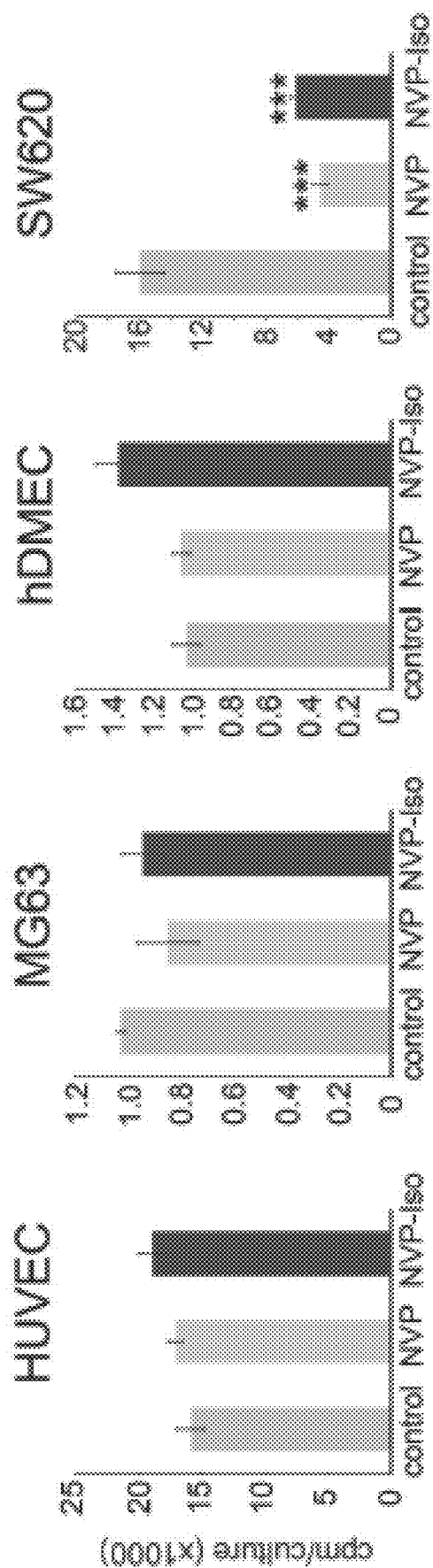
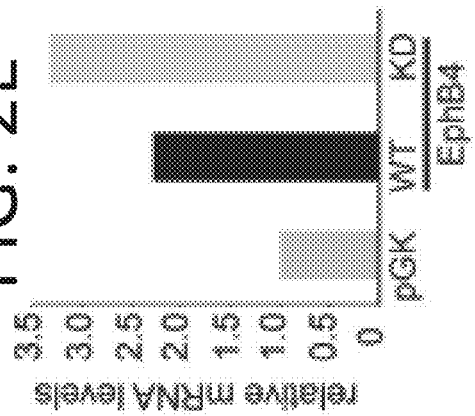
FIG. 2D
FIG. 2E

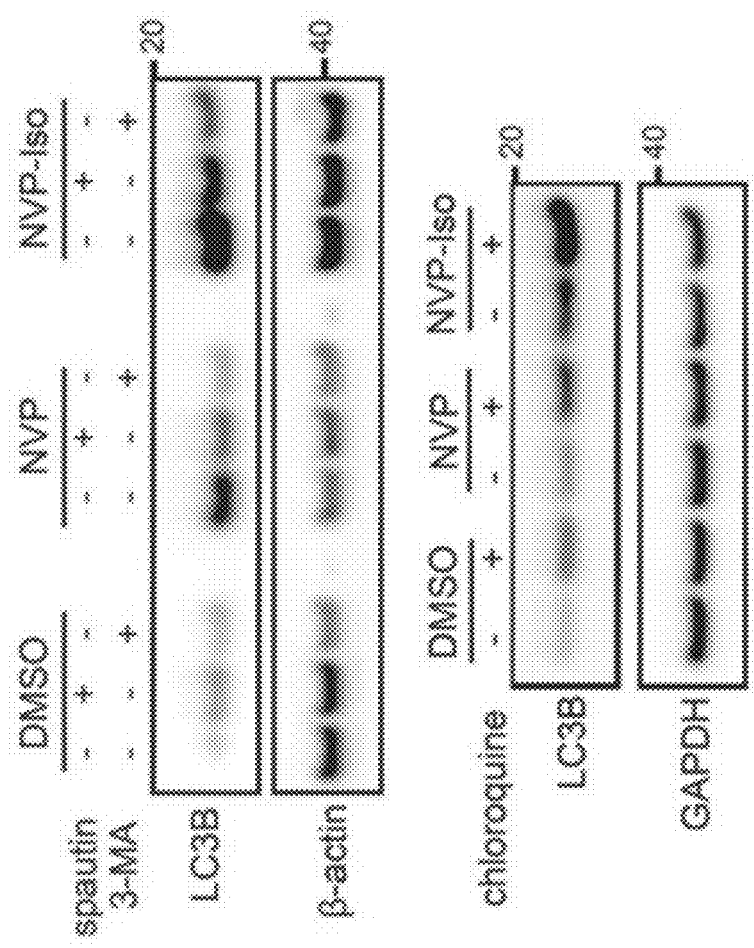
FIG. 3B
FIG. 3C
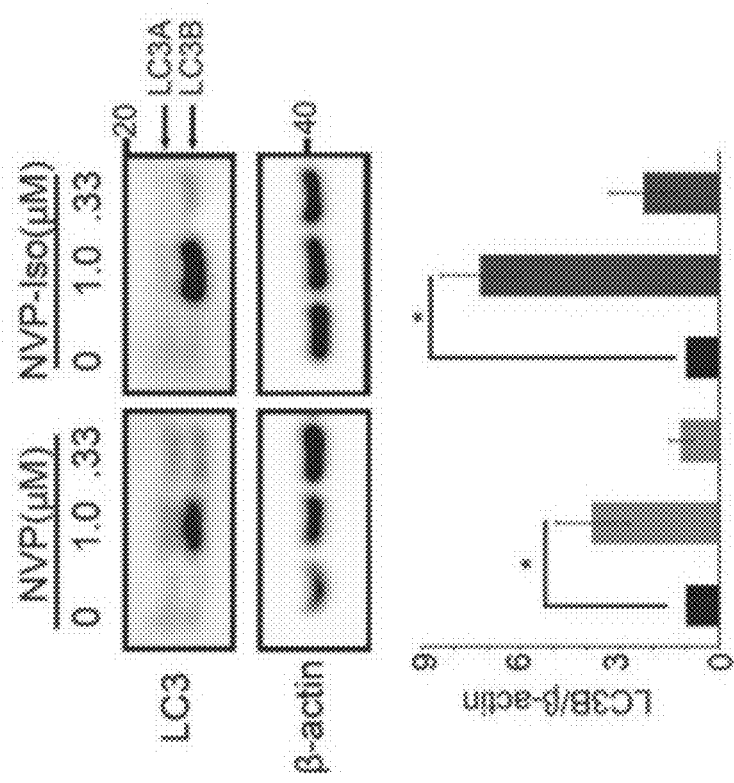
FIG. 3A

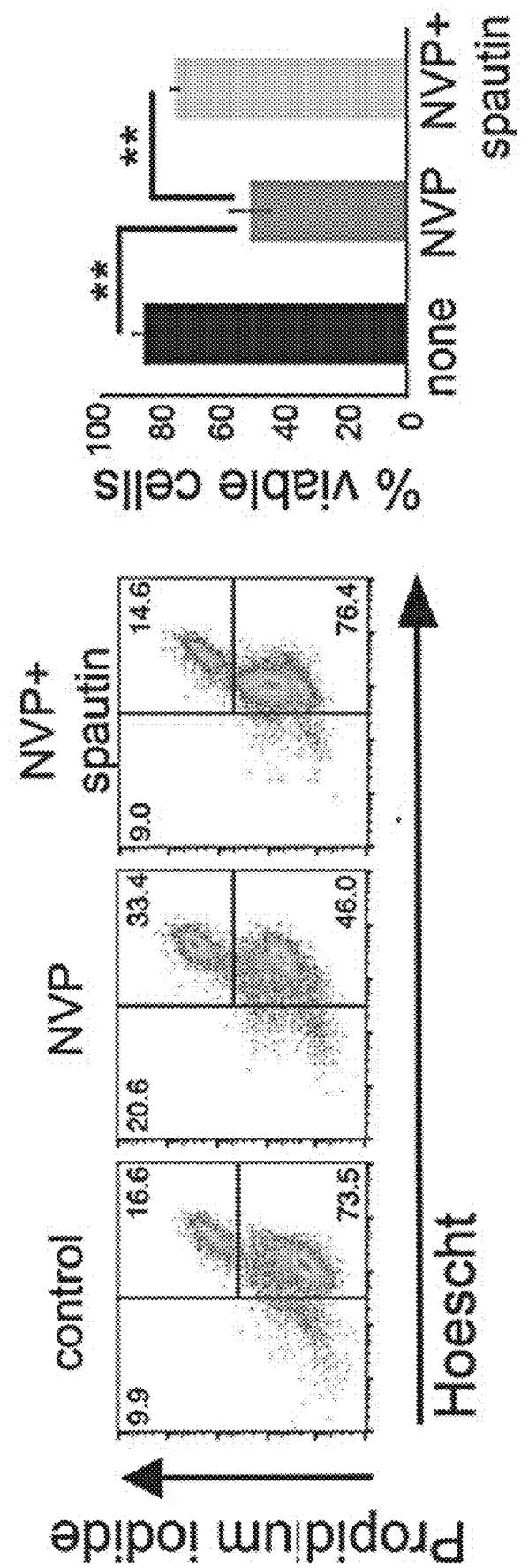

FIG. 4C
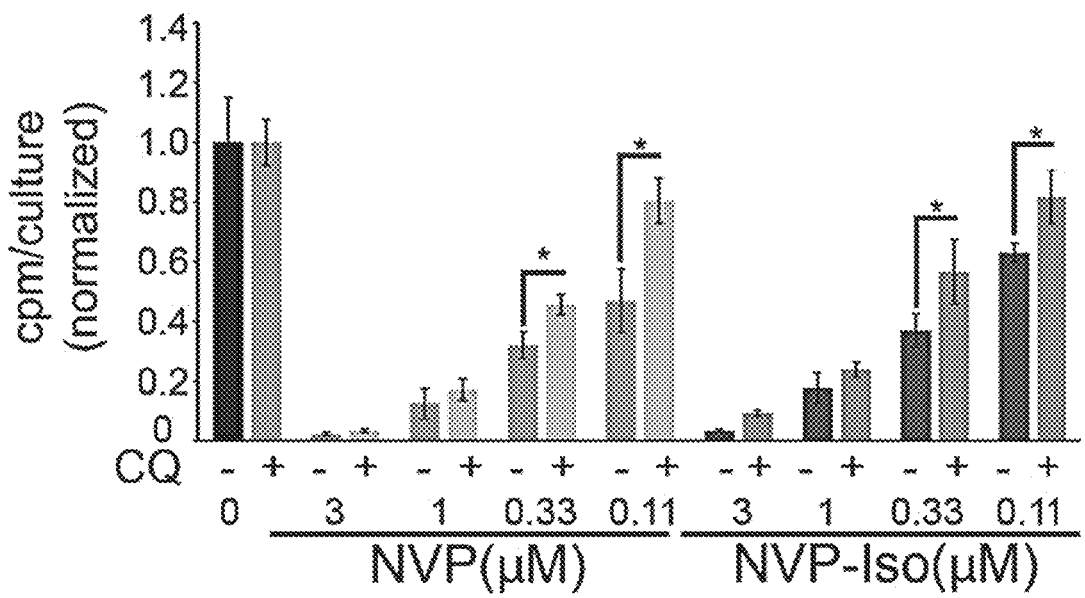
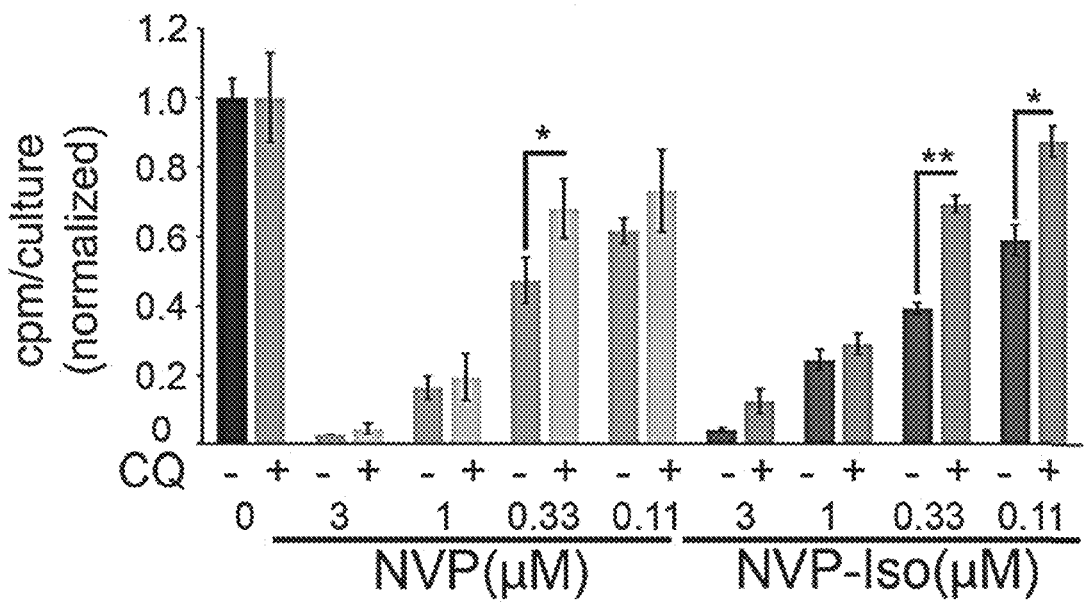
FIG. 4D

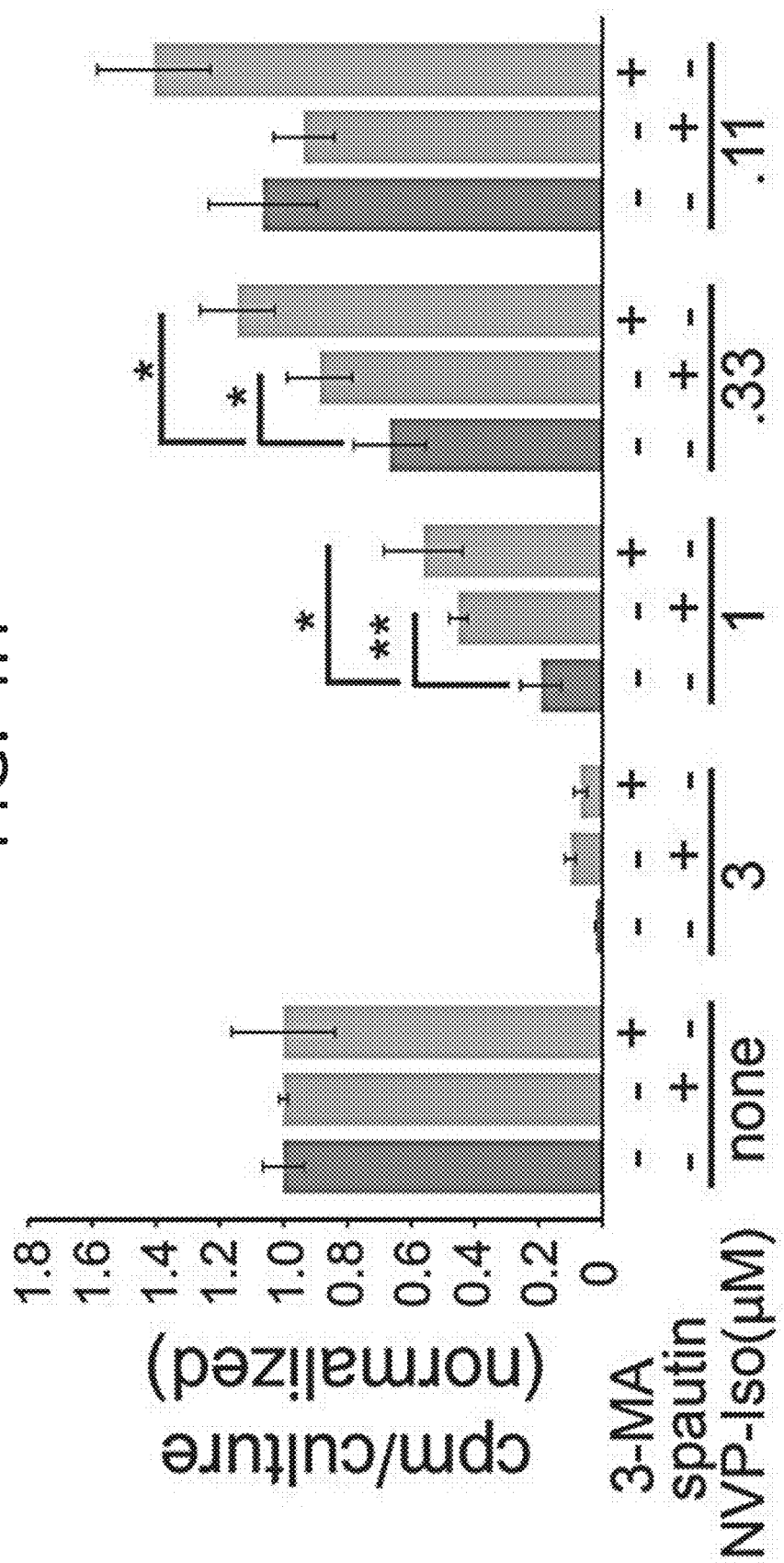

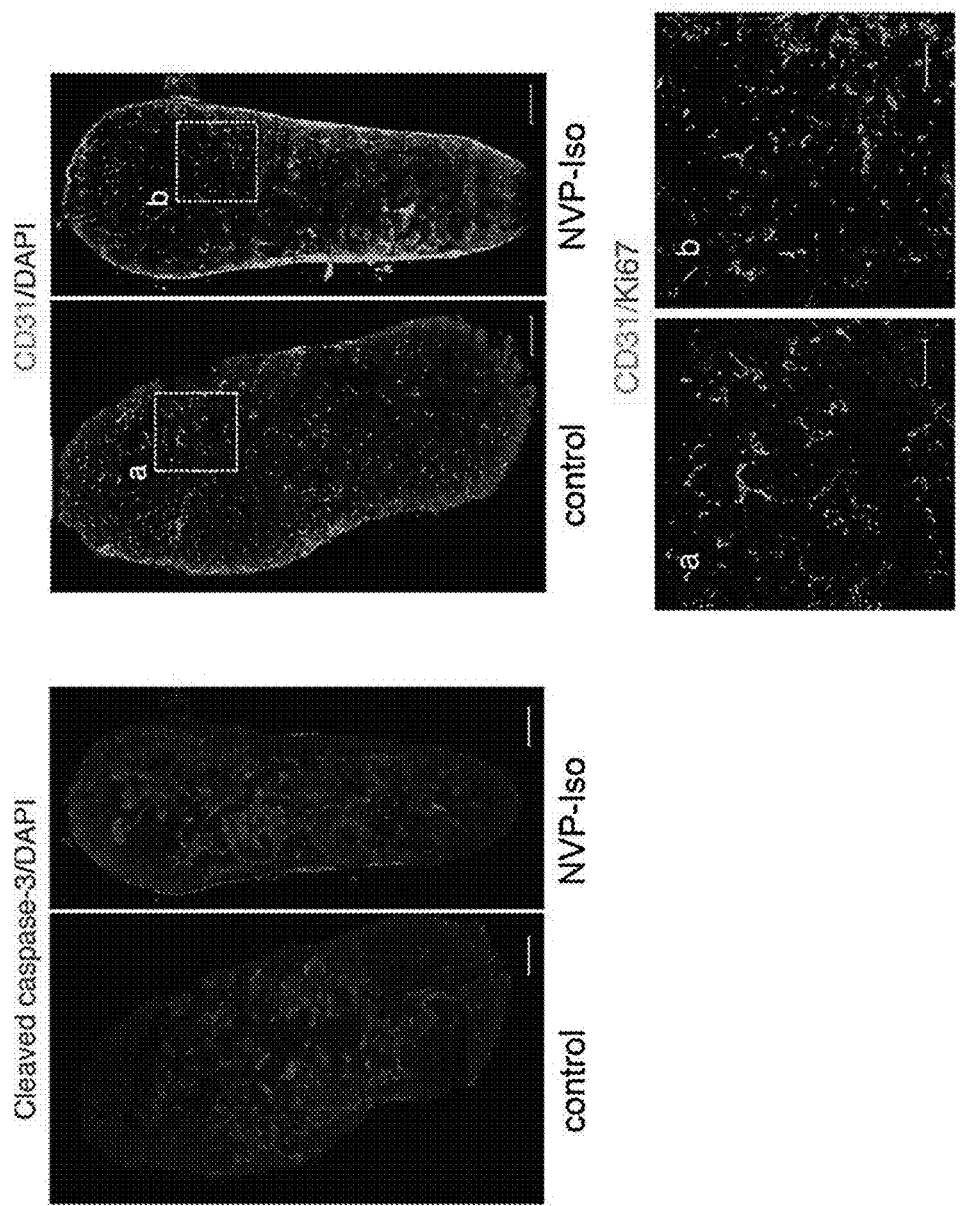

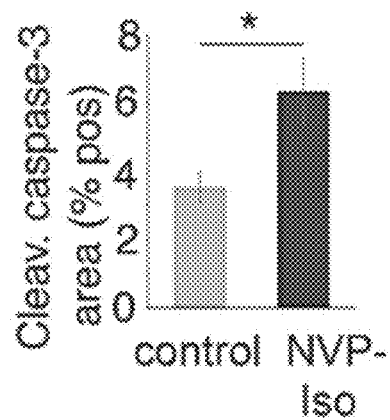
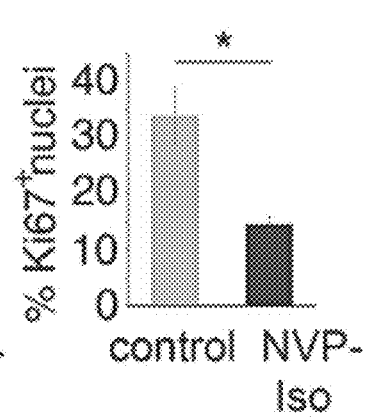
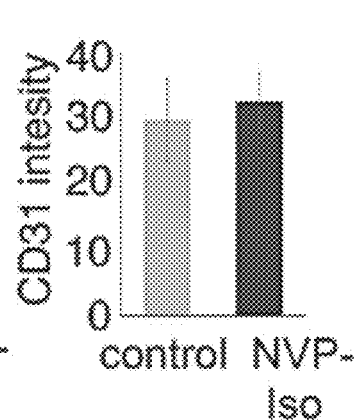

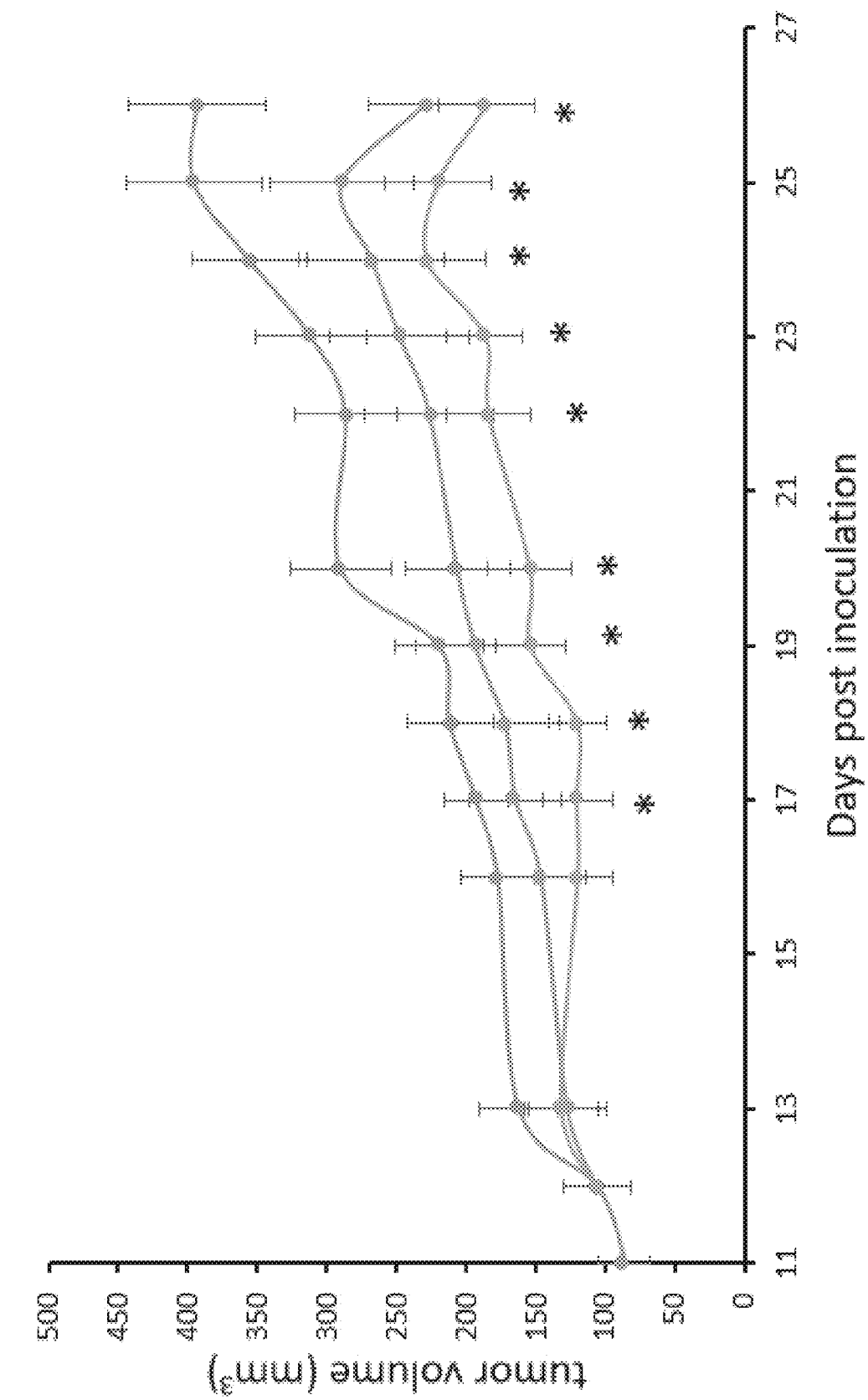

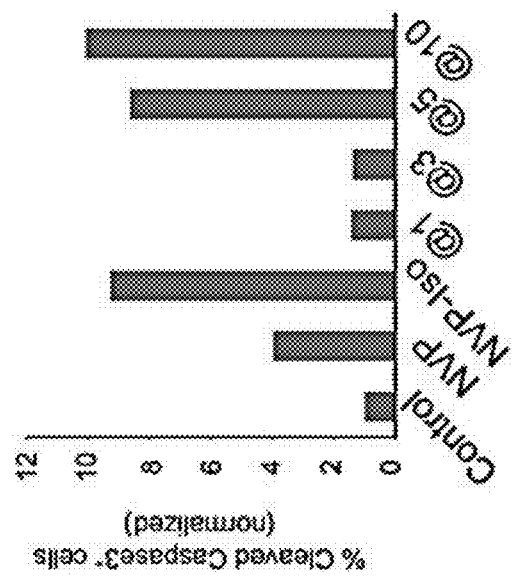
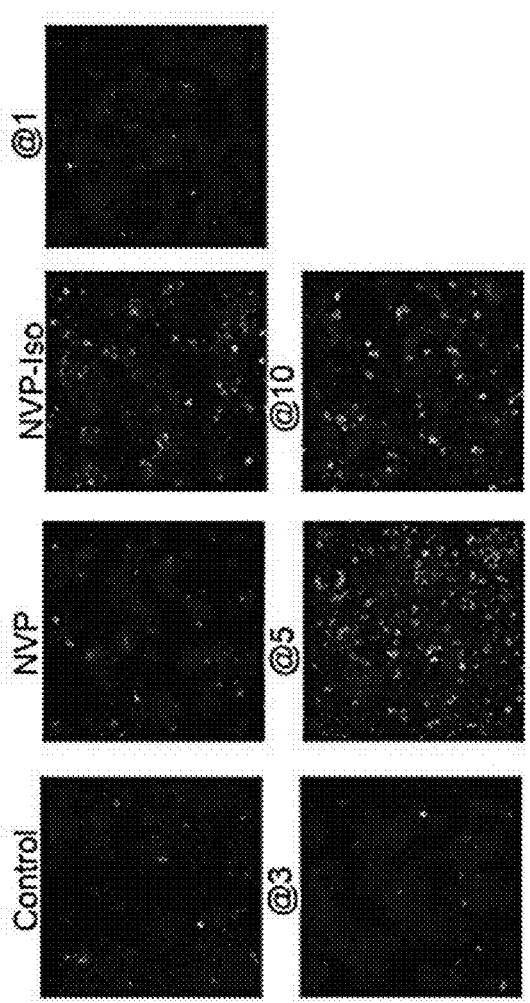
FIG. 8B

FIG. 8F
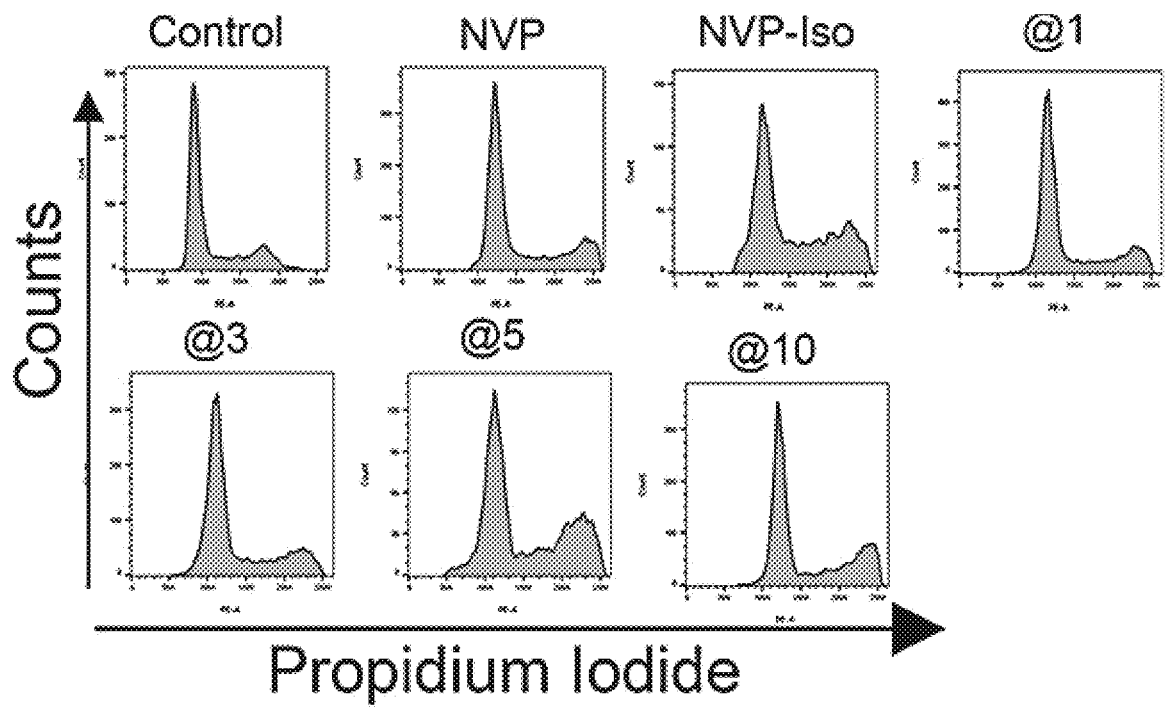
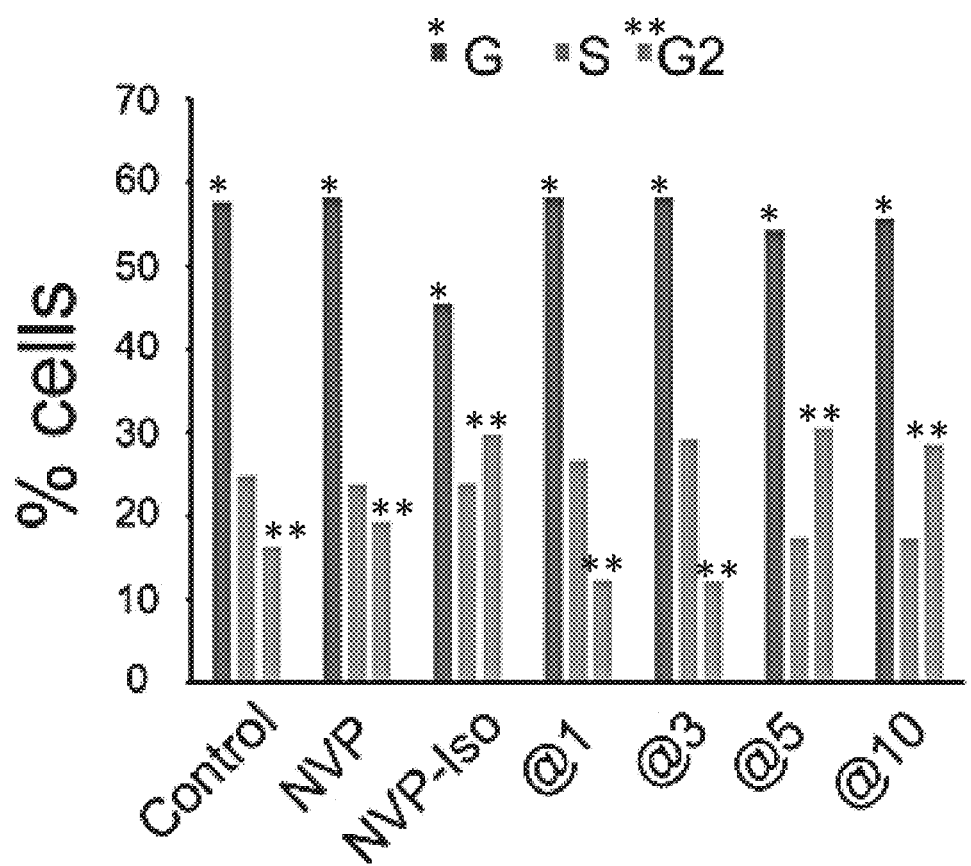

FIG. 9

| Cell Line | HT29 | HCT-116 | DLD1 | SW480 | RKO | SW620 | SK-Co-1 |
|---|---|---|---|---|---|---|---|
| NVP | 173.3±51.7* | 811.7±111.1 | 453.3±202.1 | 868.3±195.8 | 710.0±97.1 | 373.3±66.4 | 423.3±87.6 |
| NVP-Iso | 545.7±111.3 | 1656.7±343.3 | 1286.7±657.7 | 1466.7±578.3 | 2296.7±863.3 | 770.0±274 | 615.0±198.4 |
| @1 | 221.0±82.9 | 2410.0±15.18 | 4200.0±416.3 | 2466.7±768.8 | 883.3±118.6 | 1200.0±465.7 | 423.3±72.6 |
| @3 | 933.3±533.6 | 2746.7±1219 | 3340.0±868.1 | 3850.0±998.7 | 1150.0±205 | 1215.0±99.3 | 593.3±108.4 |
| @5 | 1265.0±15 | 2000.0±0 | 2075.0±75 | 2062.5±162.5 | 2610.0±1390 | 1730.0±70 | 640.0±200 |
| @10 | 301.0±36.3 | 420.0±147.3 | 423.3±82.5 | 296.7±20.3 | 1645.0±1178 | 413.3±13.3 | 196.7±24 |

*Summary results with new compounds and prototypes on the proliferation of the seven colorectal cancer cell lines. Inhibition of proliferation is presented as $IC_{50}$ values (nM), as calculated from dose-response proliferation assays from three independent experiments across seven cell lines.

FIG. 10

| | pEphB4 | pEphA2 | pEphB2 |
|---|---|---|---|
| NVP | 28.4±19.8 | 15.2±5.0 | 19.5 |
| Iso | 1660.3±1175 | 849.7±589.7 | 4000 |
| @1 | 8.3±6.9 | 25.9±13 | 10 |
| @3 | 26.2±15 | 89.8±35.4 | 4.2 |
| @5 | 3362.5±637.5 | 4000.0±0 | 800 |
| @10 | 2709.7±1290.3 | 4000.0±0 | 4000 |

Effects of prototypes and derivative new compounds on the endogenous phosphorylation of EphB4, EphB2 and EphA2 in colorectal cancer cells. Phosphorylation of pEphB4, EphB2 and EphA2 was measured by ELISA in cell lysates of HT29 (high EphB4), RKO (high EphA2) and Colo-205 (high EphB2) cell lines. The cells were treated with each individual compound for four hours prior to lysis; 10µg of cell lysate was tested in duplicate. The results reflect the mean $IC_{50}$ ± SEM calculated from three independent experiments.

FIG. 11
Phenylbenzamide precursors
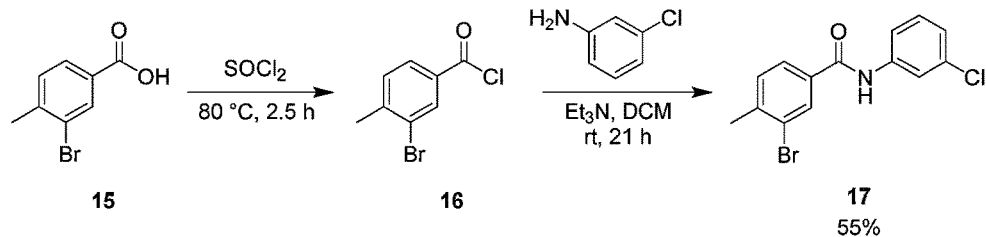
Pyrazolo[3,4-d]pyrimidine precursors
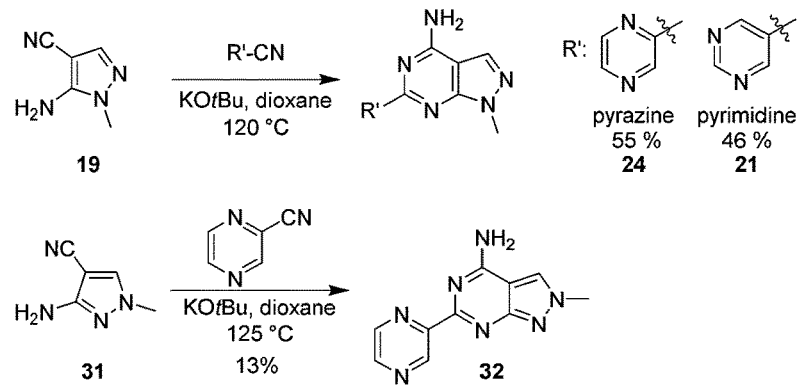
Quinazoline precursors
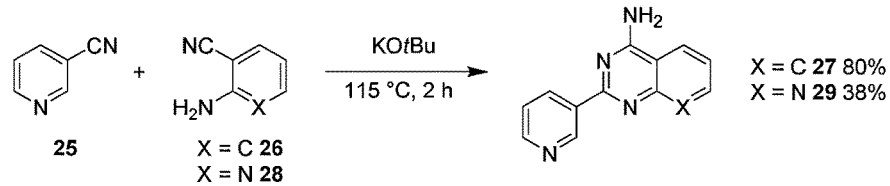
Symmetric triazine precursors
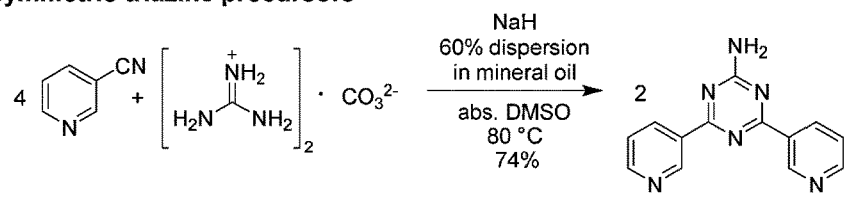
Asymmetric triazine precursors
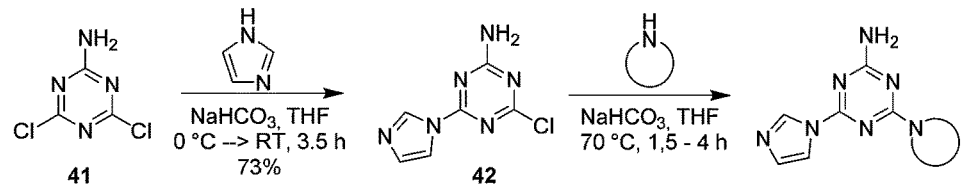
  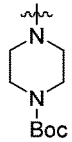 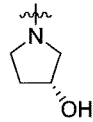 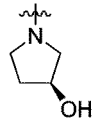 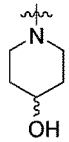

FIG. 12
General synthesis of NVP derivatives
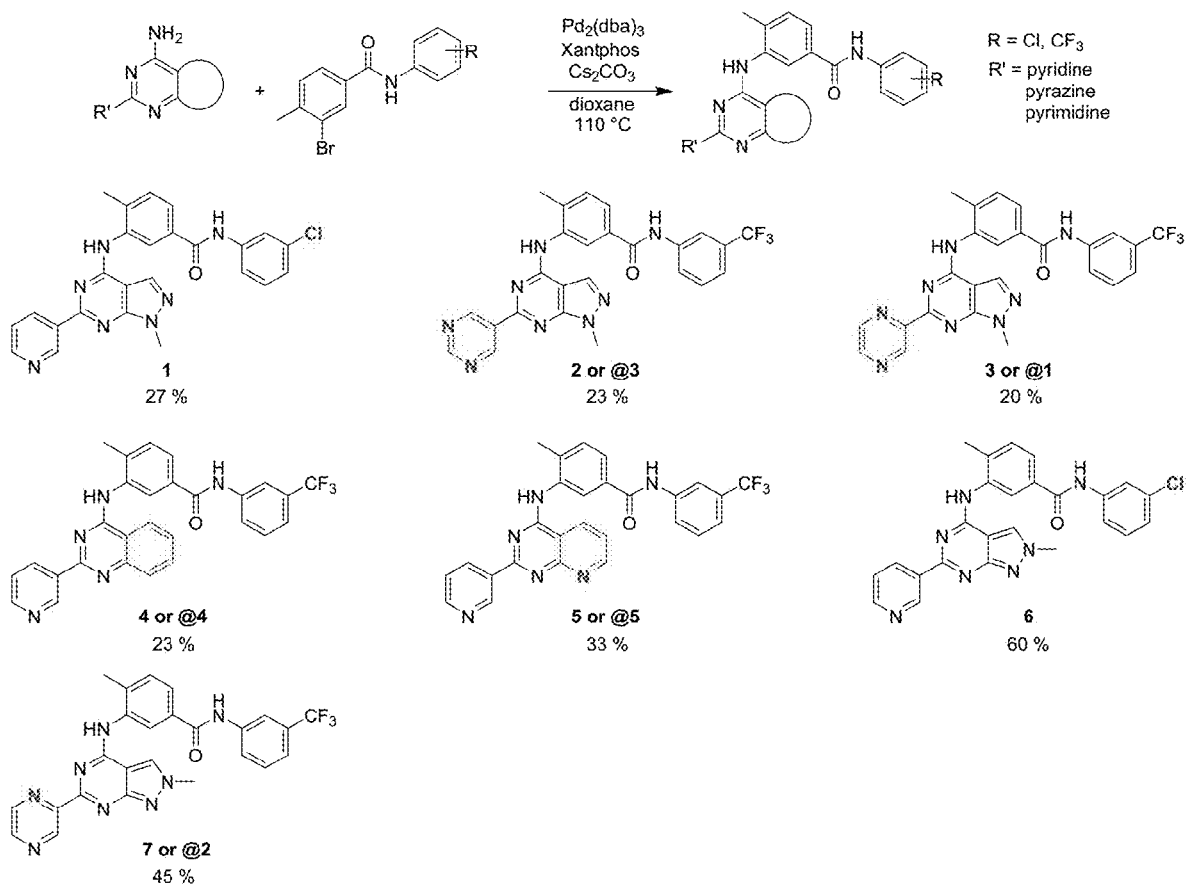
General synthesis of Triazine derivatives
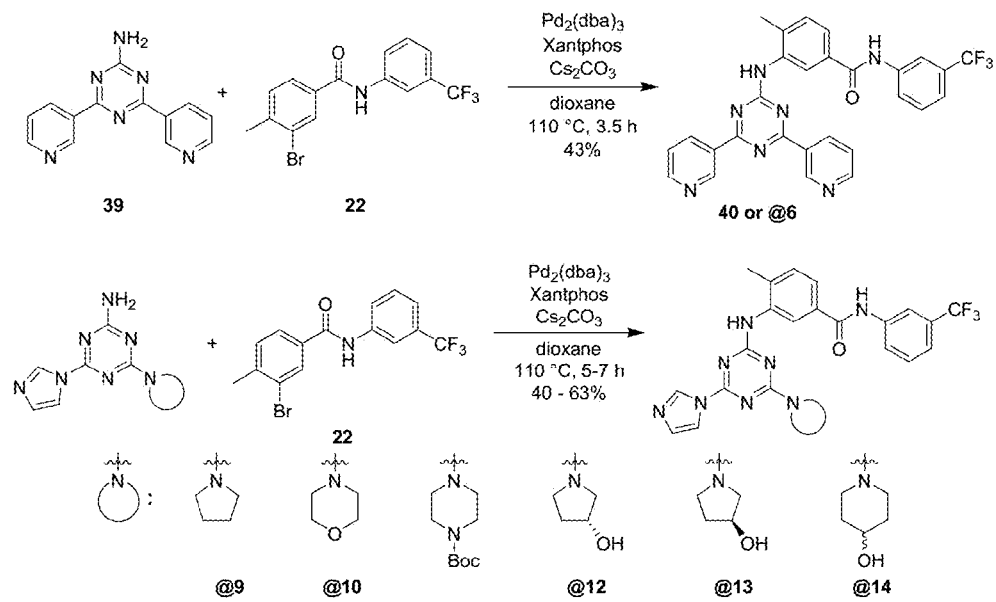

FIG. 13
Scheme 1. Aniline Synthesis
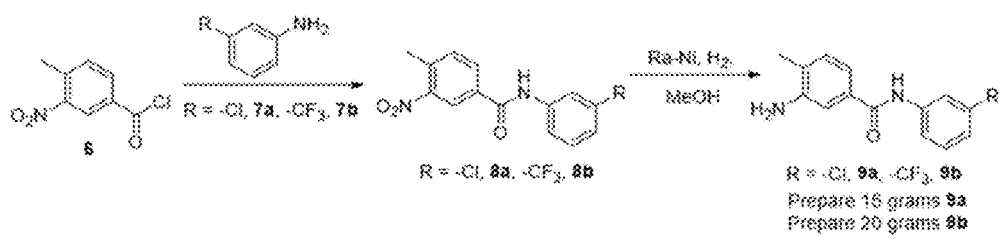
Scheme 2. 1-Methyl Isomer: 4-Chloro Displacement
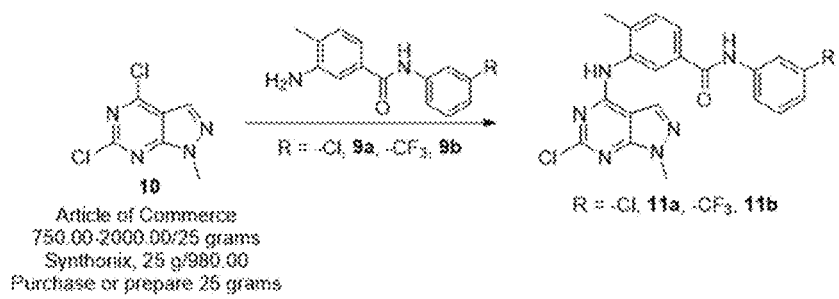
Scheme 3. 1-Methyl Isomer: Suzuki on 6-Chloro
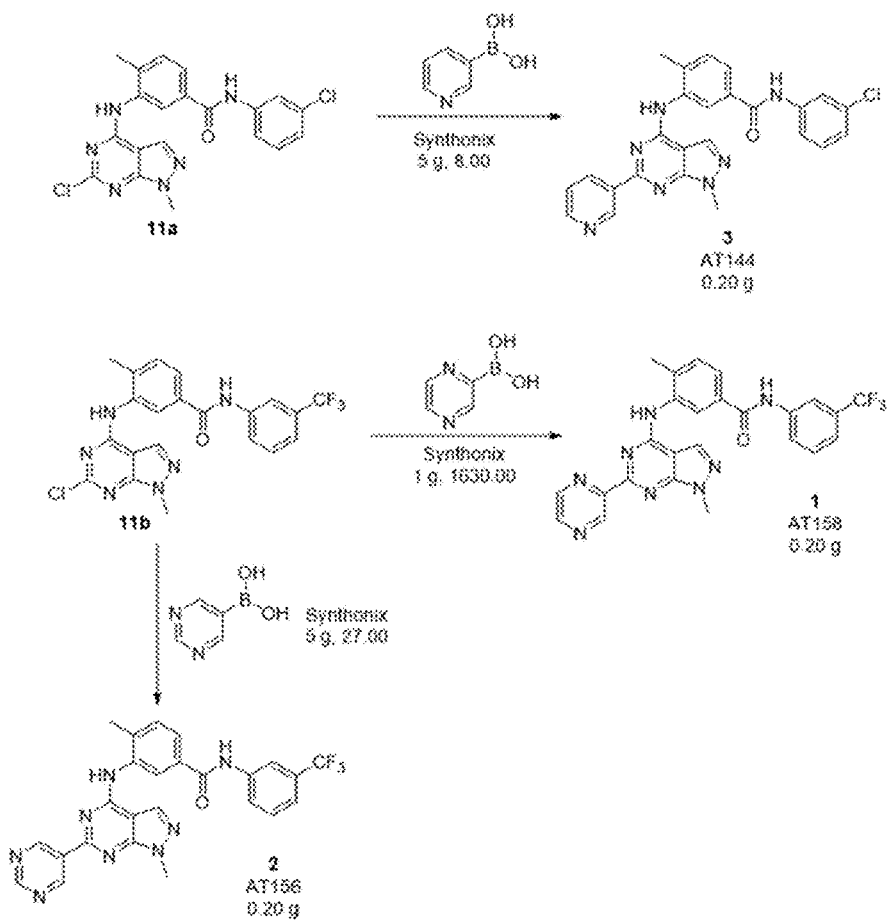

FIG. 14
Scheme 4. 2-Methyl Isomer: 4-Chloro Displacement
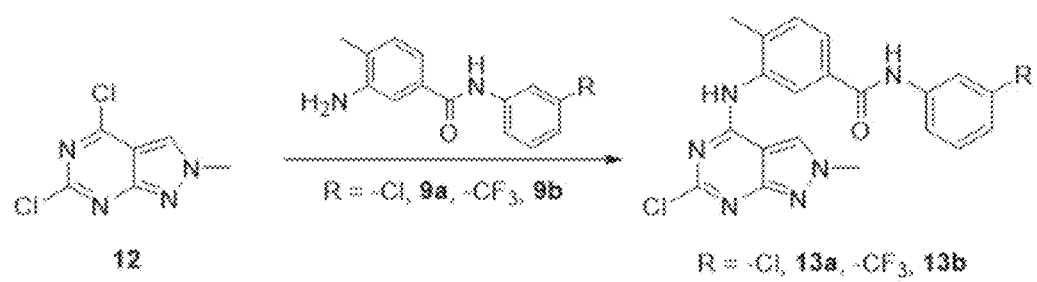
Scheme 5. 2-Methyl Isomer: Suzuki on 6-Chloro
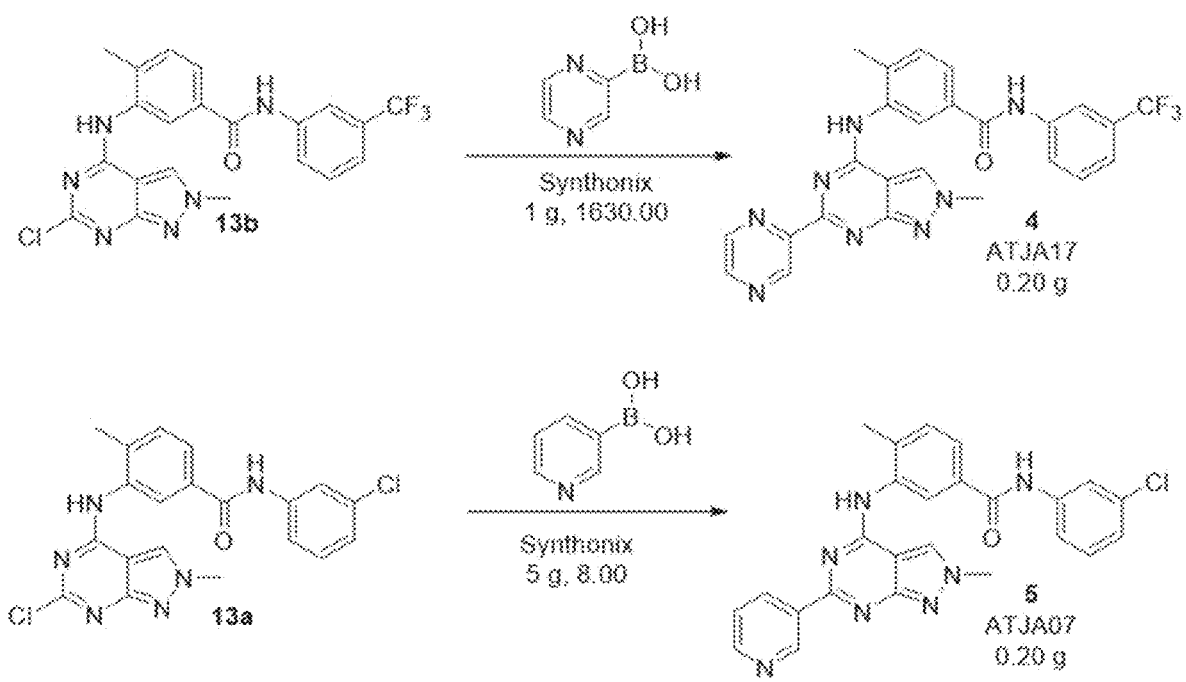

Scheme 1. Aniline Synthesis

Scheme 2. Serial Chlorine Displacement on Cyanuric chloride

RECEPTOR TYROSINE KINASE INHIBITORS FOR TREATMENT OF PROTEIN KINASE MODULATION-RESPONSIVE DISEASE OR DISORDER

CROSS-REFERENCE TO RELATED APPLICATIONS

This application is a continuation-in-part of PCT Application No. PCT/US2020/050439, filed Sep. 11, 2020, which claims the benefit of the earlier filing dates of U.S. Provisional Application No. 63/070,739, filed Aug. 26, 2020, and U.S. Provisional Application No. 62/900,240, filed Sep. 13, 2019, each of which is incorporated by reference herein in its entirety.

STATEMENT OF GOVERNMENT SUPPORT

This invention was made with Government support under project number Z01#: ZIA SC 010355 by the National Institutes of Health, National Cancer Institute. The United States Government has certain rights in the invention.

FIELD OF THE DISCLOSURE

This disclosure concerns receptor tyrosine kinase inhibitors and methods of using the inhibitors to inhibit receptor tyrosine kinase expression and/or activity and treat cancer or other disorders.

BACKGROUND

Protein kinases have been a focus of medicinal chemistry as potential drug targets. Numerous inhibitors, both orthosteric and allosteric, have been developed. Some of these inhibitors are effective drugs approved for many clinical applications. However, the ephrin type-A receptor 2 (EphA2) is a less explored target despite its substantial pharmacological potential. The role of EphA2 in various diseases has been widely investigated in recent years, showing a role in infectious diseases and cancer. Overexpression of EphA2 is observed in different cancer types (breast, head and neck, non-small cell lung cancer, colorectal cancer, and melanoma) and often predicts a poor clinical prognosis. Besides upregulation, reduced expression of Eph family members was also observed in certain cancer types, suggesting context-dependent effects of Eph receptors on promotion or suppression of tumorigenicity. In recent years, the role of EphA2 in the development of colorectal cancer, one of the most frequently occurring cancer types, has been analysed intensively. In stage II/III colorectal cancer, EphA2 RNA and protein levels are abnormally elevated compared to the normal colorectal tissue and are associated with poor patient survival, raising the possibility that targeting EphA2 might be a promising strategy for treatment. Another recent study has detected a significant correlation between high expression levels of EphA2 in advanced colorectal cancer and resistance to anti-epithelial growth factor receptor targeting with the monoclonal antibody cetuximab.

Many cancer cells (including breast, head and neck, non-small lung cancer, colorectal cancer, and melanoma) express at abnormally high levels subsets of EphB receptors, which represent potential targets of cancer immunotherapy. EphB receptors are also implicated in neural repair, pain, and certain viral infections.

New ephrin kinase inhibitors would be instrumental to gain a better understanding of the role of this specific kinase as a therapeutic target.

SUMMARY OF THE DISCLOSURE

Disclosed herein is a compound, stereoisomer, tautomer, or pharmaceutically acceptable salt thereof according to any one of Formulas I-IV:

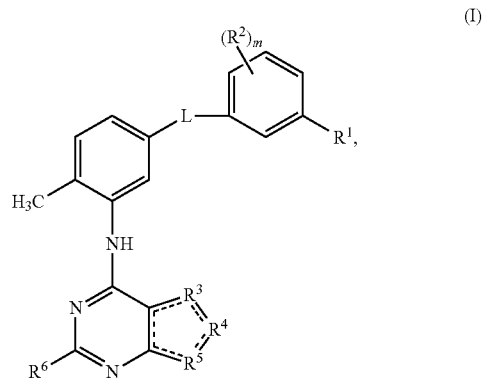

(I)

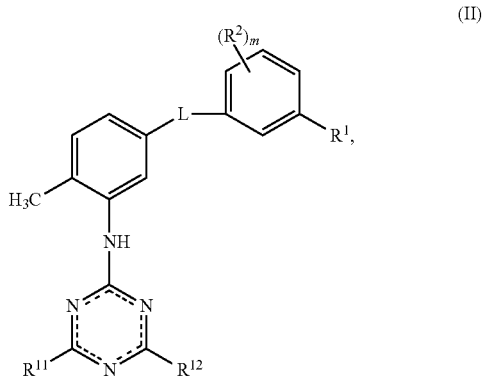

(II)

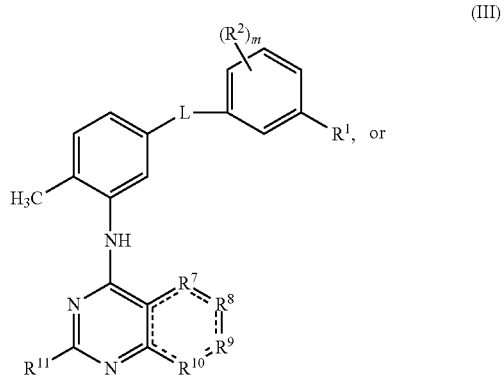

(III), or

-continued

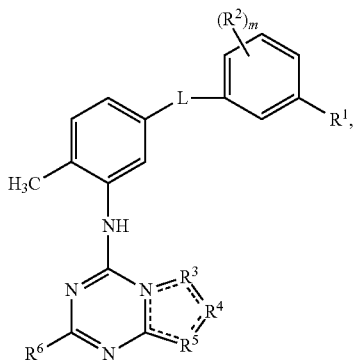

(IV)

wherein:
  each bond represented by "—" is a single or double bond as needed to satisfy valence requirements;
  m is 0, 1, 2, or 3;
  L is —C(O)—N(H)—, —N(H)—C(O)—, —S(O)$_2$—N(H)—, or

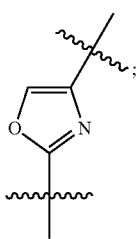 [SMILES: *c1coc(*)n1]

$R^1$ is H, substituted or unsubstituted $C_1$-$C_5$ aliphatic, halo, substituted or unsubstituted $C_2$-$C_5$ heteroaliphatic, —N($R^a$)$_2$, hydroxyl, thiol, substituted or unsubstituted cycloaliphatic, substituted or unsubstituted cycloheteroaliphatic, substituted or unsubstituted aryl, or substituted or unsubstituted heteroaryl;
  each $R^2$ independently is substituted or unsubstituted $C_1$-$C_5$ aliphatic, halo, substituted or unsubstituted $C_2$-$C_5$ heteroaliphatic, substituted or unsubstituted $C_1$-$C_5$ alkoxy, substituted or unsubstituted alkoxycarbonyl, hydroxyl, thiol, cyano, substituted or unsubstituted cycloaliphatic, substituted or unsubstituted cycloheteroaliphatic, substituted or unsubstituted aryl, or substituted or unsubstituted heteroatyl;
  $R^3$ is —C($R^b$)— or —C($R^b$)$_2$—, and $R^4$-$R^5$ independently are —N— or —N($R^b$)—, provided at least one of $R^4$-$R^5$ is —N($R^b$)— where $R^b$ is other than H;
  $R^6$ is a N-heteroaryl or substituted amido;
  each $R^7$-$R^{10}$ independently is —N—, —N($R^b$)—, —C($R^b$)—, or —C($R^b$)$_2$—;
  $R^{11}$ is a N-heterocycle, or substituted or unsubstituted aryl;
  $R^{12}$ is a N-heterocycle, substituted aryl, substituted amido, or substituted amino;
  each $R^a$ independently is H or substituted or unsubstituted $C_1$-$C_5$ aliphatic; and
  each $R^b$ independently is H, halo, substituted or unsubstituted $C_1$-$C_5$ aliphatic, substituted or unsubstituted $C_2$-$C_5$ heteroaliphatic, substituted or unsubstituted aryl, substituted or unsubstituted heteroaryl, —N($R^a$)$_2$, hydroxyl, or thiol, provided that the compound is not

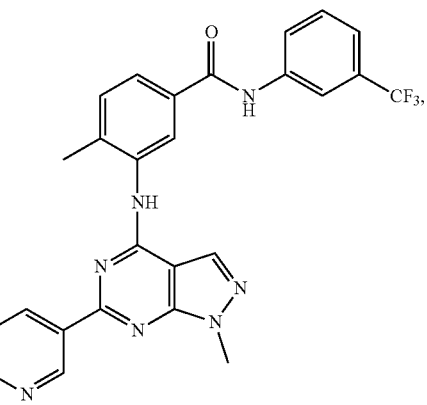

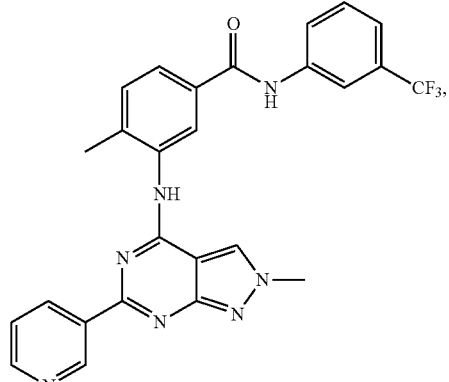

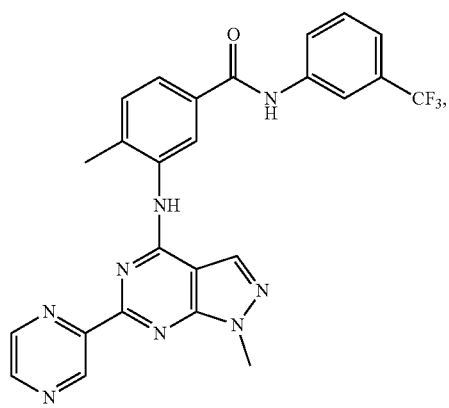

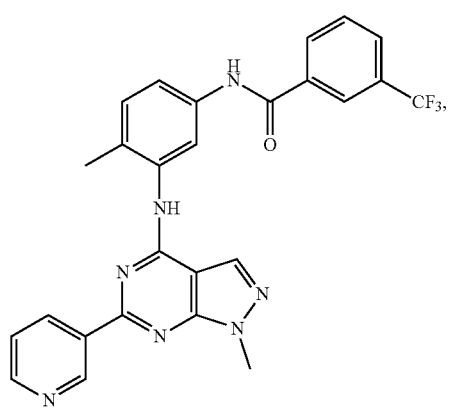

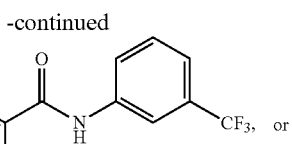

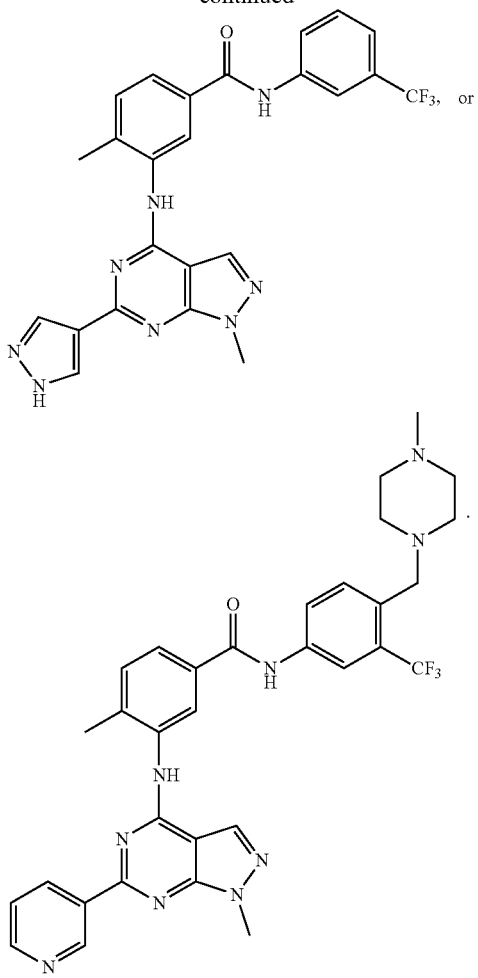

In some embodiments, L is —C(O)—N(H)—.

Also disclosed herein is a method comprising administering a compound disclosed herein to a subject having, suspected of having, or at risk of developing, cancer, an inflammatory disease, an autoimmune disease, or a degenerative disease characterized at least in part by the abnormal activity or expression of the Eph receptor tyrosine kinase.

Further disclosed herein is a method of treating colorectal cancer in a subject, comprising administering to the subject a therapeutically effective amount of a compound as disclosed herein, thereby treating the colorectal cancer.

Additionally disclosed herein is a method for inhibiting an Eph receptor tyrosine kinase, comprising contacting cells expressing an Eph receptor tyrosine kinase with a compound disclosed herein in an amount effective to inhibit activity of the Eph receptor tyrosine kinase relative to an activity level of the Eph receptor tyrosine kinase in the absence of the compound.

Further disclosed herein is a method of treating a disorder characterized at least in part by abnormal activity or expression of a protein tyrosine kinase, the method comprising
  identifying a subject having a disorder characterized at least in part by abnormal activity or expression of protein tyrosine kinase; and
  administering a therapeutically effective amount of a compound disclosed herein or a pharmaceutical composition comprising the compound to the subject.

The foregoing and other features will become more apparent from the following detailed description of several embodiments which proceeds with reference to the accompanying figures.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 1A-1J. The tyrosine kinase inhibitor NVP reduces growth of colorectal carcinoma cells. (FIG. 1A), NVP and NVP-Iso reduce endogenous EphB4 phosphorylation after 8-hour incubation, EphB4 was immunoprecipitated from HT-29 cells with or without the tyrosine phosphatase inhibitor pervanadate (Pervan). Immunoprecipitates were immunoblotted with p-Tyr antibody and re-blotted with EphB4 antibody. (FIG. 1B), NVP and NVP-Iso (4-hour pre-treatment) reduce EphB2 phosphorylation induced by EphrinB2-Fc or control IgG-Fc in Colo 205 cells. Cell lysates were immunoblotted with p-EphB2 antibody and re-blotted with total EphB2 antibody. (FIG. 1C). NVP and NVP-Iso (18-hour pretreatment) do not reduce endogenous EphrinB2 phosphorylation. EphrinB2 was immunoprecipitated from HT-29 cells. Immunoprecipitates were immunoblotted with p-Tyr antibody and re-blotted with total EphrinB2 antibody. (FIG. 1D). NVP (72-hour incubation) dose-dependently inhibits HT-29 cell proliferation expressed as mean cpm/triplicate cultures. (E and F). NVP and NVP-Iso (72-hour incubation) induce morphologic change and cell death in HT-29 cells. Representative bright-field images after 3-day culture (FIG. 1E). Representative flow cytometry profiles (FIG. 1F); quantitative results (mean %±SD, 3 experiments). (FIG. 1G), NVP and NVP-lso (72-hour incubation) reduce the proliferation of 10/10 colon carcinoma cell lines. Results (3-5 experiments) expressed as % mean (±SEM) of control. (FIG. 1H), Effects of NVP and NVP-Iso (72-hour incubation) on the proliferation of control (pGK vector, yellow bar) or EphB2 (sh424) plus EphB4 (sh774) silenced (grey bars) HT29 or SW620 cells (silencing 24-hour prior to addition of drugs); results expressed as proliferation relative to no drug. (FIGS. 1I, 1J) Effects of EphB4 wild type (WT) or kinase deficient mutant (KD) on the spontaneous proliferation of HT29 cells. Immunoblotting (72 hours after transduction) with antibody to EphB4 (FIG. 1I). Proliferation is expressed as mean cpm/culture (FIG. 1J). Statistical significance of difference calculated by two-tailed Student t-test. *<0.05 P<0.01; *P=<0.001.

FIGS. 2A-2E. (FIG. 2A), NVP-Iso dose-dependently inhibits HT-29 cell proliferation. Results are expressed as mean cpm/triplicate cultures. (FIG. 2B), Representative bright-field images showing reduced cell confluency in 3-day cultures supplemented with NVP or NVP-Iso (1 μM). Boxed areas are magnified in FIG. 1E. (FIG. 2C), Cell cycle analysis in HT-29 cells treated with NVP or NVP-Iso (1 μM) or transduced with pGK (control), shEphrinB2 (sh427), or shEphB4 (sh774) for 72 hrs. Cells were fixed, permeabilized and stained with propidium iodide. (FIG. 2D). Proliferation of HUVEC, MG63, hDMEC and SW620 cells after incubation with NVP or NVP-Iso (1 μM) for 72 hrs. Representative results of proliferation expressed as mean cpm/culture±SD (triplicate cultures). (FIG. 2E). Relative mRNA levels of EphB4 in HT-29 cells transduced with pGK control vector, WT EphB4 or kinase deficient (KD) mutant EphB4

(72 hrs) by qRT-PCR. Statistical significance of difference calculated by two-tailed Student's t-test. *P<0.05; ***P<0.001.

Figure 3D:
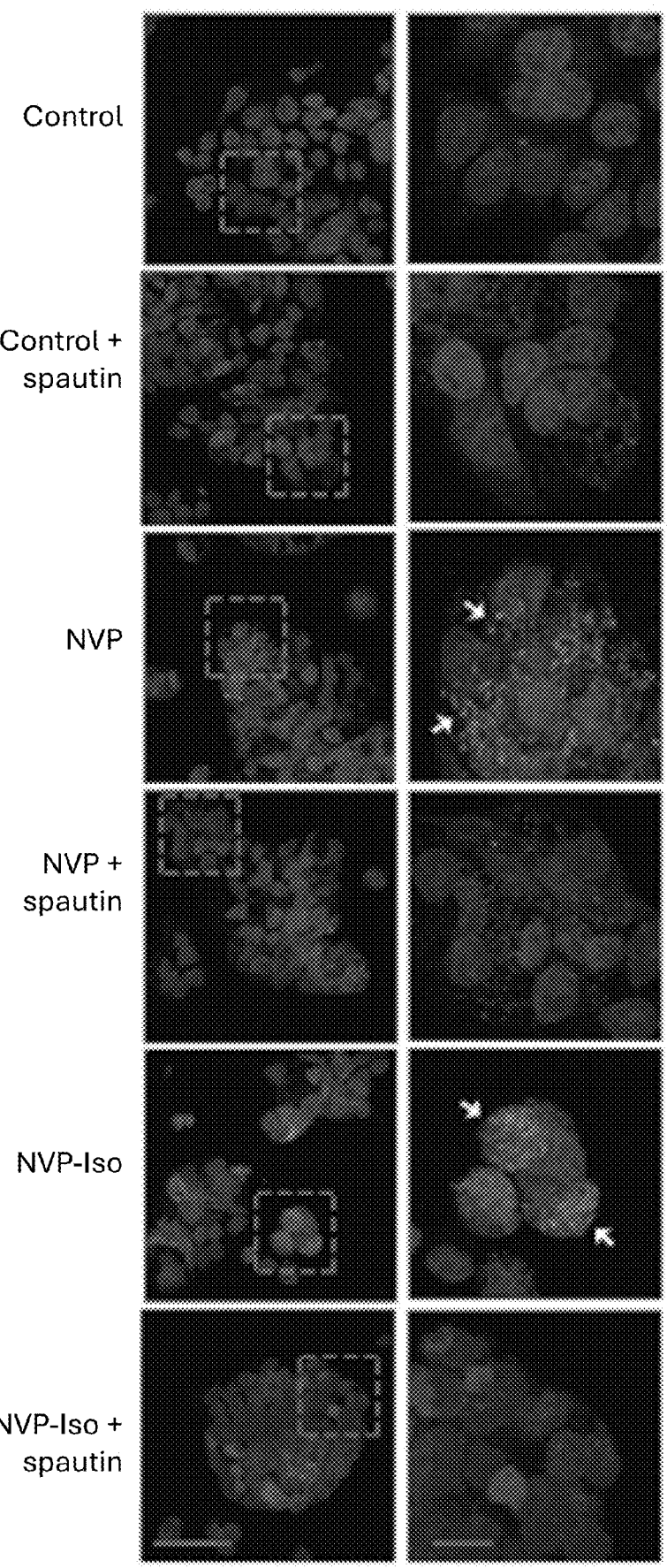
Figure 3F:
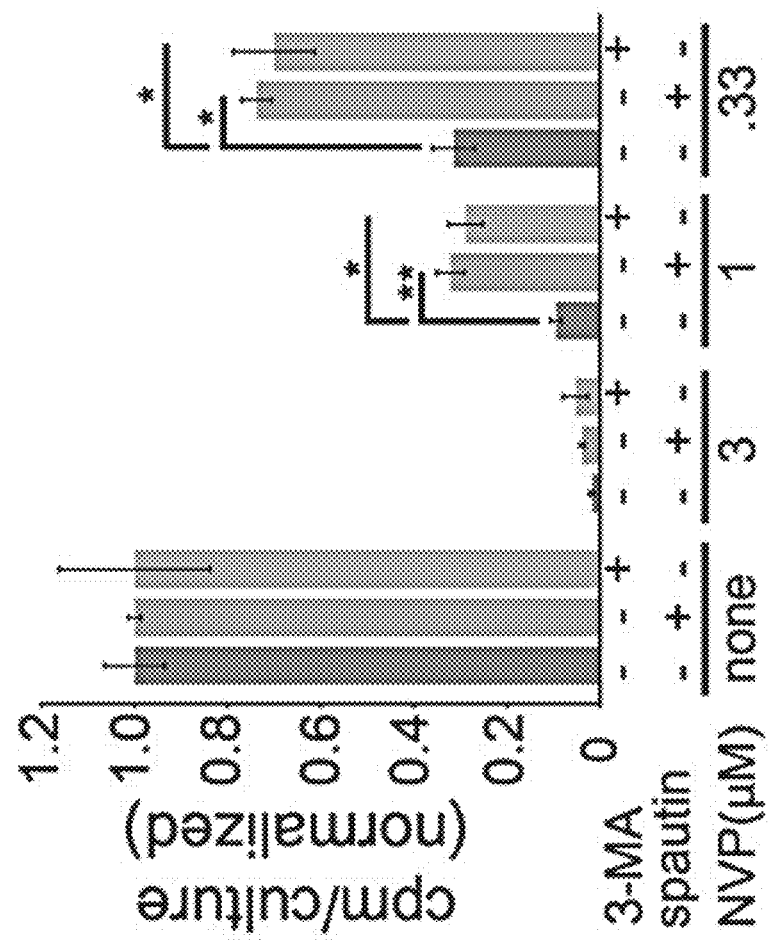

FIGS. 3A-3I. NVP and NVP-Iso induce autophagy in colorectal carcinoma cells. (FIG. 3A), NVP and NVP-Iso (72-hour incubation) induce the autophagy marker protein LC3B in HT-29 cells. LC3 antibody detects LC3A and LC3B (lipidated derivative) in cell lysates of HT-29 cells. Representative immunoblot (top) and LC3B quantification from 3 independent experiments (bottom). (FIG. 3B). Spautin and 3-MA (4-hour pre-incubation) reduces LC3B levels in HT-29 cells treated with NVP or NVP-Iso after 72-hour incubation. (FIG. 3C), Chloroquine (4-hour incubation prior to harvest) enhances LC3B levels in HT29 cells treated with NVP or NVP-iso (72-hour incubation). (FIG. 3D) Autophagosomes are identified as "puncta" (pointed by white arrows) in HT-29 cells transduced with a fluorescent-LC3 vector. Spautin (4-hour pretreatment) reduces the number of autophagosomes in NVP and NVP-Iso treated (72 hours) HT-29 cultures; representative confocal images (63×); boxed areas (left) are magnified (right); scale bars 50 μm (left); 10 μm (right). Quantitative results (FIG. 3E) reflect the mean number of panda/cell (400-500 total DAP14-cells/3 fields; CellProfiler). (FIG. 3F), Effect of spautin or 3-MA on HT-29 cell proliferation inhibited by NVP (72-hour incubation). Results reflect mean cpm/culture±SD (triplicate cultures). (FIGS. 3G, 3H) Spautin (4-hour pre-treatment) reduces cell death of HT-29 cells incubated with NVP (0.5 μM; 72 hours); representative flow cytometiy profiles (FIG. 3G) and quantitative results of 3 independent experiments (mean %±SD) (FIG. 3H). (FIG. 3I), Spautin and 3-MA normalizes HT29 cell morphology altered by NVP or NVP-Iso (72 hours); representative bright field images (40× magnification). Statistical significance of difference calculated by two-tailed Student's t-test, *P<0.05; P≤0.01; *P≤0.001.

FIGS. 4A-4J. Autophagy markers in colorectal carcinoma cells. (FIG. 4A), NVP and NVP-Iso (1 μM) induce LC3B accumulation in SW620 cells after 72 hours; pre-treatment (4 hours) with spautin (5 μM) or 3-MA (5 mM) reduces this LC3B accumulation. (FIG. 4B), Chloroquine (10 μM) reduces autophagic vacuoles in HT-29 cells treated with NVP or NVP-Iso (1 μM); 72-hour culture. (FIGS. 4C, 4D), Chloroquine (CQ; 10 μM) enhances proliferation in HT-29 (FIG. 4C) and SW620 (FIG. 4D) colorectal cancer cells treated with NVP and NVP-Iso (0.11-3 μM); 72-hour culture; mean cm/culture±SD (triplicate cultures). (FIG. 4E), EphrinB2 silencing (sh427) induces LC3B accumulation in HT-29 cells. (FIG. 4F) EphrinB2 silencing induces autophagosomes in HT-29 cells; spautin (5 μM) reduces this accumulation. Fluorescent "puncta" in LC3-expressing HT-29 cells; bright-field/fluorescent (left) and fluorescent (right) imaging; 20× objective. Bar graph: mean percent cells with 2 puncta/cell identified in 5 fields (400-500 total cells counted) in each experimental condition, (FIG. 4G), EphB4 silencing (sh774) induces the accumulation of the autophagy marker ATG5 in HT-29 cells. No ATG5 is induced after EphrinB2 silencing (sh427). (FIG. 4H), Pretreatment with spautin (5 μM; 4 hours) and 3-MA (10 mM) augments HT-29 cell proliferation inhibited by NVP-Iso (0.11-3 μM) at 72 hours; mean cpm/culture±SD (triplicate cultures). (FIG. 4I), spautin (5 μM) and (FIG. 4J), 3-MA (5 mM) reduce HT-29 cell death induced by NVP-Iso (0.5 μM) after 72 hours; representative profiles and quantitative results (bar graphs) of 3 independent experiments (FIG. 4I) or single (FIG. 4J) experiment (mean %±SD). Statistical significance of group differences by two-tailed Student's t-test. *P<0.05; **P<0.01.

Figure 5A:
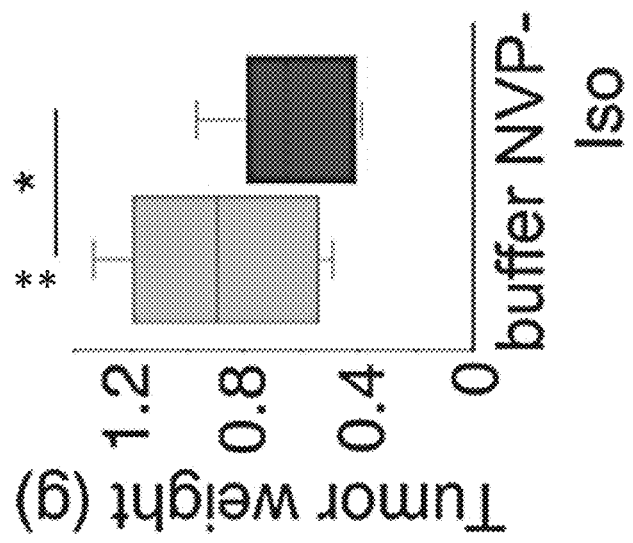
Figure 5B:
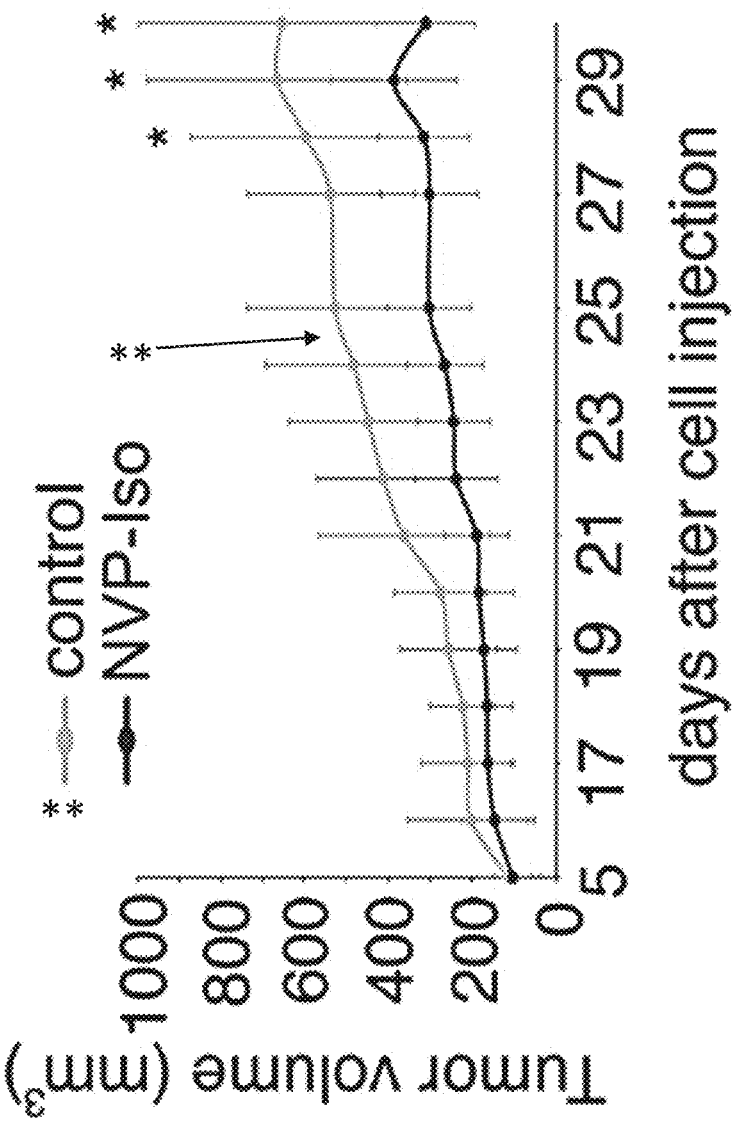
Figure 5C:
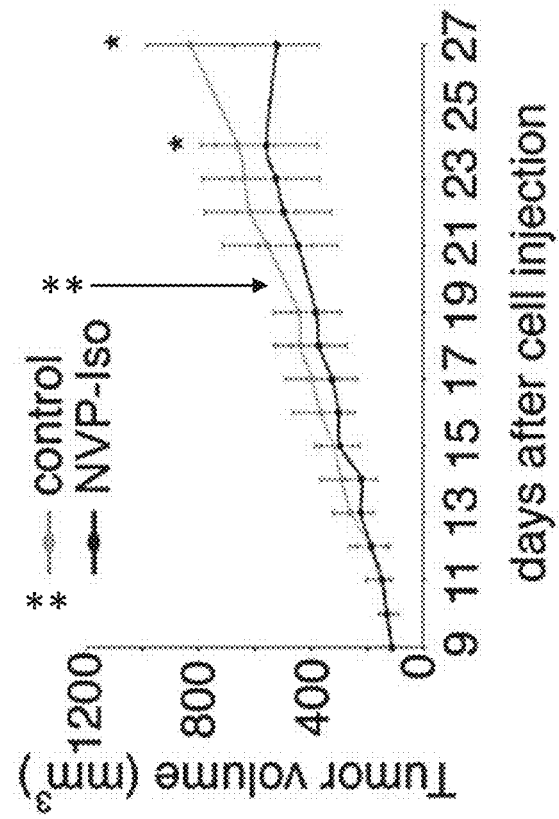
Figure 5D:
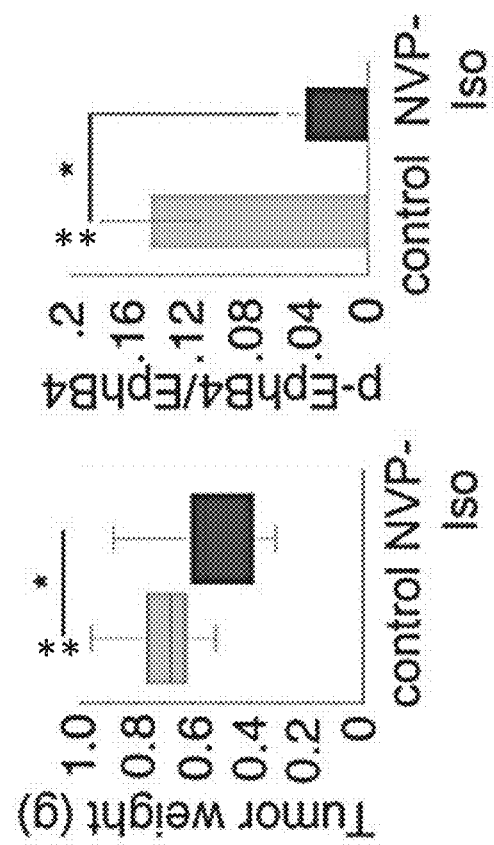
Figure 5E:
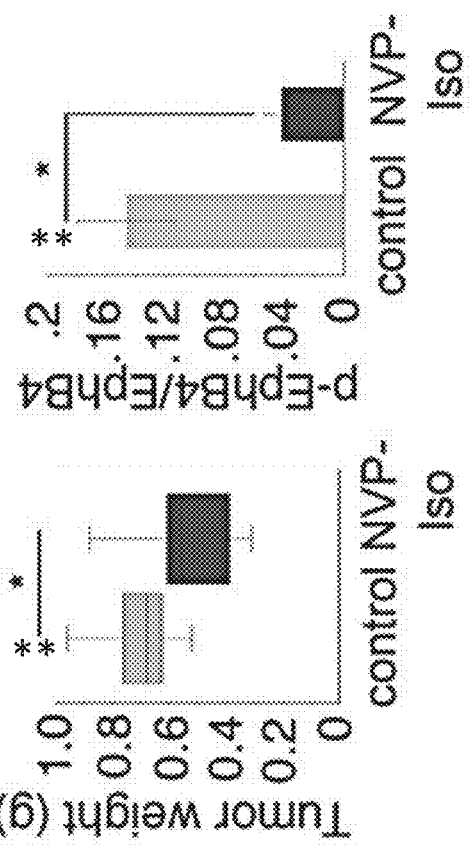

FIGS. 5A-5J. The Eph tyrosine kinase inhibitor NVP-Iso reduces colorectal cancer growth. (FIGS. 5A-5D), Colo 205 (FIGS. 5A, 5B) or HT-29 (FIGS. 5C, 5D) cells (10×10$^6$) were injected s.c. in nu/nu mice. When the average tumor volume reached 100 mm$^3$, mice (10/group) were randomized to receive daily i.p, injections of NVP-Iso (15 mg/kg) or vehicle only. Results show the average tumor volume (±SD) as a function of time from tumor cell injection (FIGS. 5A, 5C) and tumor weight after tumor harvest (FIGS. 5B, 5D). Tumor weight results are displayed as box-and-whisker plots; the horizontal line in the box reflects the median tumor weight. FIG. 5E, HT-29 tumor extracts from control or NVP-Iso-treated mice (experiment in panel D) were tested for tyrosine phosphorylated EphB4 and total EphB4 content. Results are expressed as the mean (±SD) ratio of tyrosine phosphorylated EphB4/total EphB4 (measured in pg from 50 μg tumor lysate; 10 drug-treated mice and 10 controls tested). (FIGS. 5F and 5G), cleaved caspase-3 (red) (FIG. 5F); CD31 (green) and Ki67 (red) (FIG. 5G) immunostaining of representative HT29 tumor sections from control and NVP-Iso-treated mice; cell nuclei (DAPI$^+$) are blue. Tumors were removed after completion of treatment (experiment in panel D). Boxed tumor areas (a and b) are magnified on the right of panel (FIG. 5G). Scale bars 1,000 μm (F and G); 200 μm (magnified panels in FIG. 5G). (FIGS. 5H-5J), quantitation of cleaved caspase-3$^+$ (FIG. 5H), Ki67$^+$ (FIG. 5I) and CD3$^+$ (FIG. 5J) immunostaining in control (n=5) and NVP-Iso-treated (n=5) tumors (experiment shown in FIGS. SC, 5D), Results are expressed as: mean % (±SD) cleaved caspase-3$^+$ tumor area; mean % (±SD) Ki67+ cell nuclei in tumor sections; and average (±SD) CD31$^+$ fluorescence intensity in tumor sections; *P<0.05.

Figure 6B:
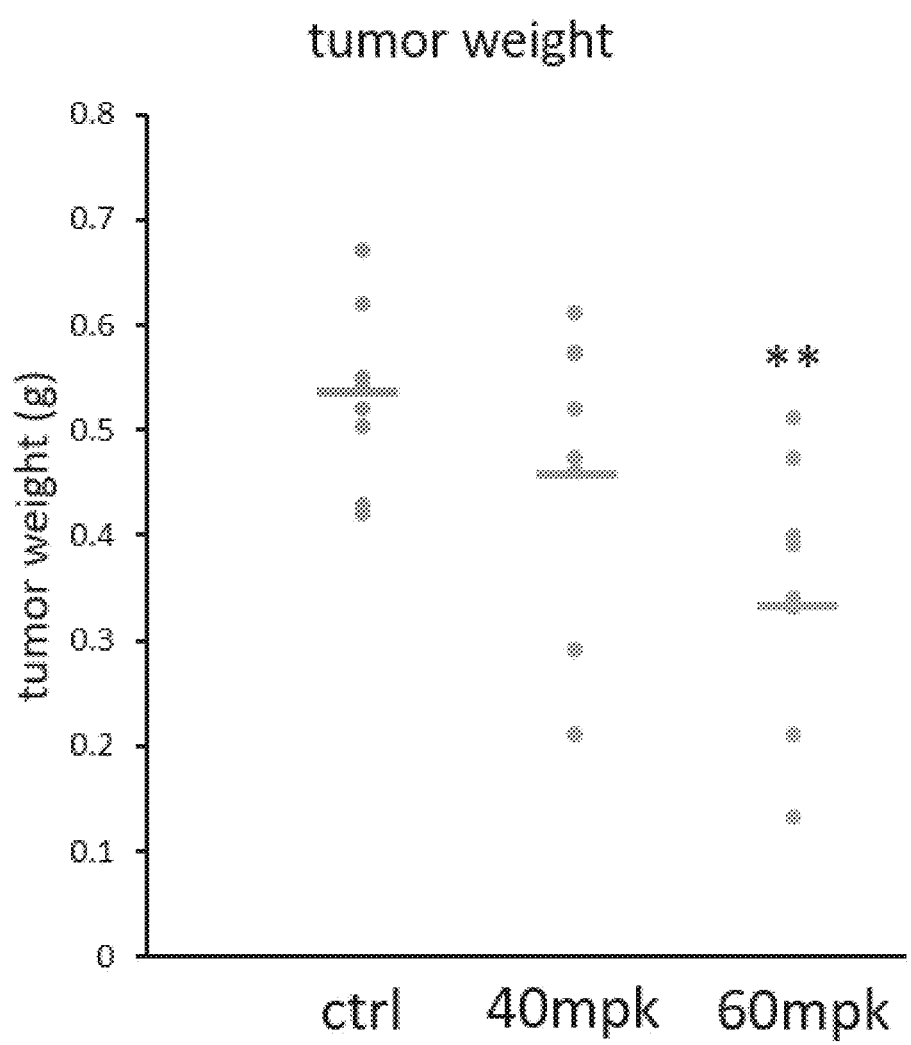

FIGS. 6A-6B. NVP reduces colorectal cancer growth in Colo 205 cells, Mice were administered NVP (40 mg/kg (mpk) or 60 mg/kg) or vehicle only. Results show the average tumor volume (±SD) as a function of time from tumor cell injection (FIG. 6A) and tumor weight after tumor harvest (FIG. 6B).

Figure 7A:
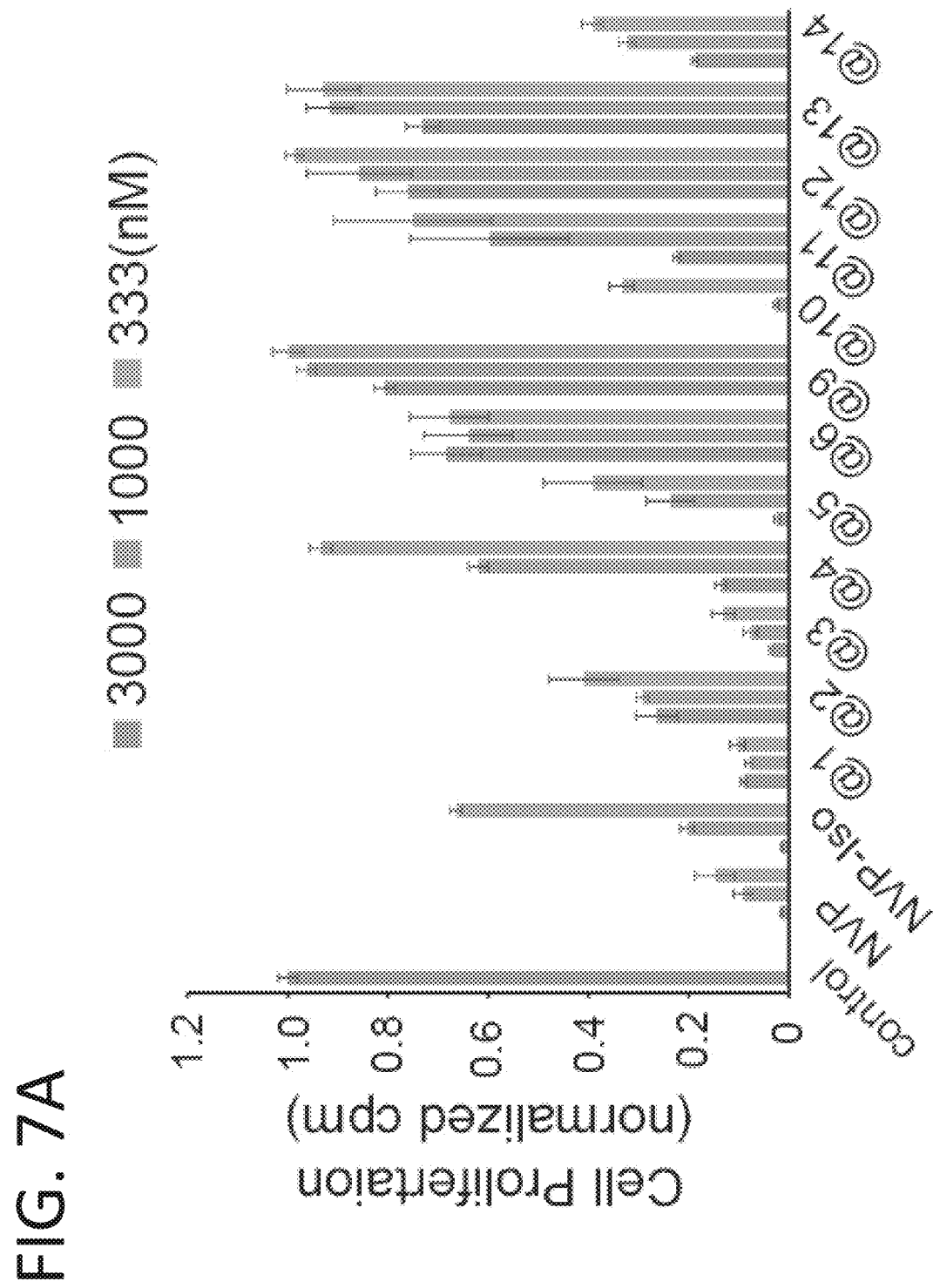
Figure 7B:
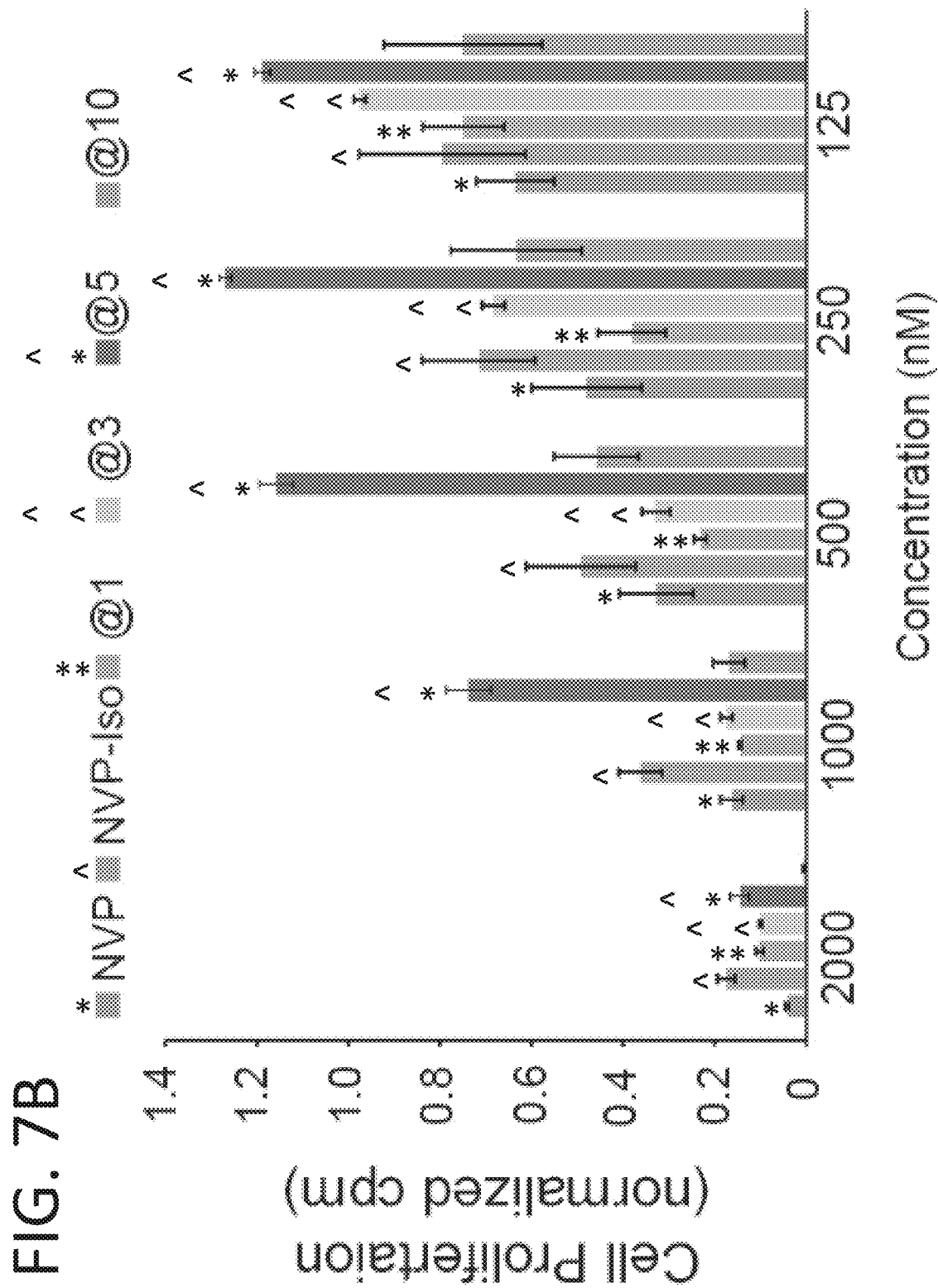

FIGS. 7A-7B. Effects of NVP derivatives on the proliferation of human colorectal carcinoma cells. NVP and derivatives were tested for their effect on the proliferation of colorectal carcinoma cells after 72 hours incubation. Proliferation was measured by $^3$H-thymidine incorporation; results of proliferation are expressed as normalized mean cpm±SEM. FIG. 7A, The 12 new compounds and the prototype compounds NVP and NVP-Iso were tested individually in HT29 cells at the concentrations of 3, 1 and 0.333 nM. FIG. 7B. Selected new compounds (@1, @3, @5 and @10) and prototypes were tested individually for their effects on the proliferation of HT29 colorectal carcinoma cells at 5 concentrations (range 2-0.125 nM).

Figure 8A:
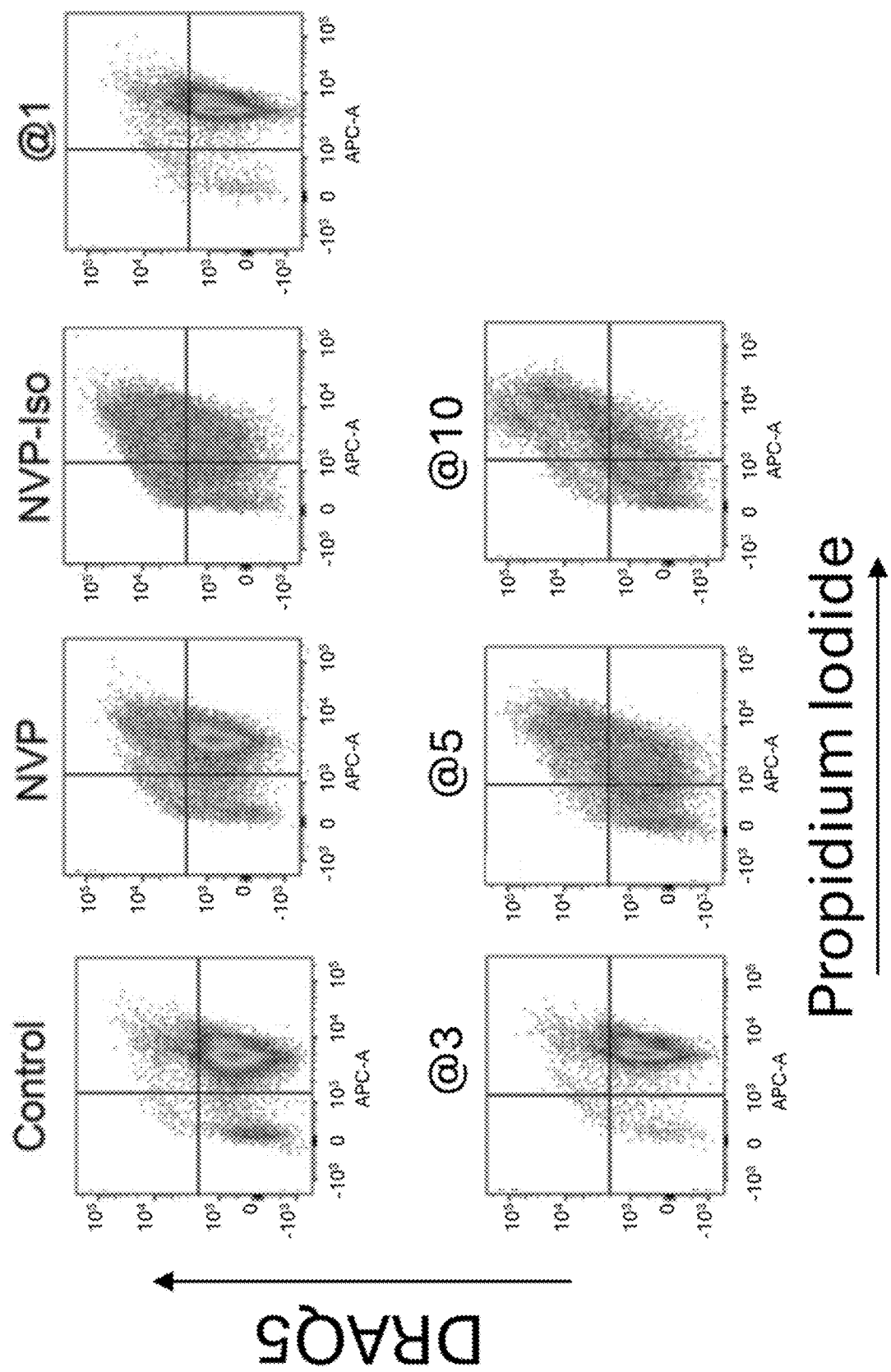
Figure 8A:
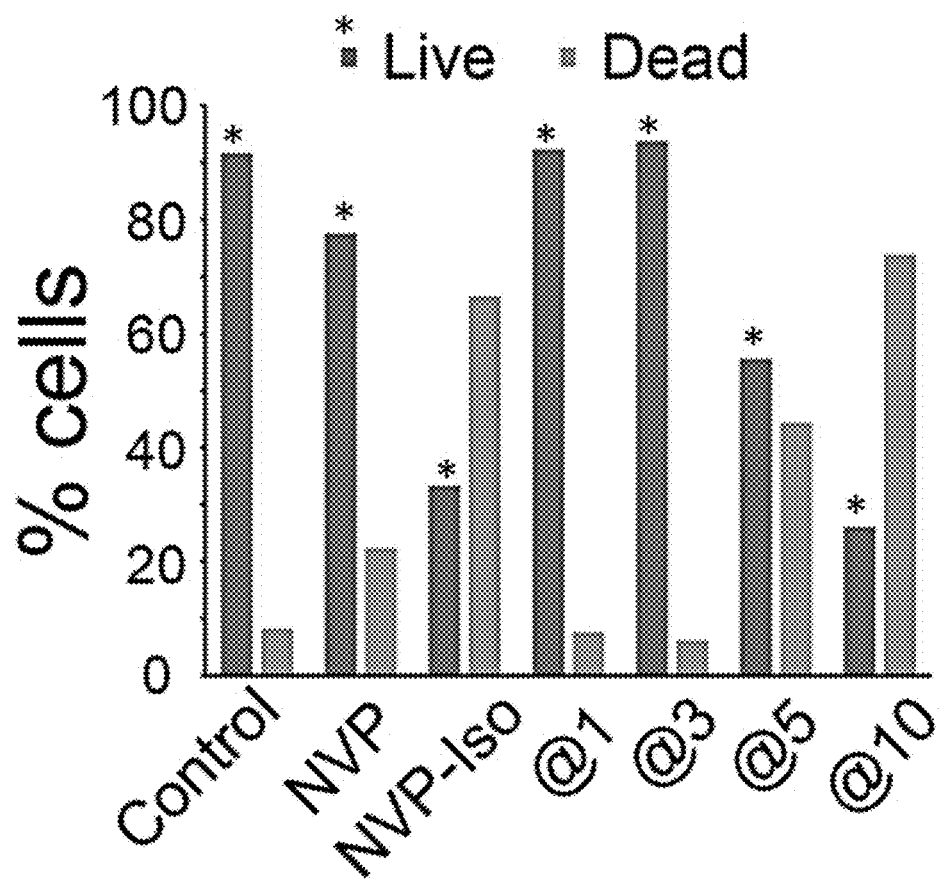
Figure 8C:
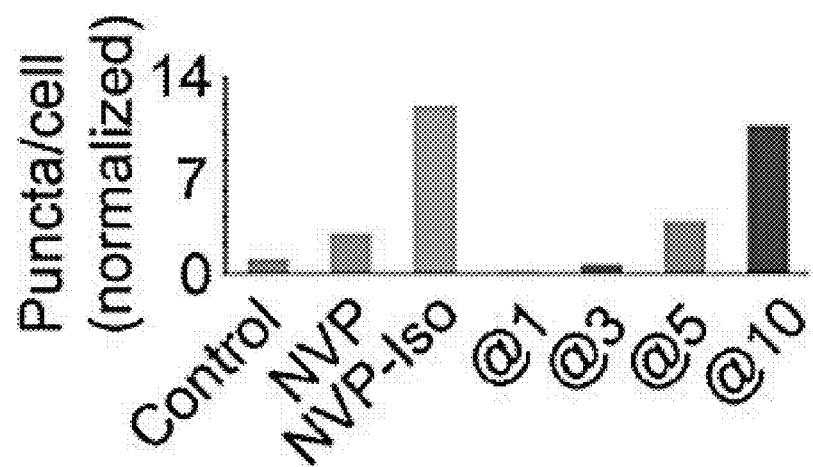
Figure 8D:
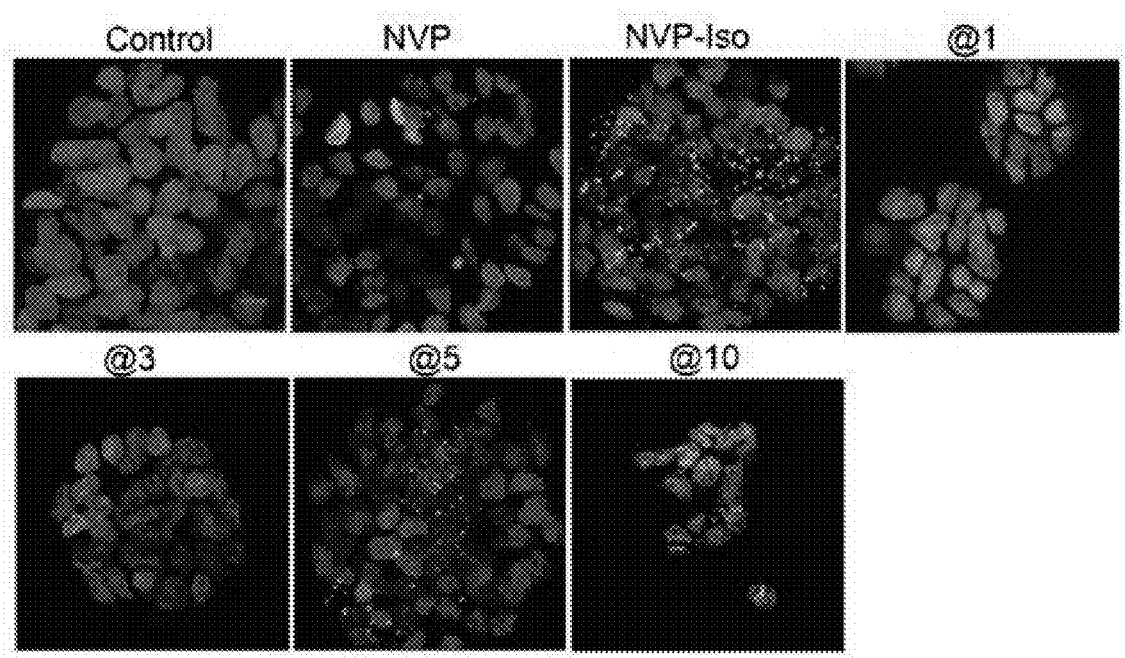
Figure 8E:
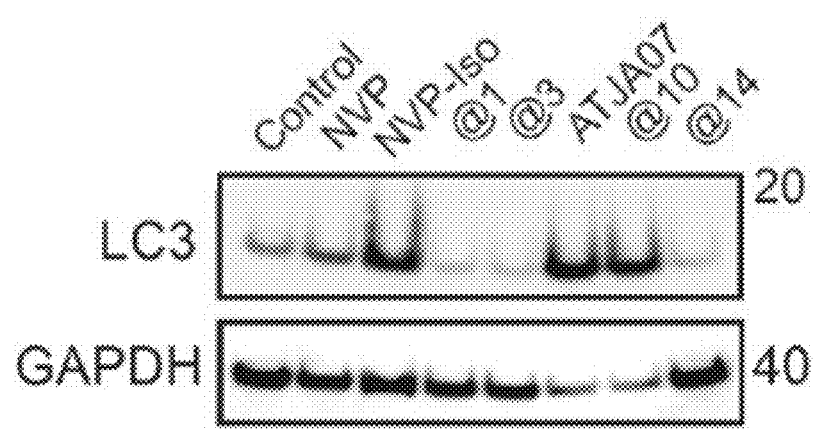

FIGS. 8A-8F. Effects of NVP derivatives on the viability of human colorectal carcinoma cells. FIG. 8A. Analysis of SW620 colorectal cancer cell viability by flow cytometry after staining with DRAQ5/PI. Representative profiles (left); quantification in the bar graph (right); means±SD of triplicate experiments. FIG. 8B. Confocal microscopy analysis of intracellular cleaved caspase-3 (green) in SW620 cells after immunofluorescence staining with specific antibody. Representative images (left); quantification in the bar graph (right) reflects the proportion of cells containing cleaved caspase-3 after imaging of 300-500 DAPI cells/sample using CellProfiler. FIG. 8C. Quantitative results reflect the mean number of puncta/cell (300-500 total DAPI$^+$ cells/3 fields;

CellProfiler). FIG. 8D. Autophagosomes are identified as "puncta" in HT-29 cells transduced with a fluorescent-LC3 vector. Fluorescent autophagosomes induced in HT29 cells by NVP and derivative compounds after 72 hours incubation; representative confocal images (63×); scale bar 10 μm. FIG. 8E. NVP and derivatives induce the autophagy marker protein LC3B in HT-29 cells. Immunoblotting of HT29 cell lysates. FIG. 8F. Flow cytometry analysis of cell distribution in the $G_0G_1$, S and G2M phases of cell cycle. All experiments in this figure reflect colorectal cancer cells (SW620) incubated (72 hours) in the presence of the indicated compounds (104). Representative profiles (left) and quantification in the bar graph (right); the results are expressed as % cells in the indicated cell cycle phase, G ($G_0G_1$), S, and G2(G2M).

FIG. 9. Summary results of the effects of prototypes and new compounds on the proliferation of seven human colorectal cancer cell lines. The results are expressed as mean $IC_{50}$ calculated from five-point proliferation assays from three independent experiments across seven cell lines.

FIG. 10. Effects of prototype NVP and derivative new compounds on the endogenous phosphorylation of EphB4, EphB2 and EphA2 in colorectal cancer cells. Phosphorylation of pEphB4, EphB2 and EphA2 was measured by ELISA in cell lysates of HT29 (EphB4), RKO (EphA2) and Colo-205 (EphB2) cell lines. The cells were treated with each individual compound for four hours prior to lysis; 10 μg of cell lysate was tested in duplicate. The results reflect the mean $IC_{50}$±SEM calculated from three independent experiments.

FIG. 11. General synthesis schemes for compound precursors.

FIG. 12. Synthesis of certain compounds.

FIGS. 13-14. Synthesis of certain 5-pyrazolopyritnidine compounds.

Figure 15:
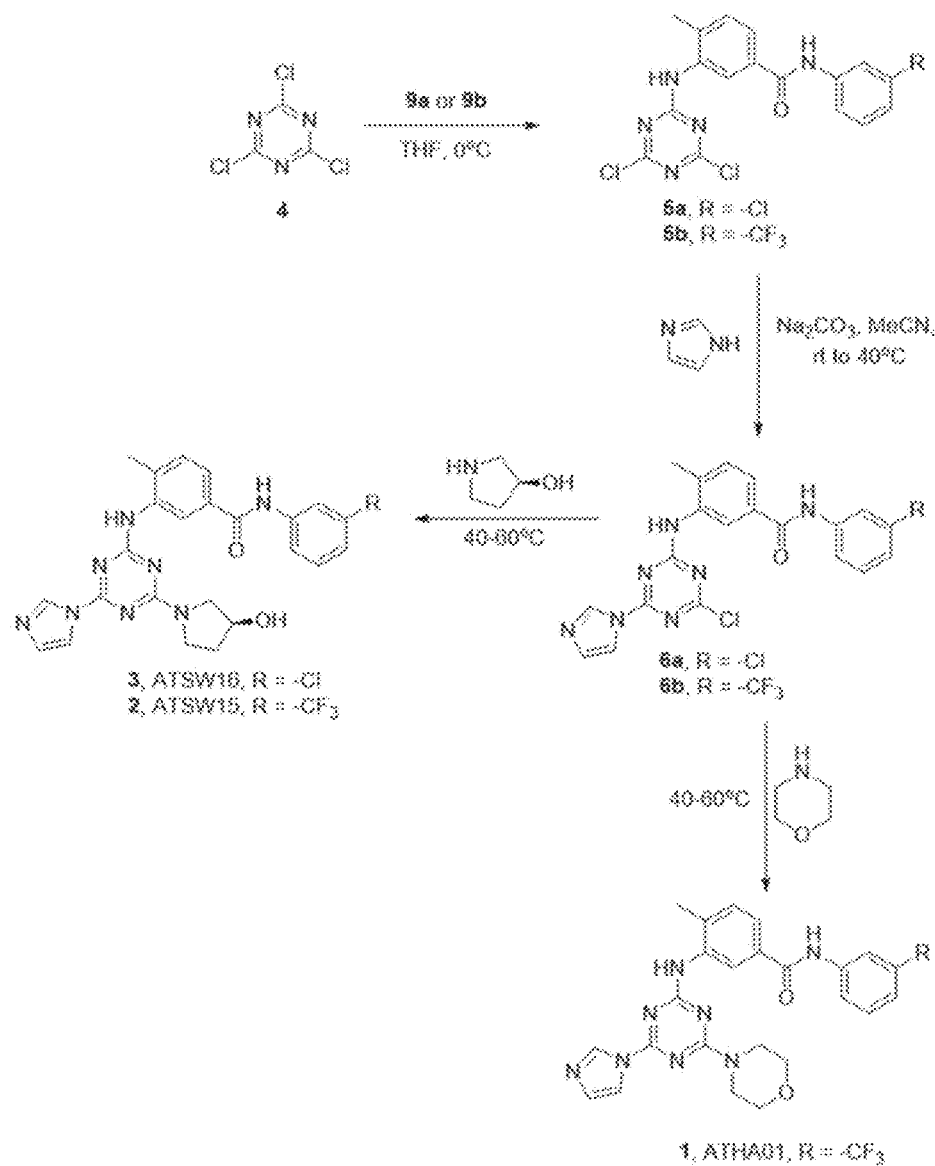

FIG. 15. Synthesis of certain triazine compounds.

Figure 16:
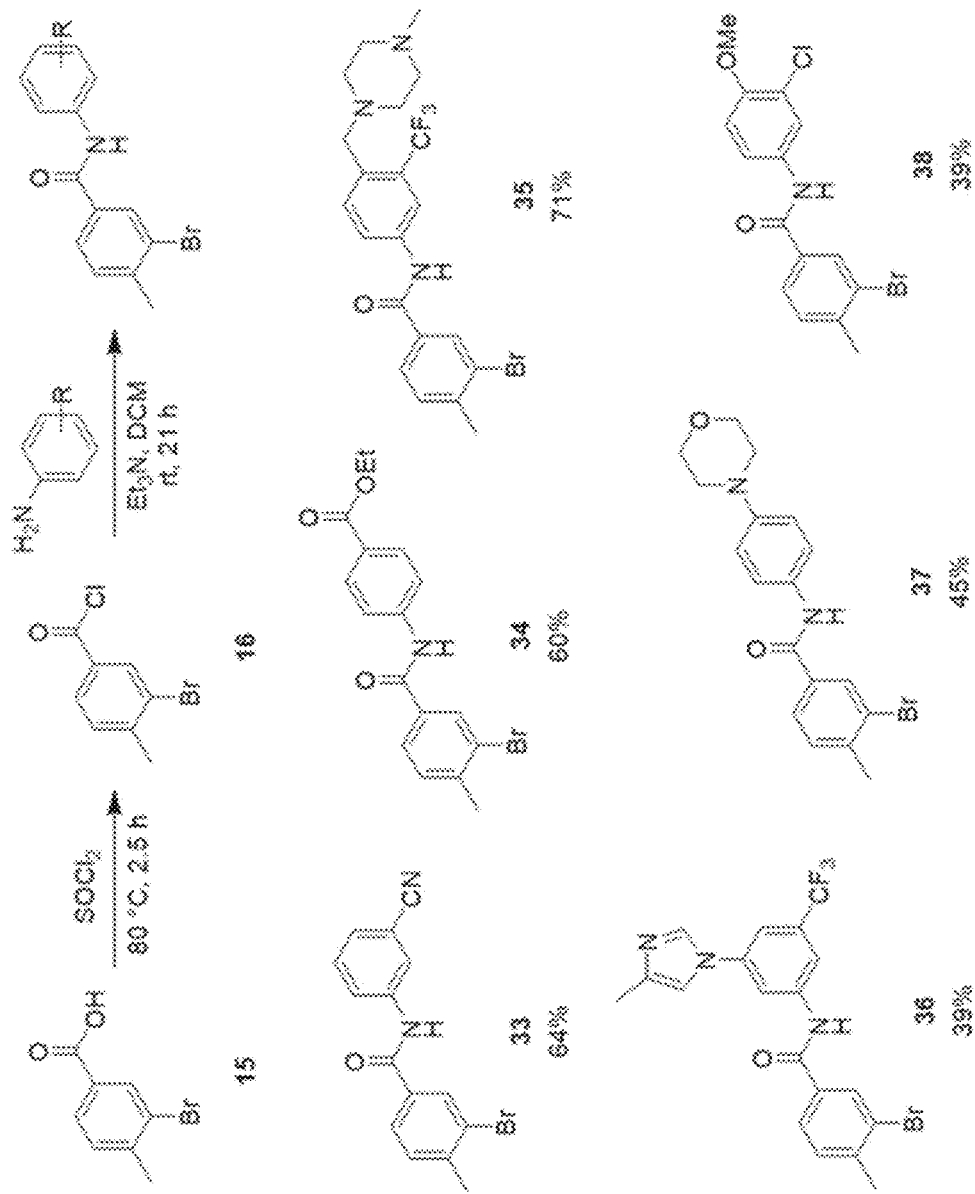

FIG. 16. Synthesis of phenyibenzamide precursors.

Figure 17:
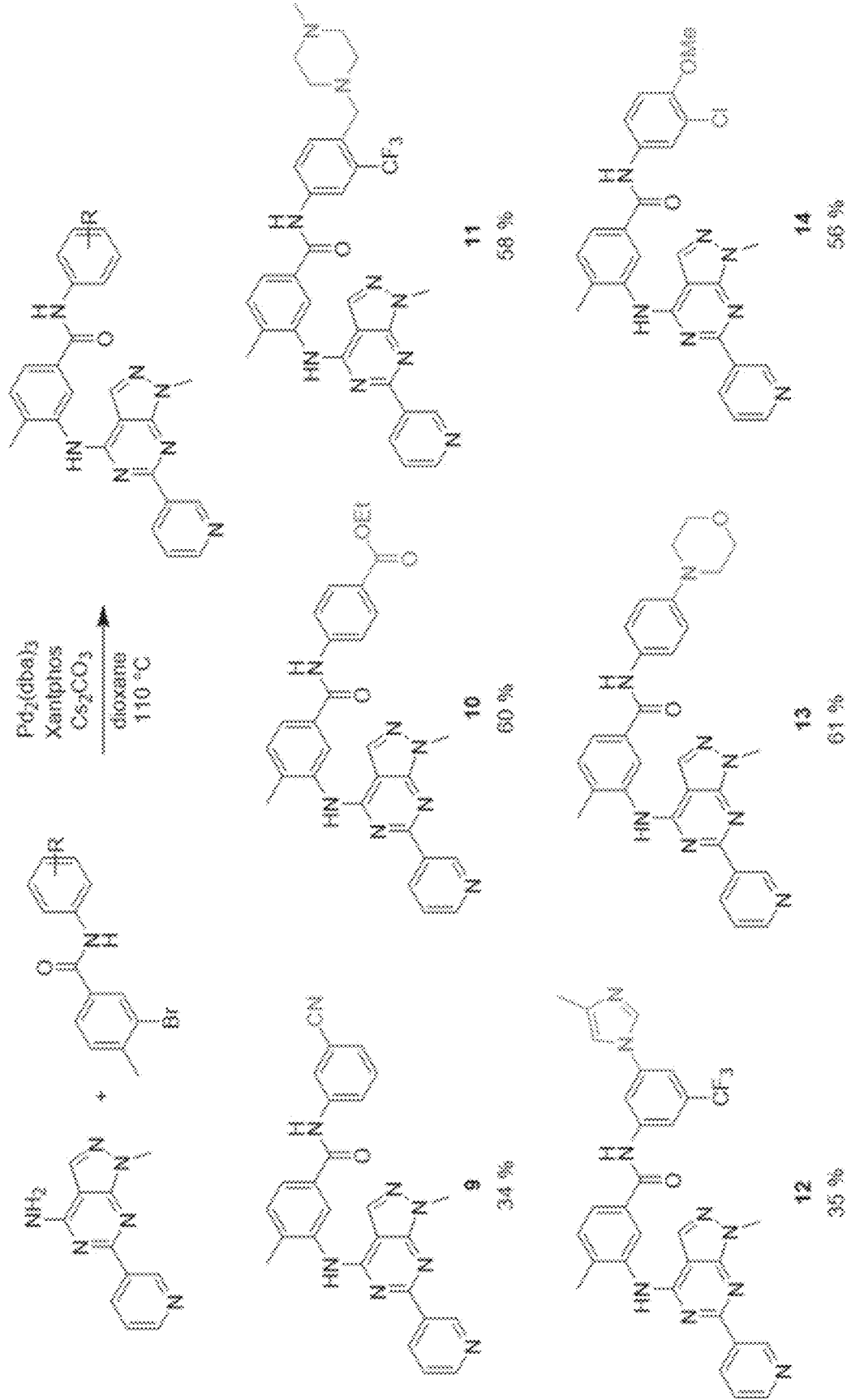

FIG. 17. Synthesis of certain pyrazolopyrimidine compounds.

DETAILED DESCRIPTION OF SEVERAL EMBODIMENTS

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr, (ed.), *Hawley's Condensed Chemical Dictionary*, published by John Wiley & Sons, Inc., 2016 (ISBN 978-1-118-13515-0). The presently disclosed compounds also include all isotopes of atoms present in the compounds, which can include, but are not limited to, deuterium, tritium, $^{18}F$, $^{14}C$, etc. Definitions of common terms in molecular biology may be found in Benjamin Lewin, *Genes VII*, published by Oxford University Press, 2000 (ISBN 019879276X); Kendrew et al., (eds.), *The Encyclopedia of Molecular Biology*, published by Blackwell Publishers, 1994 (ISBN 0632021829); and Robert A. Meyers (ed.), *Molecular Biology and Biotechnology: a Comprehensive Desk Reference*, published by Wiley, John & Sons, Inc., 1995 (ISBN 0471186341); and other similar references.

In order to facilitate review of the various embodiments of the disclosure, the following explanations of specific terms are provided:

"Acyl" refers to a group having the structure —C(O)R, where R may be, for example, optionally substituted alkyl, optionally substituted aryl, or optionally substituted heteroaryl. "Lower acyl" groups are those that contain one to six carbon atoms.

"Acyloxy" refers to a group having the structure —OC(O)R—, where R may be, for example, optionally substituted alkyl, optionally substituted aryl, or optionally substituted heteroaryl. "Lower acyloxy" groups contain one to six carbon atoms.

Aliphatic: A substantially hydrocarbon-based compound, or a radical thereof (e.g., $C_6H_{13}$, for a hexane radical), including alkanes, alkenes, alkynes, including cyclic versions thereof, and further including straight- and branched-chain arrangements, and all stereo and position isomers as well. Unless expressly stated otherwise, an aliphatic group contains from one to twenty-five carbon atoms; for example, from one to fifteen, from one to ten, from one to six, or from one to four carbon atoms. The term "lower aliphatic" refers to an aliphatic group containing from one to ten carbon atoms. An aliphatic chain may be substituted or unsubstituted. Unless expressly referred to as an "unsubstituted aliphatic," an aliphatic group can either be unsubstituted or substituted. An aliphatic group can be substituted with one or more substituents (up to two substituents for each methylene carbon in an aliphatic chain, or up to one substituent for each carbon of a —C=C— double bond in an aliphatic chain, or up to one substituent for a carbon of a terminal methine group). Exemplary substituents include, but are not limited to, alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, oxo, sulfonamide, sulfhydryl, thioalkoxy, or other functionality.

Alkyl: A hydrocarbon group having a saturated carbon chain. The chain may be cyclic, branched or unbranched. Examples, without limitation, of alkyl groups include methyl, ethyl, propyl, butyl, pentyl, hexyl, heptyl, octyl, nonyl and decyl. The term lower alkyl means the chain includes 1-10 carbon atoms. The terms alkenyl and alkynyl refer to hydrocarbon groups having carbon chains containing one or more double or triple bonds, respectively.

The term "alkoxy" refers to a straight, branched or cyclic hydrocarbon configuration and combinations thereof, including from 1 to 20 carbon atoms, preferably from 1 to 8 carbon atoms (referred to as a "lower alkoxy"), more preferably from 1 to 4 carbon atoms, that include an oxygen atom at the point of attachment. An example of an "alkoxy group" is represented by the formula OR, where R can be an alkyl group, optionally substituted with an alkenyl, alkynyl, aryl, aralkyl, cycloalkyl, halogenated alkyl, alkoxy or heterocycloalkyl group. Suitable alkoxy groups include methoxy, ethoxy, n-propoxy, i-propoxy, n-butoxy, i-butoxy, sec-butoxy, tert-butoxy cyclopropoxy, cyclohexyloxy, and the like.

"Alkoxycarbonyl" refers to an alkoxy substituted carbonyl radical, —C(O)OR, wherein R represents an optionally substituted alkyl, aryl, aralkyl, cycloalkyl cycloalkylalkyl or similar moiety.

A monovalent aromatic carbocyclic group of, unless specified otherwise, from 6 to 15 carbon atoms having a single ring (e.g., phenyl) or multiple condensed rings in which at least one ring is aromatic (e.g., quinoline, indole, benzodioxole, and the like), provided that the point of attachment is through an atom of an aromatic portion of the aryl group and the aromatic portion at the point of attachment contains only carbons in the aromatic ring. If any aromatic ring portion contains a heteroatom, the group is a heteroaryl and not an aryl. Aryl groups are monocyclic, bicyclic, tricyclic or tetracyclic.

The term "carboxylate" or "carboxyl" refers to the group —COO⁻ or —COOH The carboxyl group can form a carboxylic acid. "Substituted carboxyl" refers to —COOR where R is alkyl, alkenyl, alkynyl, aryl, aralkyl, cycloalkyl, halogenated alkyl, or heterocycloalkyl group. For example, a substituted carboxyl group could be a carboxylic acid ester or a salt thereof (e.g., a carboxylate).

The term "co-administration" or "co-administering" refers to administration of a compound disclosed herein with at least one other therapeutic agent or therapy within the same general time period, and does not require administration at the same exact moment in time (although co-administration is inclusive of administering at the same exact moment in time). Thus, co-administration may be on the same day or on different days, or in the same week or in different weeks. In some embodiments, the co-administration of two or more agents or therapies is concurrent. In other embodiments, a first agent/therapy is administered prior to a second agent/therapy. Those of skill in the art understand that the formulations and/or routes of administration of the various agents or therapies used may vary. The appropriate dosage for co-administration can be readily determined by one skilled in the art. In some embodiments, when agents or therapies are co-administered, the respective agents or therapies are administered at lower dosages than appropriate for their administration alone. Thus, co-administration is especially desirable in embodiments where the co-administration of the agents or therapies lowers the requisite dosage of a potentially harmful (e.g., toxic) agent and/or lowers the frequency of administering the potentially harmful (e.g., toxic) agent. "Co-administration" or "co-administering" encompass administration of two or more active agents to a subject so that both the active agents and/or their metabolites are present in the subject at the same time. Co-administration includes simultaneous administration in separate compositions, administration at different times in separate compositions, or administration in a composition in which two or more active agents are present.

Cycloaliphatic: A saturated or unsaturated monovalent cyclic hydrocarbon radical of three to seven ring carbons, e.g., cyclopropyl, cyclobutyl, cyclopentyl, cyclohexyl, cyclohexenyl, and the like.

Excipient: A physiologically inert substance that is used as an additive in a pharmaceutical composition. As used herein, an excipient may be incorporated within particles of a pharmaceutical composition, or it may be physically mixed with particles of a pharmaceutical composition. An excipient can be used, for example, to dilute an active agent and/or to modify properties of a pharmaceutical composition. Examples of excipients include but are not limited to polyvinylpyrrolidone (PVP), tocopheryl polyethylene glycol 1000 succinate (also known as vitamin E TPGS, or TPGS), dipalmitoyl phosphatidyl choline (DPPC), trehalose, sodium bicarbonate, glycine, sodium citrate, and lactose.

Heteroaliphatic: An aliphatic compound or group having at least one heteroatom and at least one carbon atom, i.e., one or more carbon atoms has been replaced with an atom having at least one lone pair of electrons, typically nitrogen, oxygen, phosphorus, or sulfur Heteroaliphatic compounds or groups may be substituted or unsubstituted, branched or unbranched, cyclic or acyclic, and include "heterocycle", "heterocyclyl", "heterocycloaliphatic", or "heterocyclic" groups. A heteroaliphatic group or substituent binds to the molecule via a carbon atom.

Heteroaryl: An aromatic compound or group having at least one heteroatom. i.e., one or more carbon atoms in the ring has been replaced with an atom having at least one lone pair of electrons, typically nitrogen, oxygen, phosphorus, silicon, or sulfur.

"N-heterocyclic" refers to mono or bicyclic rings or ring systems that include at least one nitrogen heteroatom. The rings or ring systems generally include 1 to 9 carbon atoms in addition to the heteroatom(s) and may be saturated, unsaturated or aromatic (including pseudoaromatic). The term "pseudoaromatic" refers to a ring system which is not strictly aromatic, but which is stabilized by means of delocalization of electrons and behaves in a similar manner to aromatic rings. Aromatic includes pseudoaromatic ring systems, such as pyrrolyl rings.

Examples of 5-membered monocyclic N-heterocycles include pyrrolyl, H-pyrrolyl, pyrrolinyl, pyrrolidinyl, oxazolyl, oxadiazolyl, (including 1,2,3 and 1,2,4 oxadiazolyls) isoxazolyl, furazanyl, thiazolyl, isothiazolyl, pyrazolyl, pyrazolinyi, pyrazolidinyl, imidazolyl, inndazolinyl, triazolyl (including 1,2,3 and 1,3,4 triazolyls), tetrazolyl, thiadiazolyl (including 1,2,3 and 1,3,4 thiadiazolyls), and dithiazolyl. Examples of 6-membered monocyclic N-heterocycles include pyridyl, pyrimidinyl, pyridazinyl, pyrazinyl, piperidinyl, morpholinyl, thiomorpholinyl, piperazinyl, and triazinyl. The heterocycles may be optionally substituted with a broad range of substituents, and preferably with $C_{1-6}$ alkyl, $C_{1-6}$ alkoxy, $C_{2-6}$ alkenyl, $C_{2-6}$ alkynyl, halo, hydroxy, mercapto, trifluoromethyl, amino, cyano or mono or di($C_{1-6}$alkyl)amino. The N-heterocyclic group may be fused to a carbocyclic ring such as phenyl, naphthyl, indenyl, azulenyl, fluorenyl, and anthracenyl.

Pharmaceutically acceptable: A substance that can be taken into a subject without significant adverse toxicological effects on the subject. The term "pharmaceutically acceptable form" means any pharmaceutically acceptable derivative or variation, such as stereoisomers, stereoisomer mixtures, enantiomers, solvates, hydrates, isomorphs, polymorphs, pseudomorphs, neutral forms, salt forms, and prodrug agents.

Pharmaceutically acceptable carrier: The pharmaceutically acceptable carriers (vehicles) useful in this disclosure are conventional. *Remington: The Science and Practice of Pharmacy*, The University of the Sciences in Philadelphia, Editor, Lippincott, & Wilkins, Philadelphia, PA, 21$^{st}$ Edition (2005), describes compositions and formulations suitable for pharmaceutical delivery of one or more therapeutic compositions and additional pharmaceutical agents. In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. In some examples, the pharmaceutically acceptable carrier may be sterile to be suitable for administration to a subject (for example, by parenteral, intramuscular, or subcutaneous injection). In addition to biologically neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate. In some examples, the pharmaceutically acceptable carrier is a non-naturally occurring or synthetic carrier. The carrier also can be formulated in a unit-dosage form that carries a preselected therapeutic dosage of the active agent, for example in a pill, vial, bottle, or syringe.

Pharmaceutically acceptable salt: A biologically compatible salt of a compound that can be used as a drug, which salts are derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, tartrate, mesylate, acetate, maleate, oxalate, and the like. Pharmaceutically acceptable acid addition salts are those salts that retain the biological effectiveness of the free bases while formed by acid partners that are not biologically or otherwise undesirable, e.g., inorganic acids such as hydrochloric acid, hydrobromic acid, sulfuric acid, nitric acid, phosphoric acid, and the like, as well as organic acids such as acetic acid, trifluoroacetic acid, propionic acid, glycolic acid, pyruvic acid, oxalic acid, maleic acid, malonic acid, succinic acid, fumaric acid, tartaric acid, citric acid, benzoic acid, benzene sulfonic acid (besylate), cinnamic acid, mandelic acid, methanesulfonic acid, ethanesulfonic acid, p-toluenesulfonic acid, salicylic acid and the like. Pharmaceutically acceptable base addition salts include those derived from inorganic bases such as sodium, potassium, lithium, ammonium, calcium, magnesium, iron, zinc, copper, manganese, aluminum salts and the like. Exemplary salts are the ammonium, potassium, sodium, calcium, and magnesium salts. Salts derived from pharmaceutically acceptable organic non-toxic bases include, but are not limited to, salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, 2-dimethylaminoethanol, 2-diethylaminoethanol, dicyclohexylamine, lysine, arginine, histidine, caffeine, procaine, hydrabamine, choline, betaine, ethylenediamine, glucosamine, methylglucamine, theobromine, purines, piperazine, piperidine, N-ethylpiperidine, polyamine resins, and the like. Exemplary organic bases are isopropylamine, diethylamine, ethanolamine, trimethylamine, dicyclohexylamine, choline, and caffeine. (See, for example, S. M. Et al., et al., "Pharmaceutical Salts," J. Pharm. Sci., 1977; 66:1-19, which is incorporated herein by reference.)

Stereoisomers: isomers that have the same molecular formula and sequence of bonded atoms, but which differ only in the three-dimensional orientation of the atoms in space.

Subject: An animal (human or non-human) subjected to a treatment, observation or experiment.

Substituted: A fundamental compound, such as an aryl or aliphatic compound, or a radical thereof, having coupled thereto one or more substituents, each substituent typically replacing a hydrogen atom on the fundamental compound. The substituents may be selected, for example, from $C_{1-6}$alkyl, $C_{2-6}$alkenyl, $C_{2-6}$alkynyl, $C_{3-8}$cycloalkyl, hydroxyl, oxo, $C_{1-6}$alkoxy, aryloxy, $C_{1-6}$alkoxyaryl, halo, $C_{1-6}$alkylhalo (such as $CF_3$ and $CHF_2$), $C_{1-6}$alkoxyhalo (such as $OCF_3$ and $OCH_2$), carboxyl, esters, cyano, nitro, amino, substituted amino, disubstituted amino, acyl, ketones, amides, aminoacyl, substituted amides, disubstituted amides, thiol, alkylthio, thioxo, sulfates, sulfonates, sulfinyl, substituted sulfonyl, sulfonyl, substituted sulfonyl, sulfonylamides, substituted sulfonamides, disubstituted sulfonamides, aryl, ar$C_{1-6}$alkyl, heterocyclyl and heteroaryl wherein each alkyl, alkenyl, alkynyl, cycloalkyl, aryl and heterocyclyl and groups containing them may be further optionally substituted. A person of ordinary skill in the art will recognize that compounds disclosed herein may be described with reference to particular structures and substituents coupled to such structures, and that such structures and/or substituents also can be further substituted, unless expressly stated otherwise or context dictates otherwise. Solely by way of example and without limitation, a substituted aryl compound may have an aliphatic group coupled to the closed ring of the aryl base, such as with toluene. Again, solely by way of example and without limitation, a long-chain hydrocarbon may have a hydroxyl group bonded thereto.

If a group R is depicted as "floating" on a ring system, as for example in the group:

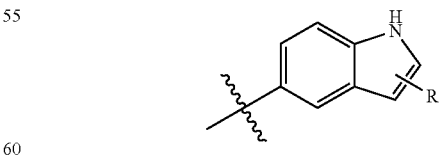

then, unless otherwise defined, a substituent R can reside on any atom of the ring system, so long as a stable structure is formed that conforms to standard valence conditions as understood by a person of ordinary skill in the art. In the example depicted, the R group can reside on an atom in either the 5-membered or the 6-membered ring of the indolyl ring system, including the heteroatom by replacing the explicitly recited hydrogen, but excluding the atom carrying the bond with the "⁀" symbol and any bridging carbon atoms.

Tautomers: Constitutional isomers of organic compounds that differ only in the position of the protons and electrons and are interconvertible by migration of a hydrogen atom. Tautomers ordinarily exist together in equilibrium.

Therapeutically effective amount or dose: An amount sufficient to provide a beneficial, or therapeutic, effect to a subject or a given percentage of subjects.

Therapeutic modality: A therapeutic method or agent for treating a disorder.

Thiol: A functional group with the for —SH.

Treating or treatment: With respect to disease, either term includes (1) preventing the disease, e.g., causing the clinical symptoms of the disease not to develop in an animal that may be exposed to or predisposed to the disease but does not yet experience or display symptoms of the disease, (2) inhibiting the disease, e.g., arresting the development of the disease or its clinical symptoms, or (3) relieving the disease, e.g., causing regression of the disease or its clinical symptoms.

The above definitions and the following general formulas are not intended to include impermissible substitution patterns (e.g., methyl substituted with 5 fluoro groups). Such impermissible substitution patterns are easily recognized by a person having ordinary skill in the art.

Unless otherwise specified, any of the groups referred to herein may be optionally substituted by at least one, possibly two or more, substituents as defined herein. That is, a substituted group has at least one, possible two or more, substitutable hydrogens replaced by a substituent or substituents as defined herein, unless the context indicates otherwise, or a particular structural formula precludes substitution.

A person of ordinary skill in the art will appreciate that compounds may exhibit the phenomena of tautomerism, conformational isomerism, geometric isomerism, and/or optical isomerism. As the various compound names, formulae and compound drawings within the specification and claims can represent only one of the possible tautomeric, conformational isomeric, optical isomeric, or geometric isomeric forms, a person of ordinary skill in the art will appreciate that the disclosed compounds encompass any tautomeric, conformational isomeric, optical isomeric, and/or geometric isomeric forms of the compounds described herein, as well as mixtures of these various different isomeric forms. Compounds and compositions may be provided as individual pure enantiomers or as stereoisomeric mixtures, including racemic mixtures. In certain embodiments the compounds disclosed herein are synthesized in or are purified to be in substantially enantiopure form, such as in a 90% enantiomeric excess, a 95% enantiomeric excess, a 97% enantiomeric excess or even in greater than a 99% enantiomeric excess, such as in enantiopure form.

In any embodiments, any or all hydrogens present in the compound, or in a particular group or moiety within the compound, may be replaced by a deuterium or a tritium. Thus, a recitation of alkyl includes deuterated alkyl, where from one to the maximum number of hydrogens present may be replaced by deuterium. For example, ethyl may be $C_2H_5$ or $C_2H_5$ where from 1 to 5 hydrogens are replaced by deuterium, such as in $C_2D_xF_{5-x}$.

II. Compounds

One embodiment disclosed herein is a compound, stereoisomer, tautomer, or pharmaceutically acceptable salt thereof according to Formula I:

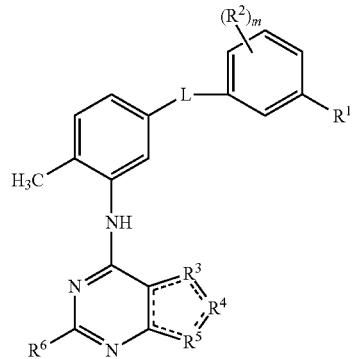

wherein:
each bond represented by "⎯⎯" is a single or double bond as needed to satisfy valence requirements;
m is 0, 1, 2, or 3;
L is —C(O)—N(H)—, —N(H)—C(O)—, —S(O)$_2$—N(H)—, or

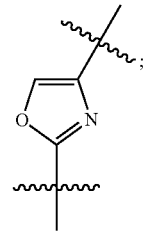 [SMILES: *c1coc(*)n1]

$R^1$ is H, substituted or unsubstituted $C_1$-$C_5$ aliphatic, halo, substituted or unsubstituted $C_2$-$C_5$ heteroaliphatic, —N($R^a$)$_2$, hydroxyl, thiol, substituted or unsubstituted cycloaliphatic, substituted or unsubstituted cycloheteroaliphatic, substituted or unsubstituted aryl, or substituted or unsubstituted heteroaryl;

each $R^2$ independently is substituted or unsubstituted $C_1$-$C_5$ aliphatic, halo, substituted or unsubstituted $C_2$-$C_5$ heteroaliphatic, substituted or unsubstituted $C_1$-$C_5$ alkoxy, substituted or unsubstituted alkoxycarbonyl, hydroxyl, thiol, cyano, substituted or unsubstituted cycloaliphatic, substituted or unsubstituted cycloheteroaliphatic, substituted or unsubstituted aryl, or substituted or unsubstituted heteroaryl;

$R^3$ is —C($R^b$)— or —C($R^b$)$_2$—, and $R^4$-$R^5$ independently are —N— or —N($R^b$)—, provided at least one of $R^4$-$R^5$ is —N($R^b$)— where $R^b$ is other than H;

each $R^a$ independently is H or substituted or unsubstituted $C_1$-$C_5$ aliphatic;

each $R^b$ independently is H, halo, substituted or unsubstituted $C_1$-$C_5$ aliphatic, substituted or unsubstituted $C_7$-$C_5$ heteroaliphatic, substituted or unsubstituted aryl, substituted or unsubstituted heteroaryl, —N($R^a$)$_2$, hydroxyl, or thiol; and $R^6$ is a N-heteroaryl or substituted amido ($R^a$)$_2$NC(O)— where at least one $R^a$ is not H).

In some embodiments, L is —C(O)—N(H)— or —N(H)—C(O)—, particularly —C(O)—(H)—. In certain embodiments, the compound has a structure according to Formula IA:

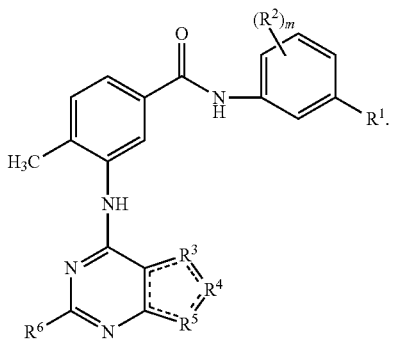

(IA)

With respect to formulas I and IA:

In certain embodiments, m is 0.

In certain embodiments, $R^1$ is a halo-substituted $C_1$-$C_3$ aliphatic, particularly —$CF_3$.

In certain embodiments, $R^1$ is a halo.

In certain embodiments, $R^1$ is H and m is 1.

In certain embodiments, $R^1$ is a halo-substituted $C_1$-$C_5$ aliphatic, particularly —$CF_3$, and m is 1.

In certain embodiments, $R^2$ is alkoxycarbonyl, cyano, N-heterocyclic, alkoxy, $C_1$-$C_5$ aliphatic, halo-substituted $C_1$-$C_5$ aliphatic, halo, hydroxy-substituted $C_1$-$C_5$ aliphatic, or $C_2$-$C_5$ heteroaliphatic.

In certain embodiments, $R^1$ is H, m is 1, and $R^2$ is halo-substituted $C_1$-$C_3$ alkoxy or hydroxy-substituted $C_1$-$C_5$ aliphatic.

In certain embodiments, $R^1$ is H, m is 2, and each $R^2$ independently is halo or alkoxy.

In certain embodiments, $R^3$ is —C($R^b$)—, wherein $R^b$ is H; $R^4$ is —N—; and $R^5$ is —N($R^b$)—, wherein $R^b$ is substituted or unsubstituted $C_1$-$C_5$ aliphatic, particularly —$CH_3$.

In certain embodiments, $R^6$ is

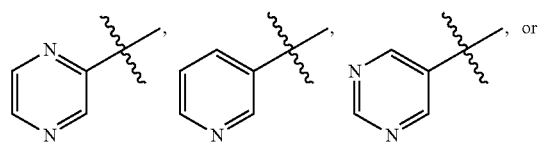, or

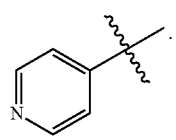.

In certain embodiments, the compound of Formula I is not:

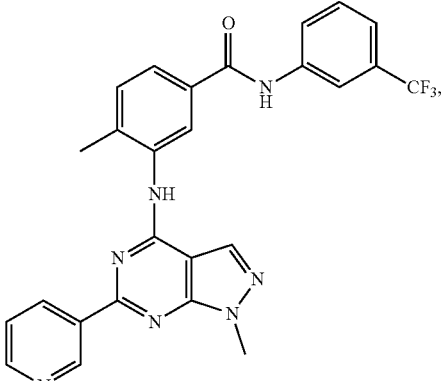

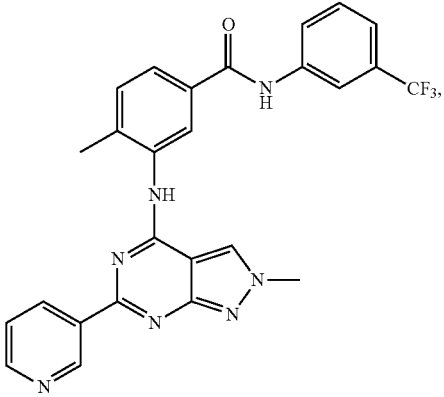

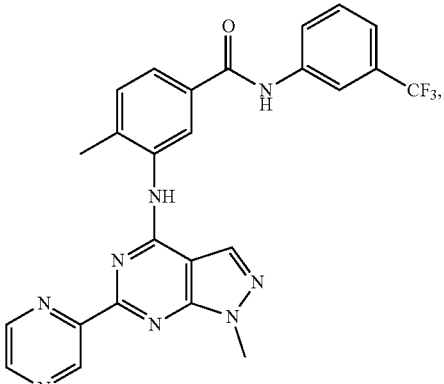

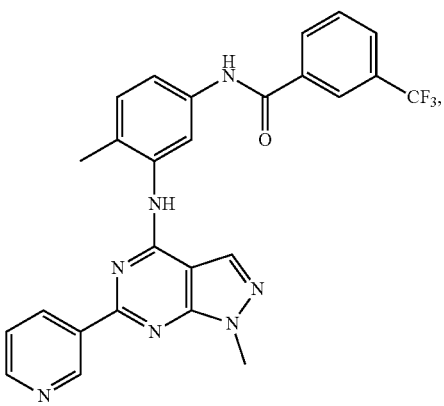

-continued

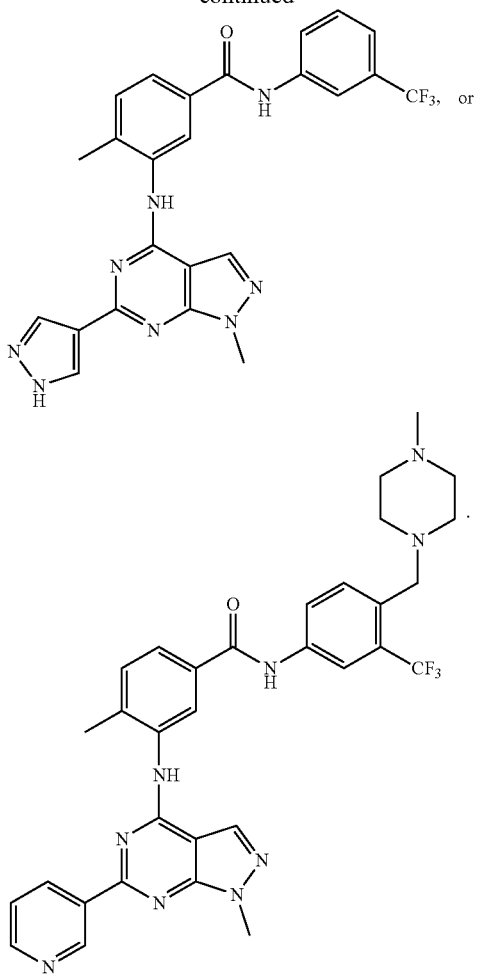

An additional embodiment disclosed herein is a compound, stereoisomer, tautomer, or pharmaceutically acceptable salt thereof according to Formula II:

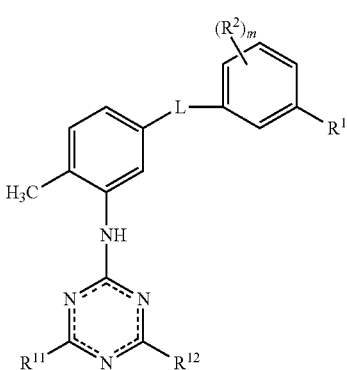

(II)

wherein:
each bond represented by "─" is a single or double bond as needed to satisfy valence requirements;
m is 0, 1, 2, or 3;
L is —C(O)—N(H)—, —N(H)—C(O)—, —S(O)$_2$—N(H)—, or

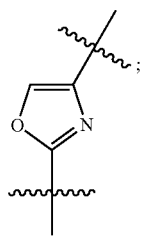 [SMILES: *c1coc(*)n1]

$R^1$ is H, substituted or unsubstituted $C_1$-$C_5$ aliphatic, halo, substituted or unsubstituted $C_2$-$C_5$ heteroaliphatic, —N($R^a$)$_2$, hydroxyl, thiol, substituted or unsubstituted cycloaliphatic, substituted or unsubstituted cycloheteroaliphatic, substituted or unsubstituted aryl, or substituted or unsubstituted heteroaryl;

each $R^2$ independently is substituted or unsubstituted $C_1$-$C_5$ aliphatic, halo, substituted or unsubstituted $C_2$-$C_5$ heteroaliphatic, substituted or unsubstituted $C_1$-$C_5$ alkoxy, substituted or unsubstituted $C_1$-$C_5$ alkoxycarbonyl, hydroxyl, thiol, cyano, substituted or unsubstituted cycloaliphatic, substituted or unsubstituted cycloheteroaliphatic, substituted or unsubstituted aryl, or substituted or unsubstituted heteroaryl;

each $R^a$ independently is H or substituted or unsubstituted $C_1$-$C_5$ aliphatic;

$R^{11}$ is a N-heterocycle, or substituted or unsubstituted aryl; and $R^{12}$ is a N-heterocycle, substituted aryl, substituted amido, or substituted amino.

In some embodiments, L is —C(O)—N(H)— or —N(H)—C(O)—, particularly —C(O)—N(H)—. In certain embodiments, the compound has a structure according to Formula IIA:

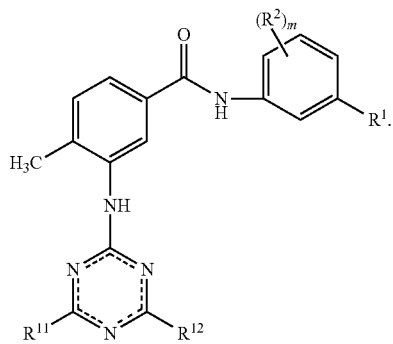

(IIA)

With respect to formulas II and IIA:
In certain embodiments, m is 0.
In certain embodiments, $R^1$ is a halo-substituted $C_1$-$C_5$ aliphatic, particularly —CF$_3$.
In certain embodiments, $R^1$ is a halo.
In certain embodiments, $R^{11}$ and $R^{12}$ are the same.
In certain embodiments, each $R^{11}$ and $R^{12}$ is a N-heteroaryl.

In certain embodiments, each $R^{11}$ and $R^{12}$ independently is

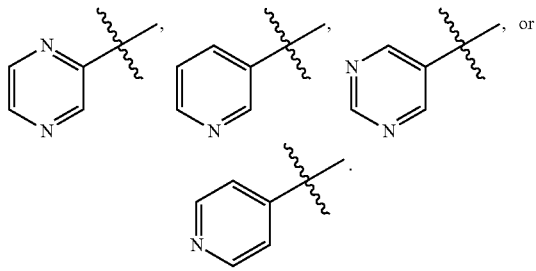

In certain embodiments, each $R^{11}$ and $R^{12}$ independently is a substituted or unsubstituted saturated N-heterocycle. Exemplary N-heterocycles include pyridinyl, substituted or unsubstituted pyrrolidinyl, morpholinyl, piperazinyl, or substituted or unsubstituted piperidinyl.

Another embodiment disclosed herein is a compound, stereoisomer, tautomer, or pharmaceutically acceptable salt thereof according to Formula IIB:

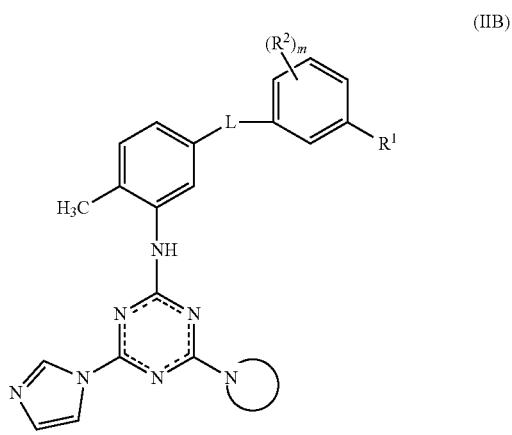

(IIB)

wherein:
each bond represented by "—" is a single or double bond as needed to satisfy valence requirements;
m is 0, 1, 2, or 3;
L is —C(O)—N(H)—, —N(H)—C(O)—, —S(O)$_2$—N(H)—, or

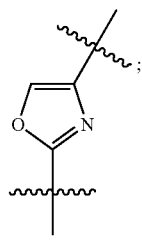

$R^1$ is H, substituted or unsubstituted $C_1$-$C_5$ aliphatic, halo, substituted or unsubstituted $C_2$-$C_5$ heteroaliphatic, —N($R^a$)$_2$, hydroxyl, thiol, substituted or unsubstituted cycloaliphatic, substituted or unsubstituted cycloheteroaliphatic, substituted or unsubstituted aryl, or substituted or unsubstituted heteroaryl;

each $R^2$ independently is substituted or unsubstituted $C_1$-$C_5$ aliphatic, halo, substituted or unsubstituted $C_2$-$C_5$ heteroaliphatic, substituted or unsubstituted $C_1$-$C_5$ alkoxy, substituted or unsubstituted $C_1$-$C_5$ alkoxycarbonyl, hydroxyl, thiol, cyano, substituted or unsubstituted cycloaliphatic, substituted or unsubstituted cycloheteroaliphatic, substituted or unsubstituted aryl, or substituted or unsubstituted heteroaryl;

each $R^a$ independently is H or substituted or unsubstituted $C_1$-$C_5$ aliphatic; and

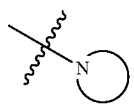

represents a N-heterocyclic.

In some embodiments, L is —C(O)—N(H)— or —N(H)—C(O)—, particularly —C(O)—N(H)—. In certain embodiments, the compound has a structure according to Formula IIC:

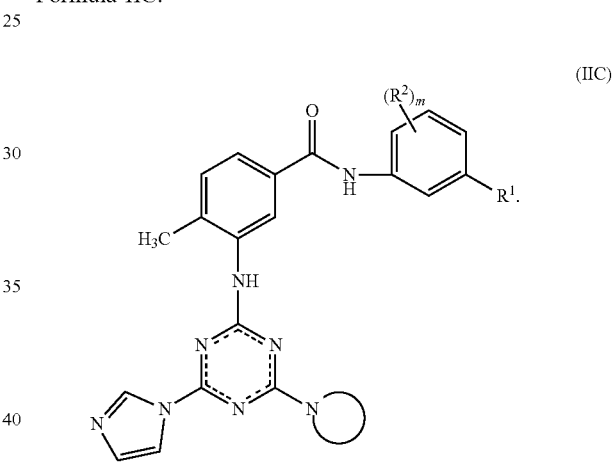

(IIC)

With respect to formulas IIB and IIC:

In certain embodiments, m is 0.

In certain embodiments, $R^1$ is a halo-substituted $C_1$-$C_5$ aliphatic, particularly —CF$_3$.

In certain embodiments. $R^1$ is a halo.

In certain embodiments, $R^1$ is a halo-substituted $C_1$-$C_5$ aliphatic, particularly —CF$_3$, and m is 1.

In certain embodiments,

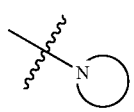

is pyridinyl, substituted or unsubstituted pyrrolidinyl, morpholinyl, piperazinyl, or substituted or unsubstituted piperidinyl.

Another embodiment disclosed herein is a compound, stereoisomer, tautomer, or pharmaceutically acceptable salt thereof according to Formula III:

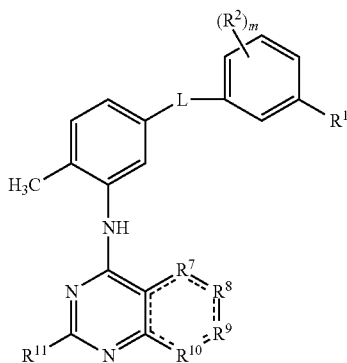

(III)

each bond represented by "—" is a single or double bond as needed to satisfy valence requirements;

m is 0, 1, 2, or 3;

L is —C(O)—N(H)—, —N(H)—C(O)—, —S(O)$_2$—N(H)—, or

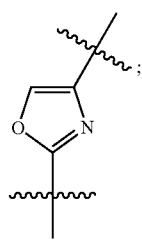 [SMILES: *c1coc(*)n1]

R$^1$ is H, substituted or unsubstituted C$_1$-C$_5$ aliphatic, halo, substituted or unsubstituted. C$_2$-C$_5$ heteroaliphatic, —N(R$^a$)$_2$, hydroxyl, thiol, substituted or unsubstituted cycloaliphatic, substituted or unsubstituted cycloheteroaliphatic, substituted or unsubstituted aryl, or substituted or unsubstituted heteroaryl;

each R$^2$ independently is substituted or unsubstituted C$_1$-C$_5$ aliphatic, halo, substituted or unsubstituted C$_2$-C$_5$ heteroaliphatic, substituted or unsubstituted C$_1$-C$_5$ alkoxy, substituted or unsubstituted C$_1$-C$_5$ alkoxycarbonyl, hydroxyl, thiol, cyano, substituted or unsubstituted cycloaliphatic, substituted or unsubstituted cycloheteroaliphatic, substituted or unsubstituted aryl, or substituted or unsubstituted heteroaryl;

each R$^a$ independently is H or substituted or unsubstituted C$_1$-C$_5$ aliphatic;

R$^6$ is a N-heteroaryl or substituted amido; and each R$^7$-R$^{10}$ independently is —N—, —N(R$^b$)—, —C(R$^b$)—, or —C(R$^b$)$_2$—, wherein each R$^b$ independently is H, halo, substituted or unsubstituted C$_1$-C$_5$ aliphatic, substituted or unsubstituted C$_2$-C$_5$ heteroaliphatic, substituted or unsubstituted aryl, substituted or unsubstituted heteroaryl, —N(R$^a$)$_2$, hydroxyl, or thiol.

In some embodiments, L is —C(O)—N(H)— or —N(H)—C(O)—, particularly —C(O)—N(H)—. In certain embodiments, the compound has a structure according to Formula IIIA:

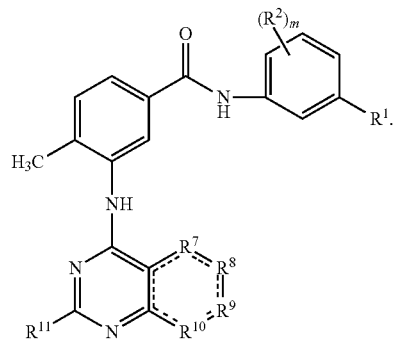

(IIIA)

With respect to formulas III and IIIA:

In certain embodiments, m is 0.

In certain embodiments, R$^1$ is a halo-substituted C$_1$-C$_5$ aliphatic, particularly —CF$_3$.

In certain embodiments. R$^1$ is a halo.

In certain embodiments, each R$^7$-R$^{10}$ is —C(R$^b$)—, wherein R$^b$ is H.

In certain embodiments, at least one of R$^7$-R$^{10}$ is —N(R$^b$)—, wherein R$^b$ is H.

In certain embodiments, each R$^7$-R$^9$ is —C(R$^b$)—, wherein R$^b$ is H, and R$^{10}$ is —N(R$^b$)—, wherein R$^b$ is H.

In certain embodiments, R$^6$ is

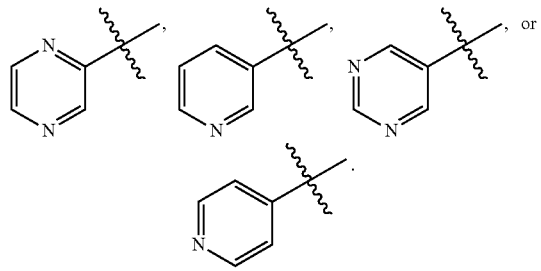

Another embodiment disclosed herein is a compound, stereoisomer, tautomer, or pharmaceutically acceptable salt thereof according to Formula IV:

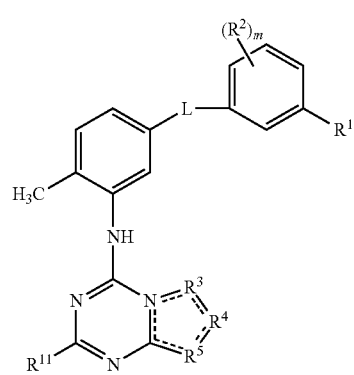

(IV)

each bond represented by "—" is a single or double bond as needed to satisfy valence requirements;

m is 0, 2, or 3;

L is —C(O)—N(H)—, —N(H)—C(O)—, —S(O)$_2$—N(H)—, or

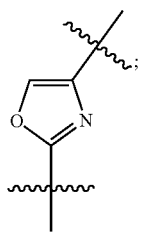 [SMILES: *c1coc(*)n1]

R¹ is H, substituted or unsubstituted $C_1$-$C_5$ aliphatic, halo, substituted or unsubstituted $C_2$-$C_5$ heteroaliphatic, —N(R$^a$)$_2$, hydroxyl, thiol, substituted or unsubstituted cycloaliphatic, substituted or unsubstituted cycloheteroaliphatic, substituted or unsubstituted aryl, or substituted or unsubstituted heteroaryl;

each R² independently is substituted or unsubstituted $C_1$-$C_5$ aliphatic, halo, substituted or unsubstituted $C_2$-$C_5$ heteroaliphatic, substituted or unsubstituted $C_1$-$C_5$ alkoxy, substituted or unsubstituted alkoxycarbonyl, hydroxyl, thiol, cyano, substituted or unsubstituted cycloaliphatic, substituted or unsubstituted cycloheteroaliphatic, substituted or unsubstituted aryl, or substituted or unsubstituted heteroaryl;

R³-R⁵ independently are —N—, —N(R$^b$)—, C(R$^b$)—, or —C(R$^b$)$_2$—, provided at least one of R³-R⁵ is —N— or —N(R$^b$)—;

each R$^a$ independently is H or substituted or unsubstituted $C_1$-$C_5$ aliphatic;

each R$^b$ independently is H, halo, substituted or unsubstituted $C_1$-$C_5$ aliphatic, substituted or unsubstituted $C_2$-$C_5$ heteroaliphatic, substituted or unsubstituted aryl, substituted or unsubstituted heteroaryl, —N(R$^a$)$_2$, hydroxyl, or thiol; and R⁶ is a N-heteroaryl or substituted amido.

In some embodiments, L is —C(O)—N(H)— or —N(H)—C(O)—, particularly —C(O)—N(H)—. In certain embodiments, the compound has a structure according to Formula IVA:

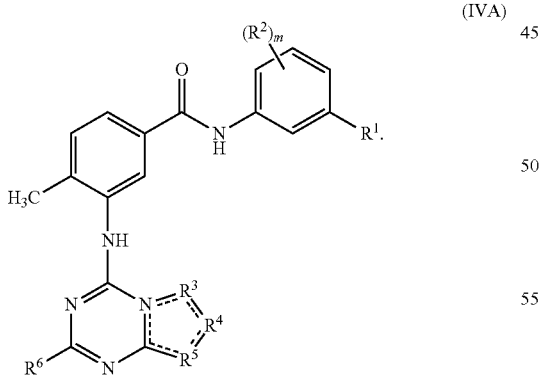

(IVA)

With respect to formulas IV and IVA:
In certain embodiments, m is 0.
In certain embodiments, R¹ is a halo-substituted $C_1$-$C_5$ aliphatic, particularly —CF$_3$.
In certain embodiments, R¹ is a halo.
In certain embodiments, R¹ is H and m is 1.
In certain embodiments, R¹ is a halo-substituted $C_1$-$C_5$ aliphatic, particularly —CF$_3$, and m is 1.

In certain embodiments, R² is alkoxycarbonyl, cyano, N-heterocyclic, alkoxy, aliphatic, halo-substituted $C_1$-$C_5$ aliphatic, or halo.

In certain embodiments, R³ is —C(R$^b$)—, wherein R$^b$ is H; R⁴ is —C(R$^b$)— wherein R$^b$ is substituted or unsubstituted $C_1$-$C_5$ aliphatic, particularly —CH$_3$, and R⁵ is —N—.

In certain embodiments, R⁶ is

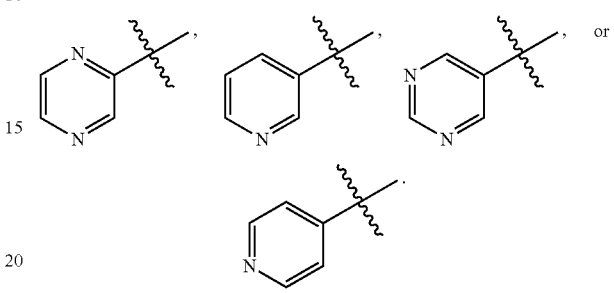

Illustrative compounds include:

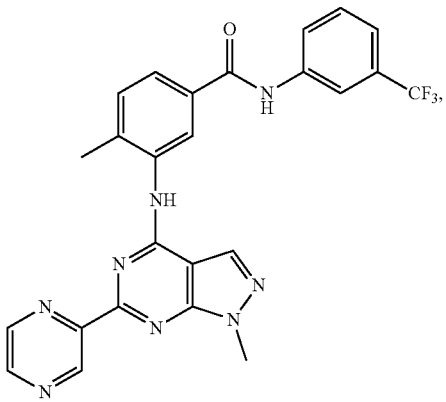

Compound AT158
(also referred to herein as compound @1)
MST: K$_D$ (EPHA2) = 3 nM

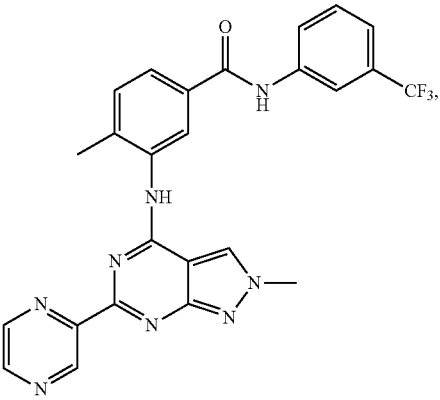

Compound ATJA17
(also referred to herein as compound @2)
MST: K$_D$ (EPHA2) = 132 nM -continued
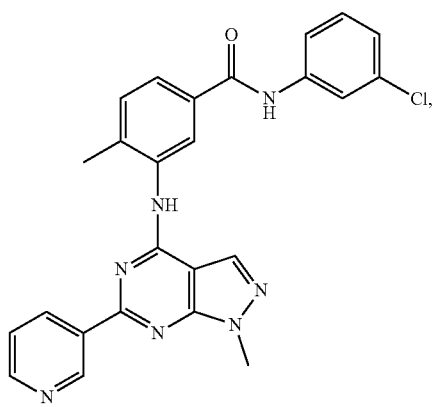
Compound AT144
MST: $K_D$ (EPHA2) = 3 nM
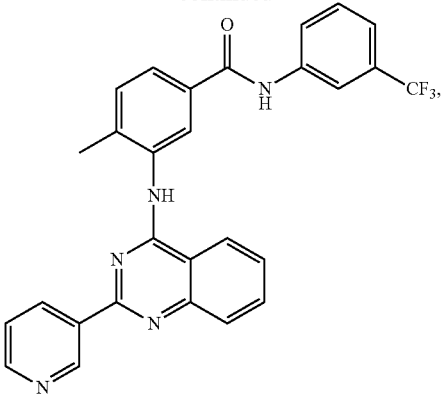
Compound AT137
(also referred to herein as compound @4)
MST: $K_D$ (EPHA2) = 86 nM
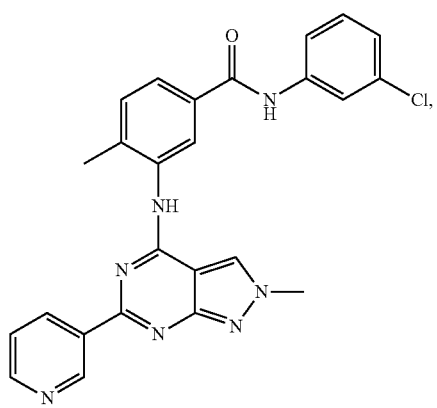
Compound ATJA07
MST: $K_D$ (EPHA2) = 294 nM
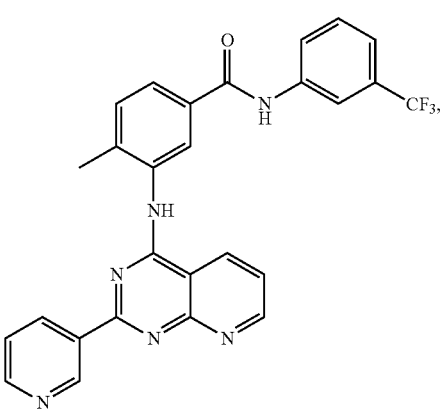
Compound AT155
(also referred to herein as compound @5)
MST: $K_D$ (EPHA2) = 225 nM
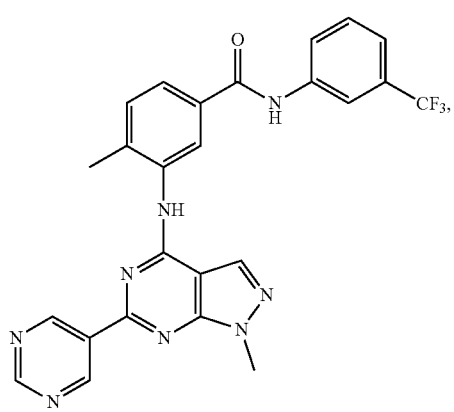
Compound AT156
(also referred to herein as compound @3)
MST: $K_D$ (EPHA2) = 4 nM
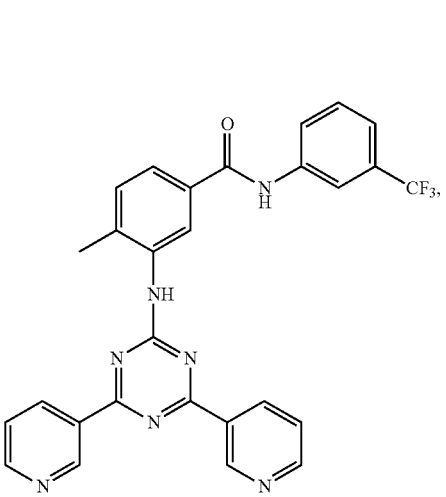
Compound ATNK002
(also referred to herein as compound @6)
MST: $K_D$ (EPHA2) = 24 nM

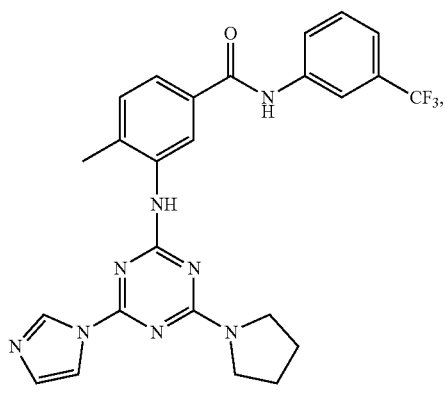

Compound AT136
(also referred to herein as compound @9)
MST: $K_D$ (EPHA2) = 32 nM

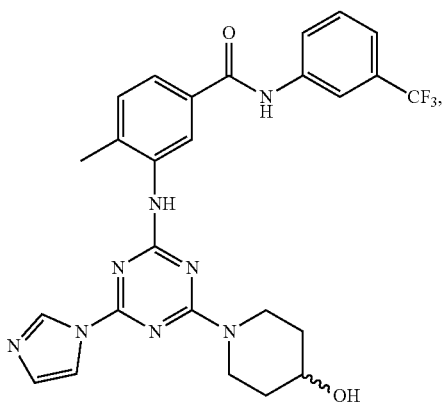

Compound ATDL13
(also referred to herein as compound @14)
MST: $K_D$ (EPHA2) = ~850 nM

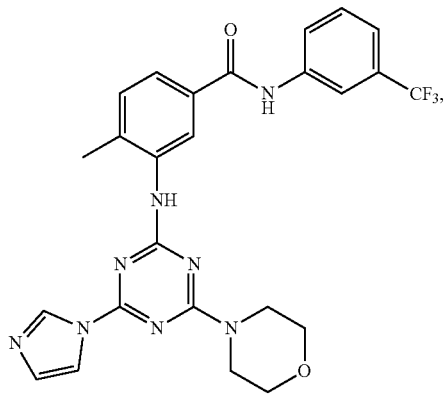

Compound ATHA01
(also referred to herein as compound @10)
MST: $K_D$ (EPHA2) = 191 nM

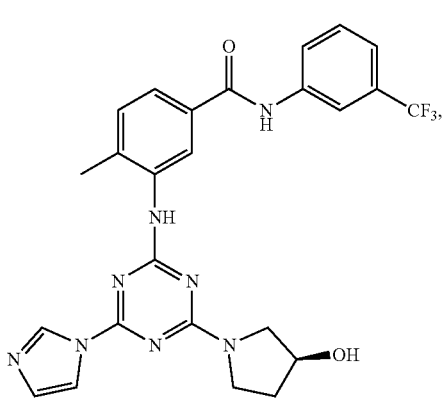

Compound ATSW15
(also referred to herein as compound @13)
MST: $K_D$ (EPHA2) = 97 nM

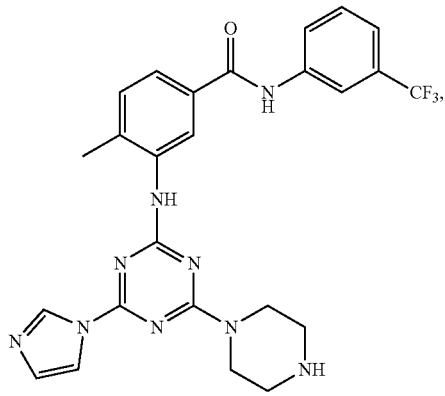

Compound ATJV27
(also referred to herein as compound @11)
MST: $K_D$ (EPHA2) = 443 nM

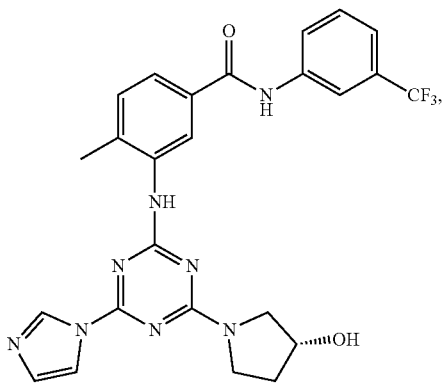

Compound ATDL14
(also referred to herein as compound @12)
MST: $K_D$ (EPHA2) = 132 nM 31
-continued
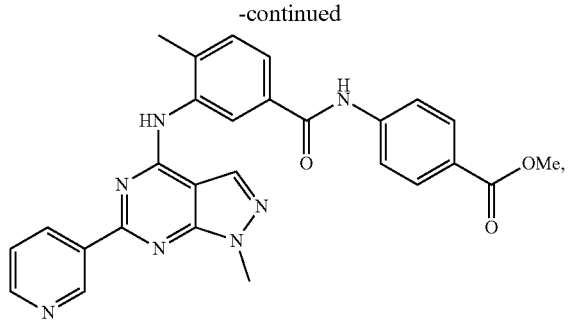
MST: $K_D$ (EPHA2) = ~700 nM
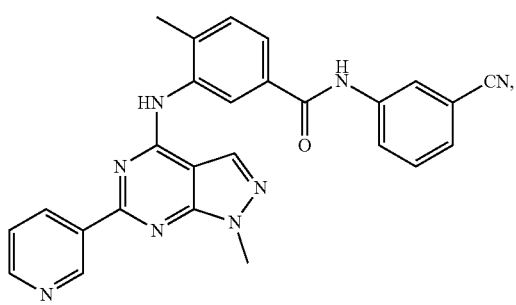
MST: $K_D$ (EPHA2) = 4 nM
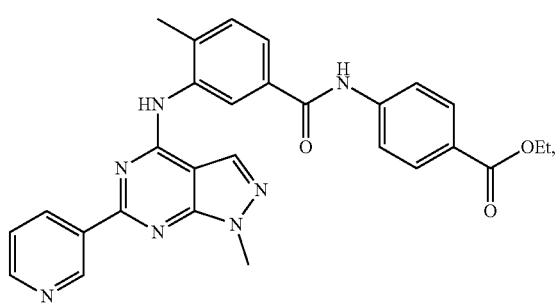
MST: $K_D$ (EPHA2) = ~650 nM
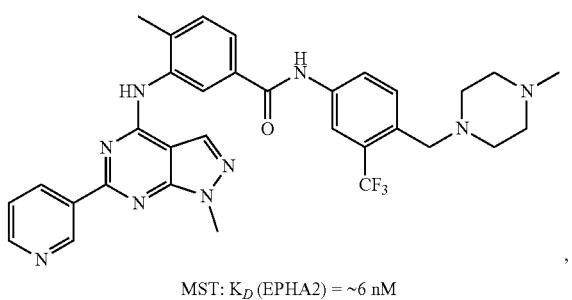
MST: $K_D$ (EPHA2) = ~6 nM
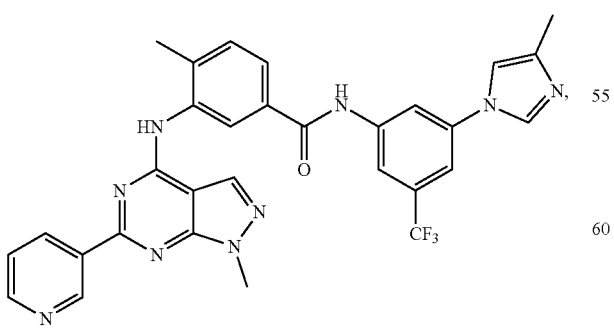
MST: $K_D$ (EPHA2) = ~32 nM
32
-continued
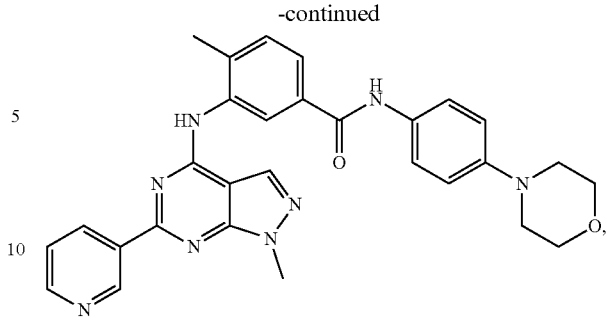
MST: $K_D$ (EPHA2) = ~800 nM
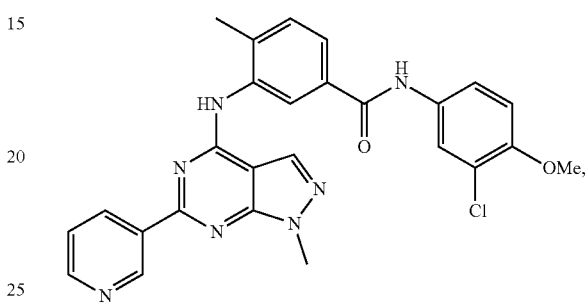
MST: $K_D$ (EPHA2) = ~113 nM
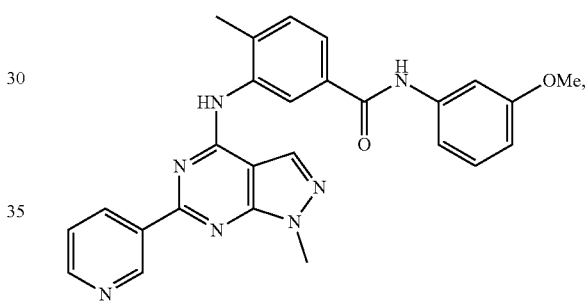
MST: $K_D$ (EPHA2) = 9 nM
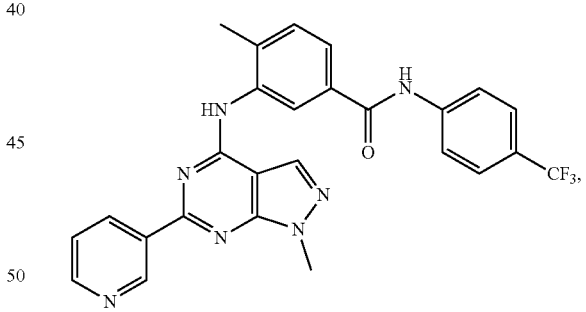
MST: $K_D$ (EPHA2) = ~170 nM
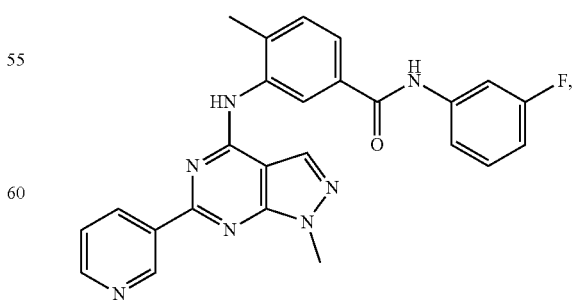
MST: $K_D$ (EPHA2) = ~200 nM -continued
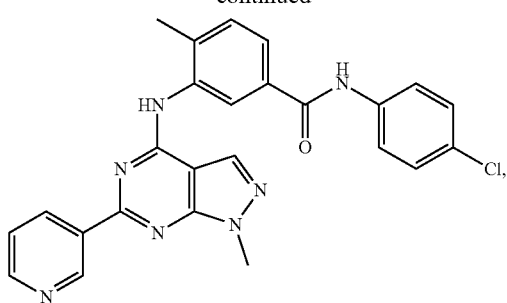
MST: K$_D$ (EPHA2) = ~250 nM
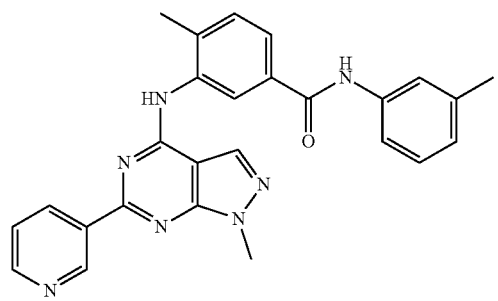
,
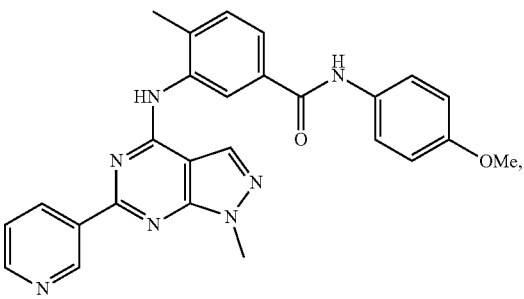
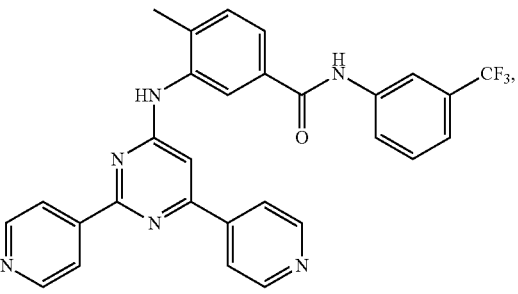
MST: K$_D$ (EPHA2) = ~2884 nM
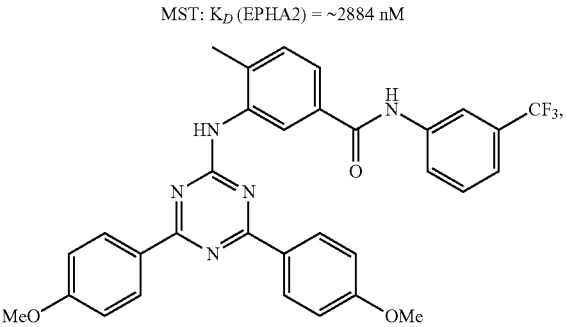
MST: K$_D$ (EPHA2) = ~950 nM
-continued
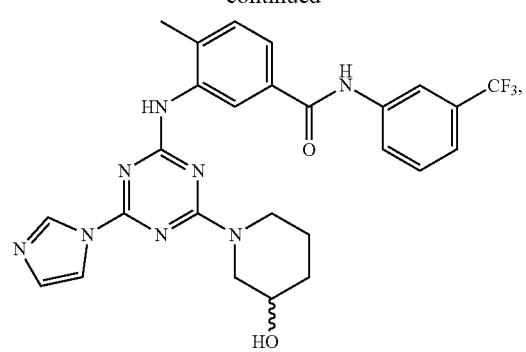
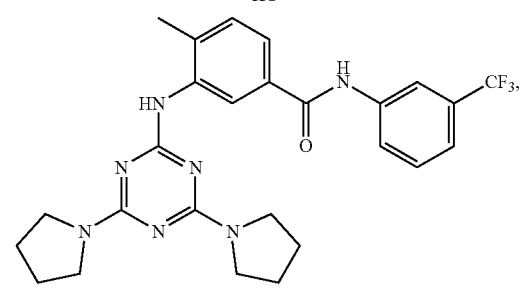
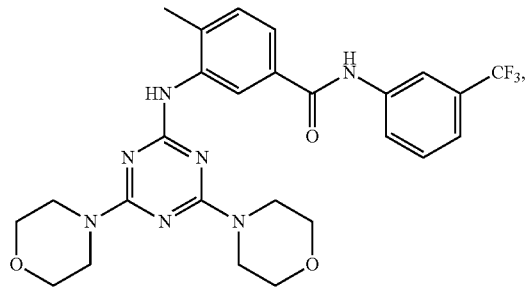
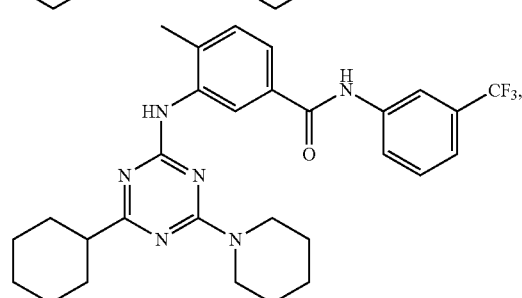
MST: K$_D$ (EPHA2) = ~1133 nM
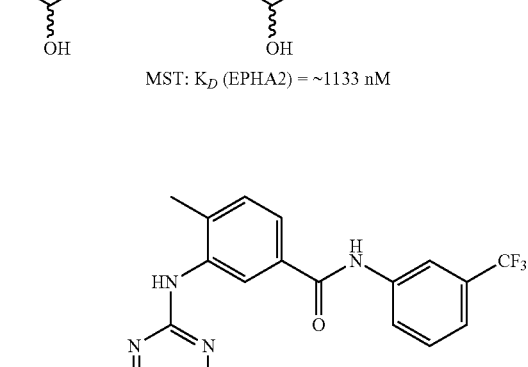
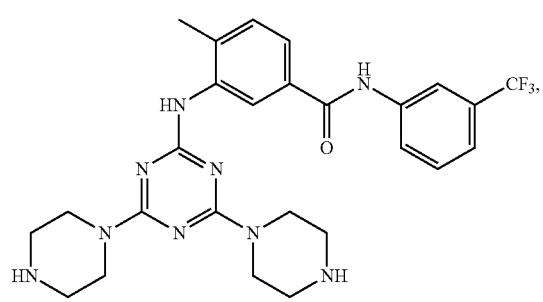

-continued
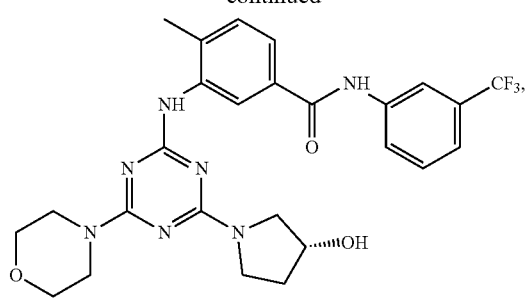
MST: $K_D$ (EPHA2) = ~730 nM
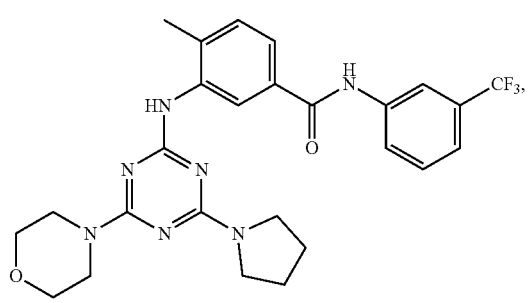
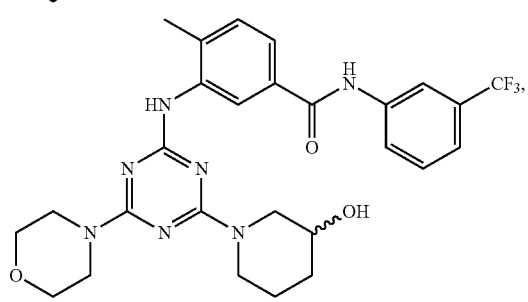
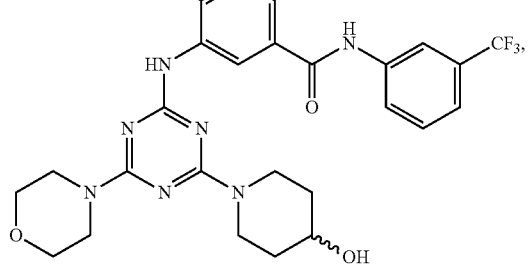
MST: $K_D$ (EPHA2) = ~550 nM
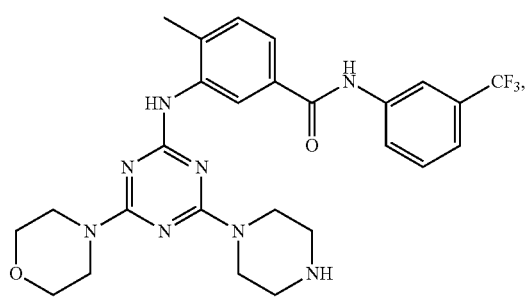
-continued
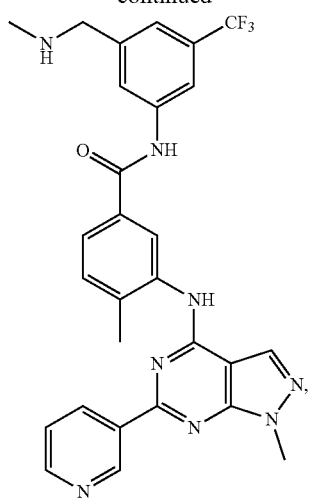
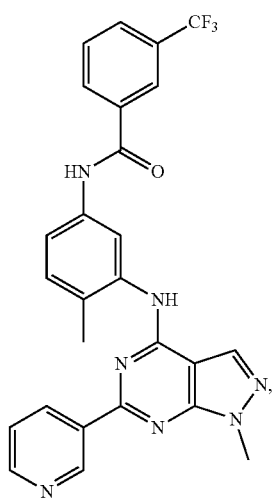
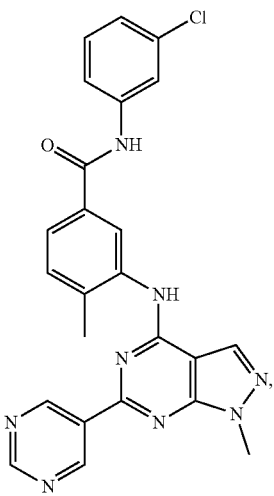

37
-continued
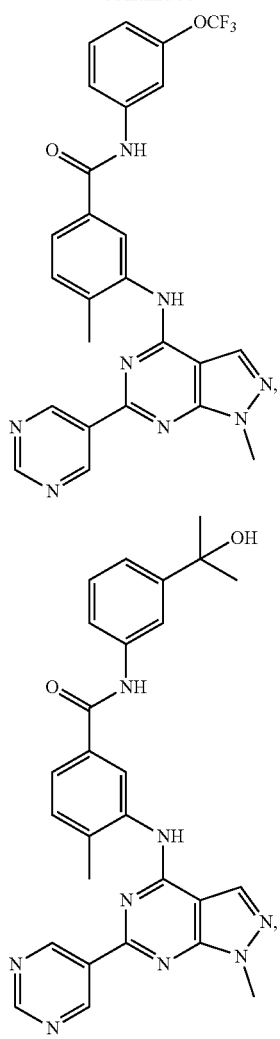
38
-continued
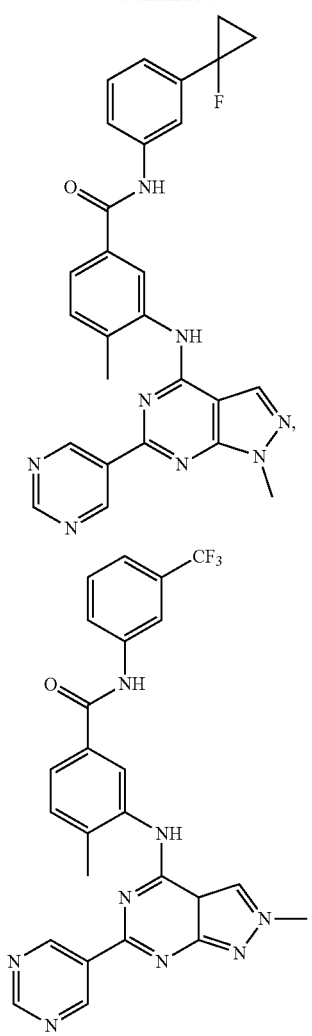
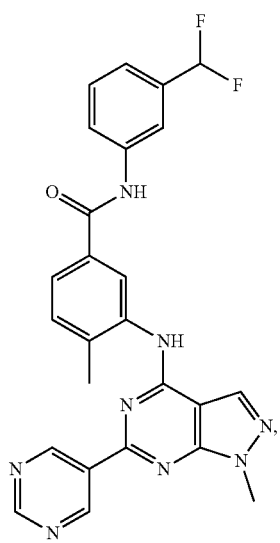
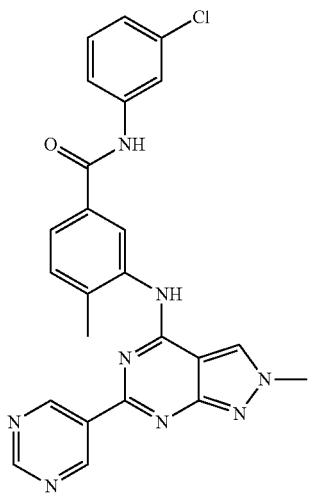

-continued
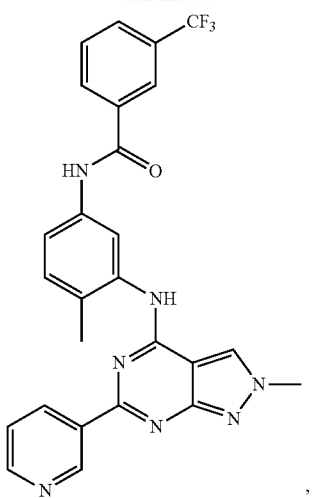
,
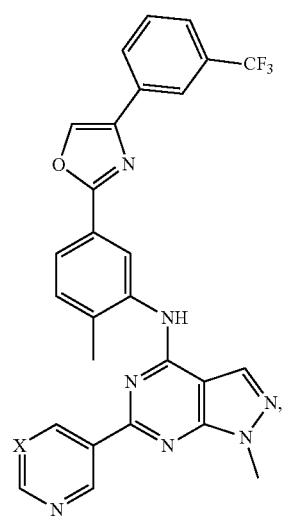
where X is N or CH
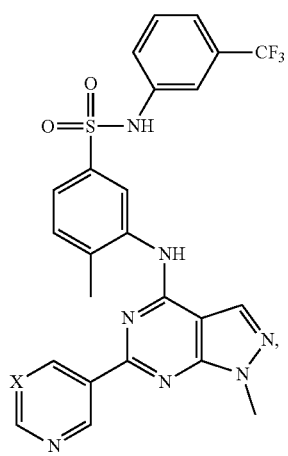
where X is N or CH
-continued
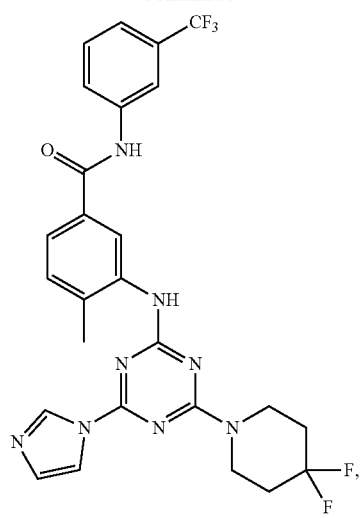
,
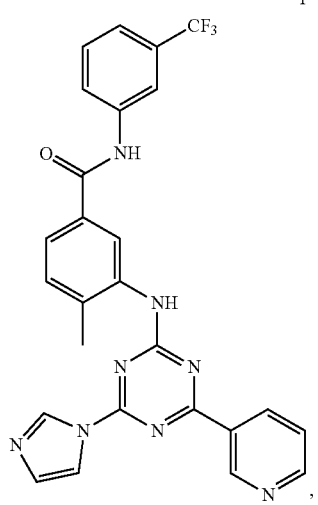
,
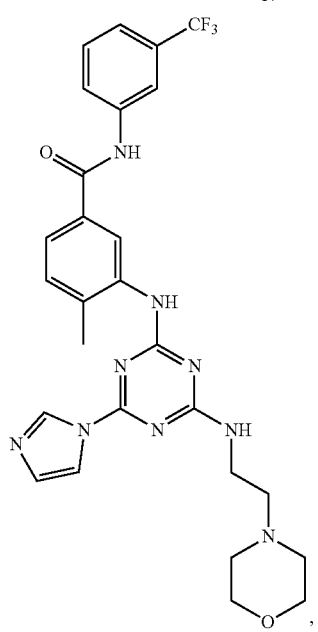
,

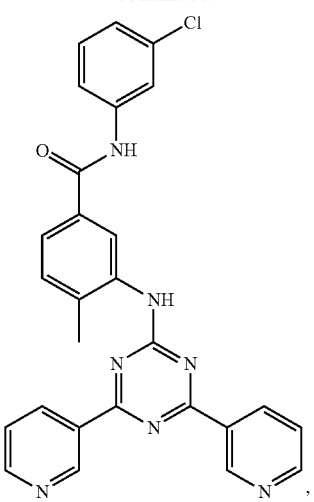

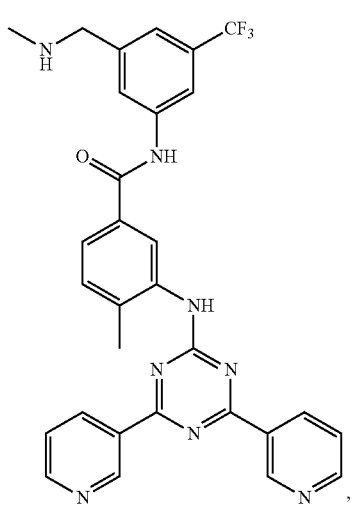

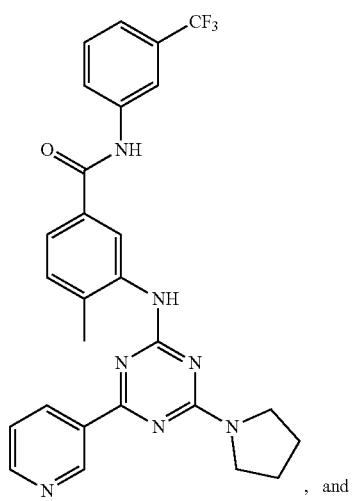

, and

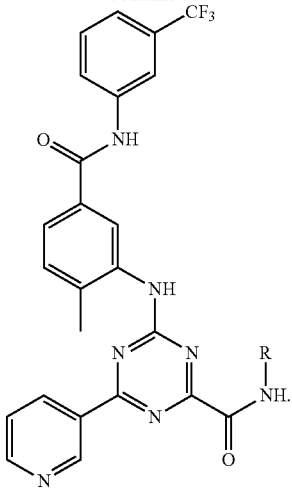

III. Pharmaceutical Compositions and Methods of Use

The compounds, or pharmaceutical compositions comprising the compounds, may be administered to a subject having, suspected of having, or at risk of developing, certain diseases or conditions. In certain embodiments, the subject has a cancer, an inflammatory disease, an autoimmune disease, or a degenerative disease characterized at least in part by the abnormal activity or expression of the Eph receptor tyrosine kinase. In some embodiments, the disease is glioblastoma, rhabdomyosarcoma, lung cancer, melanoma, breast cancer, or head and neck cancer. In certain embodiments, the disease is colorectal cancer. In certain embodiments, the subject has a tumor comprising cells expressing the Eph receptor tyrosine kinase.

In certain embodiments, the compound, or a pharmaceutical composition containing the compound may be used for treating a protein kinase modulation-responsive disease. Illustrative protein kinase modulation-responsive diseases include one or more diseases responsive to inhibition of one or more protein tyrosine kinases selected from abl kinases, src kinases, RET-receptor kinases, Eph receptor kinases, or mutated forms thereof, such as pseudokinases (catalytically-deficient pseudoenzyme variants). Illustrative protein tyrosine kinases include v-abl kinase, c-abl kinase, c-src kinase, b-raf V600E kinase, b-raf V599E kinase, a RET receptor kinase, an Eph receptor kinase, or a mutated form thereof.

In certain embodiments, the Eph receptor comprises an EphB receptor. Illustrative EphB receptors include EphB1, EphB2, EphB3, EphB4, EphB6, or any combination thereof.

In certain embodiments, the Eph receptor comprises one or more EphA receptors. Illustrative EphA receptors include EphA1, EphA2, EphA3, EphA4, EphA5, EphA6, EphA7, EphA8, EphA10, or any combination thereof. In particular implementations, the Eph receptor comprises EphA1, EphA2, or a combination thereof.

In certain embodiments, the Eph receptor comprises a combination of EphA and EphB receptors.

Also disclosed herein is a method of treating a disorder characterized at least in part by abnormal activity or expression of a protein tyrosine kinase, the method comprising identifying a subject having a disorder characterized at least in part by abnormal activity or expression of protein tyrosine kinase; and administering a therapeutically effective amount of a compound disclosed herein or a pharmaceutical composition comprising the compound to the subject. In some embodiments, the compound or pharmaceutical composition targets cells expressing an Eph receptor tyrosine kinase in a diseased tissue microenvironment within the subject.

In certain embodiments, the compound or a pharmaceutical composition containing the compound may be used for treating a cancer in which at least one of the Eph family of receptors exerts a pro-survival or proliferative functions. For example, the following cancer types could benefit from inhibiting the Eph kinases:

glioblastoma (Binda E. et al *Cancer Cell* 2012; 22:765; Gravina G. L. et al *Cancers* 2019, 11,359);

rhabdomyosarcoma (Megiorni F. et al *J Hematol Oncol* 2017; 10:161);

lung cancer: EphA2 overexpression correlates with poor survival of patients with lung cancer; EphA3 depletion reduces lung tumor growth in mice; overexpression of EphA2 in the bronchial epithelium promotes tumor invasion; and EphA2 inhibition promotes apoptosis in non-small cell lung cancers (Song W. et al *Cancer Res* 2014; 74:2444; Ding L et al *Nature* 2008; 455:1069; Amato, K. R. *J Clin Invest* 2014; 124: 2037);

melanoma (Sakamoto et al., *Anticancer Res* 2018, 38(6): 3273); Yang et al., *J of Biol Chem* 2006, 281(43): 32574);

breast cancer (Zelinski et al., *Cancer Res* 2001, 61(5): 2301; Mason et al., *PLoS ONE* 2021, 16(3):30247335);

head and neck cancer (Bhatia et al., *Scientific Reports* 2016, 6, article 38792; Yavrouian et al., *Arch Otolaryngol Head Neck Surg* 2008, 134(9):985);

colorectal cancer (Herath et al., *Int J Cancer* 2010, 126(9):2003; Mason et al., *PLoS ONE* 2021, 16(3): 30247335)

Tumor microenvironments: EphA2 expressed in tumor cells has been shown to promote vasculogenic mimicry (Pasquale E. B. *Nat Rev Cancer* 2010; 10:165); Eph-dependent regulation of immune/inflammatory cells had been shown to promote cancer growth (Frieden L. A. et al *Dev Dyn* 2010; 239: 3226).

In addition, cancer cell heterogeneity has emerged as a critical component of cancer growth and approaches to treatment. Cancer development and progression, with or without treatment, generates diversity through a variety of mechanisms. This diversity is the source of cancer cell resistance to treatment and is the underlying mechanism for cancer progression. It is likely that any cancer type may develop clones where Eph receptors signaling is critical to cancer cell survival. The concept of individualized cancer treatment outlines how inhibiting individual genes/proteins/signaling pathways may be critical to abate cancer in individual cancer patients. Eph receptor activity may be critical in any cancer during its evolution.

Other diseases or conditions that may be treated with a compound disclosed herein include:

Neural repair: many studies have shown that EphA4 inactivation improves functional recovery of rodent spinal cord injury and related inflammatory responses (Fabes J et al *Eur J. Neurosci* 2017; 26: 2496); other studies have shown that blocking EphB4 improved recovery of muscle re-innervation (Van Hoecke A et al *Nat Med* 2012; 18:1418); other studies have shown that blocking EphA4 improves regeneration of axonal connections after brain injury (Overman J. J. et al *Proc Natl Acad Sci USA* 2012; 109 E2230).

Pain: Increased activation of postsynaptic EphB receptors in sensory neurons has been shown to be a mechanism for pain. Pain can be alleviated by blocking EphB signaling (Shellffler-Collins S I and Dalva. M. B. *Trends Neurosci* 2012; 35: 293; Chen Y. et al *Cell Signal* 2012; 24:606). EphA SNPs have been linked to sensory neuropathy induced by the chemotherapeutic agent paclitaxel in cancer patients (Leandro-Garcia L. *J. Med Genet* 2013; 50:599).

Cardiovascular system: Eph regulation has been linked to modulation of blood pressure (Wu Z. et al *J Biol Chem* 2012; 287:15557); EphA2 regulates vascular permeability and inflammation (Coulthard M. G. et al *Am Pathol* 2012; 181:1493).

Viral Infections: EphA2 is required for endothelial cell infection by KSHV (Kaposi's sarcoma herpesvirus), which is a necessary step in the development of Kaposi's sarcoma (a proliferative disease/malignancy, which is one of the most common malignancies in Africa and cause of severe morbidity and mortality; most common malignancy in AIDS patients worldwide) (Hahn A S et al *Nat Med* 2012; 18: 961); EphA2 enables infection by the hepatitis C virus though interaction with the viral glycoproteins (Lupberger J et al *Nat Med* 2011; 17: 589); EphB6 appears important for H1N1 influenza virus replication (Karlas A et al *Nature* 2010; 463:818).

Metabolic disease: glucose homeostasis; EphA signaling inhibits insulin secretion in the pancreas even when circulating glucose is low. Mouse studies have shown that blocking the Eph kinase can enhance insulin secretion in response to low glucose, suggesting an application for diabetes (Jain R. et al. *Diabetotogia* 2013; 56: 1350).

Bone diseases: EphA2 signaling in osteoblasts inhibits bone formation (Matsuo K. and Otaki N.; *Cell Adh Mgr* 2012; 6:148); thus, Eph targeting may be a therapy for bone diseases characterized by osteopenia, such as osteoporosis and osteolytic lesions in multiple myeloma.

Cancer immunotherapy: Many cancer cells (including breast, head and neck, non-small lung cancer and colorectal cancer) express at abnormally high levels subsets of EphB receptors, which represent potential targets of cancer immunotherapy. Cytotoxic T lymphocytes generated by immunization with EphA2- and EphB6-peptides attacked glioblastoma cells (Pasquale E. B. *Nat Rev Cancer* 2010; 10:165; Chow, K. et al *Mol Ther* 2013; 21:629).

Age related cataract: activating mutations of EphA2 have been linked to cataract (Lizabeth E M et al *Cold Spring Harbor Perspect Biol* 2013; 5: a009159).

In certain embodiments, the compounds disclosed herein may be co-administered with another therapeutic modality. Exemplary therapeutic modalities include, but are not limited to chemotherapy, surgery, radiation therapy, immunotherapy, gene therapy, anti-inflammatory therapy, and combinations thereof. In some embodiments, the additional therapeutic modality comprises chemotherapy (e.g., an anti-cancer agent or a chemotherapeutic agent). For example, Martini G. et al (*Molec Cancer Ther* 2019; 18:845-855) reported that an EphA2 inhibitor (ALW-II-41-27; *MedChem Express*, Italy) plus cetuximab (anti-EGFR monoclonal antibody) reverted cetuximab resistance as evidenced by reduced tumor cell growth. This reversal also occurred in colorectal cancer previously treated with standard FOLFIRI chemotherapy. Consistent with these results, other studies have shown cross-talk between Eph receptor and EGFR; specifically, Eph receptor activation prevented recycling of EGFR to the cell surface trapping EGFR in endosomes; thus, blocking Eph signaling in triple-negative breast cancer cells could reconstitute EGF response in these cancer cells, which could then respond to EGFR inhibitors (Stallaert W. et al, *Sci Signal* 2018; 11:eaat0114), Thus, Eph receptor inhibition may reconstitute responsiveness of EGFR to EGF in many cancer types. In so doing, co-administration of an Eph inhibitor would provide an opportunity to target this pathway modulated not only by cetuximab but other inhibitors of EGF/EGFR signaling (Erlotinib, Gefitinib, Lapatinib and others in the pipeline). In some embodiments, the chemotherapeutic agent is Nilotinib or Tesevatinib, which inhibit EphB4 autophosphorylation in colorectal cancer cells.

Also disclosed herein is a method for inhibiting an Eph receptor tyrosine kinase, comprising contacting cells expressing an Eph receptor tyrosine kinase with a compound disclosed herein in an amount effective to inhibit activity of the Eph receptor tyrosine kinase relative to an activity level of the Eph receptor tyrosine kinase in the absence of the compound. In certain embodiments, the cells are colorectal carcinoma cells. The contacting of the cells may:
  (i) reduce viability of the cells relative to viability in the absence of the compound; or
  (ii) inhibit cell proliferation relative to a rate of cell proliferation in the absence of the compound; or
  (iii) increase autophagy or any other form of cell death relative to a level of autophagy/other form of cell death in the absence of the compound; or
  (iv) any combination of (i), (ii), and (iii).

Also disclosed herein is a method of treating a disorder characterized at least in part by abnormal activity or expression of a protein tyrosine kinase, the method comprising obtaining cells expressing an Eph receptor tyrosine kinase from a subject; contacting the cells with a disclosed compound in vitro to provide treated cells; and re-introducing the treated cells into the subject. In some embodiments, the cells are T-cells. In certain embodiments, introducing the treated cells into the subject subsequently evokes anti-cancer immunity in the subject.

Also disclosed herein is a method of treating a subject having a tumor comprising cells expressing an Eph receptor tyrosine kinase, where administering a therapeutically effective amount of a disclosed compound or pharmaceutical composition comprising the compound to the subject inhibits growth of the tumor. In some embodiments, the compound or pharmaceutical composition does not detectably affect tumor vasculature or endothelial cell growth. In certain embodiments, the compound or pharmaceutical composition targets tumor growth-promoting cells expressing an Eph receptor tyrosine kinase in a tumor microenvironment within the subject.

In some embodiments, the methods disclosed herein involve administering to a subject in need of treatment a pharmaceutical composition, for example a composition that includes a pharmaceutically acceptable carrier and a therapeutically effective amount of one or more of the compounds disclosed herein. The compounds may be administered orally, parenterally (including subcutaneous injections (SC or depo-SC), intravenous (IV), intramuscular (IM or depo-IM), intrasternal injection or infusion techniques), sublingually, intranasally (inhalation), intrathecally, topically, ophthalmically, or rectally. The pharmaceutical composition may be administered in dosage unit formulations containing conventional non-toxic pharmaceutically acceptable carriers, adjuvants, and/or vehicles. The compounds are preferably formulated into suitable pharmaceutical preparations such as tablets, capsules, or elixirs for oral administration or in sterile solutions or suspensions for parenteral administration. Typically, the compounds described above are formulated into pharmaceutical compositions using techniques and procedures well known in the art.

In some embodiments, one or more of the disclosed compounds (including compounds linked to a detectable label or cargo moiety) are mixed or combined with a suitable pharmaceutically acceptable carrier to prepare a pharmaceutical composition. Pharmaceutical carriers or vehicles suitable for administration of the compounds provided herein include any such carriers known to be suitable for the particular mode of administration. Remington: The Science and Practice of Pharmacy, The University of the Sciences in Philadelphia, Editor, Lippincott, & Wilkins, Philadelphia, PA, 21$^{st}$ Edition (2005), describes exemplary compositions and formulations suitable for pharmaceutical delivery of the compounds disclosed herein. In addition, the compounds may be formulated as the sole pharmaceutically active ingredient in the composition or may be combined with other active ingredients.

Upon mixing or addition of the compound(s) to a pharmaceutically acceptable carrier, the resulting mixture may be a solution, suspension, emulsion, or the like, Liposomal suspensions max also be suitable as pharmaceutically acceptable carriers. These may be prepared according to methods known to those skilled in the art. The form of the resulting mixture depends upon a number of factors, including the intended mode of administration and the solubility of the compound in the selected carrier or vehicle. Where the compounds exhibit insufficient solubility, methods for solubilizing may be used. Such methods are known and include, but are not limited to, using cosolvents such as dimethylsiilfoxide (DMSO), using surfactants such as Tween®), and dissolution in aqueous sodium bicarbonate. Derivatives of the compounds, such as salts or prodrugs may also be used in formulating effective pharmaceutical compositions. The disclosed compounds may also be prepared with carriers that protect them against rapid elimination from the body, such as time-release formulations or coatings. Such carriers include controlled release formulations, such as, but not limited to, microencapsulated delivery systems.

The disclosed compounds and/or compositions can be enclosed in multiple or single dose containers. The compounds and/or compositions can also be provided in kits, for example, including component parts that can be assembled for use. For example, one or more of the disclosed compounds may be provided in a lyophilized form and a suitable diluent may be provided as separated components for combination prior to use. In some examples, a kit may include a disclosed compound and a second therapeutic agent (such as an anti-cancer anti-retroviral agent) for co-administration. The compound and second therapeutic agent ma be provided as separate component parts. A kit may include a plurality of containers, each container holding one or more unit dose of the compound. The containers are preferably adapted for the desired mode of administration, including, but not limited to tablets, gel capsules, sustained-release capsules, and the like for oral administration; depot products, pre-filled syringes, ampoules, vials, and the like for parenteral administration; and patches, medi-pads, creams, and the like for topical administration.

The active compound is included in the pharmaceutically acceptable carrier in an amount sufficient to exert a therapeutically useful effect in the absence of undesirable side effects on the subject treated, A therapeutically effective concentration may be determined empirically by testing the compounds in known in vitro and in vivo model systems for the treated disorder. In some examples, a therapeutically effective amount of the compound is an amount that lessens or ameliorates at least one symptom of the disorder for which the compound is administered, Typically, the compositions are formulated for single dosage administration. The concentration of active compound in the drug composition will depend on absorption, inactivation, and excretion rates of the active compound, the dosage schedule, and amount administered as well as other factors known to those of skill in the art.

In some examples, about 0.1 mg to 1000 mg of a disclosed compound, a mixture of such compounds, or a physiologically acceptable salt or ester thereof, is compounded with a physiologically acceptable vehicle, carrier, excipient, binder, preservative, stabilizer, flavor, etc., in a unit dosage form. The amount of active substance in those compositions or preparations is such that a suitable dosage in the range indicated is obtained. The term "unit dosage form" refers to physically discrete units suitable as unitary dosages for human subjects and other mammals, each unit containing a predetermined quantity of active material calculated to produce the desired therapeutic effect, in association with a suitable pharmaceutical excipient. In some examples, the compositions are formulated in a unit dosage form, each dosage containing from about 1 mg to about 1000 mg (for example, about 2 mg to about 500 mg, about 5 mg to 50 mg, about 10 mg to 100 mg, or about 25 mg to 75 mg) of the one or more compounds. In other examples, the unit dosage form includes about 0.1 mg, about 1 mg, about 5 mg, about 10 mg, about 20 mg, about 30 mg, about 40 mg, about 50 mg, about 60 mg, about 70 mg, about 80 mg, about 90 mg, about 100 mg, about 150 mg, about 200 mg, about 250 mg, about 300 mg, about 400 mg, about 500 mg, about 600 mg, about 700 mg, about 800 mg, about 900 mg, about 1000 mg, or more of the disclosed compound(s).

The disclosed compounds or compositions may be administered as a single dose or may be divided into a number of smaller doses to be administered at intervals of time.

The therapeutic compositions can be administered in a single dose delivery, by continuous delivery over an extended time period, in a repeated administration protocol (for example, by a multi-daily, daily, weekly, or monthly repeated administration protocol). It is understood that the precise dosage, timing, and duration of treatment is a function of the disease being treated and may be determined empirically using known testing protocols or by extrapolation from in vivo or in vitro test data. It is to be noted that concentrations and dosage values may also vary with the severity of the condition to be alleviated. In addition, it is understood that for a specific subject, dosage regimens may be adjusted over time according to the individual need and the professional judgment of the person administering or supervising the administration of the compositions, and that the concentration ranges set forth herein are exemplary only.

When administered orally as a suspension, these compositions are prepared according to techniques well known in the art of pharmaceutical formulation and may contain microcrystalline cellulose for imparting bulk, alginic acid or sodium alginate as a suspending agent, methylcellulose as a viscosity enhancer, and sweeteners/flavoring agents. As immediate release tablets, these compositions may contain microcrystalline cellulose, dicalcium phosphate, starch, magnesium stearate and lactose and/or other excipients, binders, extenders, disintegrants, diluents and lubricants. If oral administration is desired, the compound is typically provided in a composition that protects it from the acidic environment of the stomach. For example, the composition can be formulated in an enteric coating that maintains its integrity in the stomach and releases the active compound in the intestine. The composition may also be formulated in combination with an antacid or other such ingredient.

Oral compositions will generally include an inert diluent or an edible carrier and may be compressed into tablets or enclosed in gelatin capsules. For the purpose of oral therapeutic administration, the active compound or compounds can be incorporated with excipients and used in the form of tablets, capsules, or troches. Pharmaceutically compatible binding agents and adjuvant materials can be included as part of the composition. The tablets, pills, capsules, troches, and the like can contain any of the following ingredients or compounds of a similar nature: a binder such as, but not limited to, gum tragacanth, acacia, corn starch, or gelatin; an excipient such as microcrystalline cellulose, starch, or lactose; a disintegrating agent such as, but not limited to, alginic acid and corn starch; a lubricant such as, but not limited to, magnesium stearate; a gildant, such as, but not limited to, colloidal silicon dioxide; a sweetening agent such as sucrose or saccharin; and a flavoring agent such as peppermint, methyl salicylate, or fruit flavoring.

When the dosage unit form is a capsule, it can contain, in addition to material of the above type, a liquid carrier such as a fatty oil. In addition, dosage unit forms can contain various other materials, which modify the physical form of the dosage unit, for example, coatings of sugar and other enteric agents. The compounds can also be administered as a component of an elixir, suspension, syrup, wafer, chewing gum or the like. A syrup may contain, in addition to the active compounds, sucrose as a sweetening agent and certain preservatives, dyes and colorings, and flavors.

When administered orally, the compounds can be administered in usual dosage forms for oral administration. These dosage forms include the usual solid unit dosage forms of tablets and capsules as well as liquid dosage forms such as solutions, suspensions, and elixirs. When the solid dosage forms are used, it is preferred that they be of the sustained release type so that the compounds need to be administered only once or twice daily. In some examples, an oral dosage form is administered to the subject 1, 2, 3, 4, or more times daily. In additional examples, the compounds can be administered orally to humans in a dosage range of 1 to 1000 mg/kg body weight in single or divided doses. One illustrative dosage range is 0.1 to 200 mg/kg body weight orally (such as 0.5 to 100 mg/kg body weight orally) in single or divided doses. For oral administration, the compositions may be provided in the form of tablets containing about 1 to 1000 milligrams of the active ingredient, particularly 1, 5, 10, 15, 20, 25, 50, 75, 100, 150, 200, 250, 300, 400, 500, 600, 750, 800, 900, or 1000 milligrams of the active ingredient. It will be understood, however, that the specific dose level and frequency of dosage for any particular patient may be varied and will depend upon a variety of factors including the activity of the specific compound employed, the metabolic stability and length of action of that compound, the age, body weight, general health, sex, diet, mode and time of administration, rate of excretion, drug combination, the severity of the particular condition, and the host undergoing therapy.

Injectable solutions or suspensions may also be formulated, using suitable non-toxic, parenterally-acceptable diluents or solvents, such as mannitol, 1,3-butanediol, water, Ringer's solution or isotonic sodium chloride solution, or suitable dispersing or wetting and suspending agents, such as sterile, bland, fixed oils, including synthetic mono- or diglycerides, and fatty acids, including oleic acid. Solutions or suspensions used for parenteral, intradermal, subcutaneous, or topical application can include any of the following components: a sterile diluent such as water for injection, saline solution, fixed oil, a naturally occurring vegetable oil such as sesame oil, coconut oil, peanut oil, cottonseed oil, and the like, or a synthetic fatty vehicle such as ethyl oleate, and the like, polyethylene glycol, glycerine, propylene glycol, or other synthetic solvent; antimicrobial agents such as benzyl alcohol and methyl parabens; antioxidants such as ascorbic acid and sodium bisulfite; chelating agents such as ethylenediaminetetraacetic acid (EDTA); buffers such as acetates, citrates, and phosphates; and agents for the adjustment of tonicity such as sodium chloride and dextrose. Parenteral preparations can be enclosed in ampoules, disposable syringes, or multiple dose vials made of glass, plastic, or other suitable material. Buffers, preservatives, antioxidants, and the like can be incorporated as required.

Where administered intravenously, suitable carriers include physiological saline, phosphate buffered saline (PBS), and solutions containing thickening and solubilizing agents such as glucose, polyethylene glycol, polypropyleneglycol, and mixtures thereof. Liposomal suspensions including tissue-targeted liposomes may also be suitable as pharmaceutically acceptable carriers.

The compounds can be administered parenterally, for example, by IV, IM, depo-IM, SC, or depo-SC. When administered parenterally, a therapeutically effective amount of about 0.1 to about 500 mg/day (such as about 1 mg/day to about 100 mg/day, or about 5 mg/day to about 50 mg/day) may be delivered. When a depot formulation is used for injection once a month or once every two weeks, the dose may be about 0.1 mg/day to about 100 mg/day, or a monthly dose of from about 3 mg to about 3000 mg.

The compounds can also be administered sublingually. When given sublingually, the compounds should be given one to four times daily in the amounts described above for IM administration.

The compounds can also be administered intranasally. When given by this route, the appropriate dosage forms are a nasal spray or dry powder. The dosage of the compounds for intranasal administration is the amount described above for IM administration. When administered by nasal aerosol or inhalation, these compositions may be prepared according to techniques well known in the art of pharmaceutical formulation and may be prepared as solutions in saline, employing benzyl alcohol or other suitable preservatives, absorption promoters to enhance bioavailability, fluorocarbons, and/or other solubilizing or dispersing agents.

The compounds can be administered intrathecally. When given by this route, the appropriate dosage form can be a parenteral dosage form. The dosage of the compounds for intrathecal administration is the amount described above for IM administration.

The compounds can be administered topically. When given by this route, the appropriate dosage form is a cream, ointment, or patch. When administered topically, an illustrative dosage is from about 0.5 mg/day to about 200 mg/day. Because the amount that can be delivered by a patch is limited, two or more patches may be used.

The compounds can be administered rectally by suppository. When administered by suppository, an illustrative therapeutically effective amount may range from about 0.5 mg to about 500 mg. When rectally administered in the form of suppositories, these compositions may be prepared by mixing the drug with a suitable non-irritating excipient, such as cocoa butter, synthetic glyceride esters of polyethylene glycols, which are solid at ordinary temperatures, but liquefy and/or dissolve in the rectal cavity to release the drug.

It should be apparent to one skilled in the art that the exact dosage and frequency of administration will depend on the particular compounds administered, the particular condition being treated, the severity of the condition being treated, the age, weight, general physical condition of the particular subject, and other medication the individual may be taking as is well known to administering physicians or other clinicians who are skilled in therapy of retroviral infections, diseases, and associated disorders.

IV. Examples

Experimental

Cells, cell culture. HT-29 (ATCC, Manassas, VA; HTB-38) and HCT 116 (ATCC, CCL-247) cell lines were grown in McCoy5A medium (Corning, Corning, NY; 10-050-CV) supplemented with 10% FBS (Sigma-Aldrich, St. Louis, MO; F2442) and penicillin/streptomycin (ThermoFisher Scientific, Waltham, MA; 15140122); DLD-1 (ATCC, CCL-221), Colo 205 (ATCC, CCL-222) and H747 (ATCC, CCL-252) cell lines were grown in RPMI-1640 medium (Corning, 10-040-CV), supplemented with 10% FBS and penicillin/streptomycin; SW620 (ATCC, CCL-227), SW480 (ATCC, CCL-228), RKO (ATCC, CCL-2577), SK-Co-1 (ATCC, HTB-39). MG-63 (ATCC, CRL-1427) cell lines were grown in DMEM medium (Corning, 10-017-CV), supplemented with 10% FBS and penicillin/streptomycin. LoVo (ATCC, CCL-229) and Sum149 (BiolVT, Detroit, MI) cell lines were grown in F12K medium (ATCC, 30-2004) supplemented with 10% FBS and penicillin/streptomycin, Human Umbilical Vein Endothelial Cells (HUVEC) from an individual donor were purchased from Lifeline Cell Technologies (Frederick, MD; FC-0003) were cultured in M199 (Corning, 10-060-CV) medium supplemented with 50 µg/mL ascorbic acid (Sigma, A4034), 25 µg/mL heparin (Sigma, H3149), 2 mM L-glutamine (ThermoFisher, 25030081), penicillin/streptomycin, endothelial growth factor supplement (Sigma, E9640), 5% human serum (Sigma, 4522), 20% heat inactivated newborn calf serum (Sigma, N4637).

Cell proliferation was measured by $^3$H-Thymidine incorporation. Briefly, 0.5 µCi $^3$H-Thymidine (Perkin Elmer, Waltham, MA; NET027WW001MC) was added to cells in 200 µL of culture media in a 96 well plate for 8-18 hours. Plates were frozen to stop cell growth, cells harvested onto glass fiber filters (Perkin Elmer, 1450-421) dried by microwave, wet with FiltronX liquid scintillation fluid (National Diagnostics, Atlanta, GA; LS-201) and incorporated radioactivity counted in a liquid scintillation counter (Perkin Elmer, MicroBeta-1450 or MicroBeta-2450). Human pooled neonatal dermal microvascular endothelial cells (hDMEC) were purchased from Lonza Biosciences. All lines were used for a maximum number of 10-15 passages over ~4 years. All cell lines tested negative for mycoplasma (yearly) and MTBM (Molecular Testing of Biological Materials; tested once).

NVP-BHG712 (Truster et al., 2018), NVP-Iso (Sigma, SML0333, Lots 042M4735V and 124M4703V), spautin-1 (Sigma, SML0440), rapamycin (Sigma, 88781) and Z-VAD-FMK (R&D Systems, FMK001) were reconstituted in DMSO. Diluent control (DMSO in culture medium) was adjusted to the DMSO concentration of the drug. Chloroquine (Sigma, C6628) was reconstituted in PBS. 3-Methyladenine (3-MA, Selleckchem, 52767) was dissolved into culture media and used immediately.

Cell viability was measured by flow cytometry. Briefly, floating and adherent cells were collected by centrifugation, pelleted and suspended in PBS −/− (ThermoFisher, 10010-049) supplemented with 1% BSA (Sigma, A2153), 5 mM EDTA (Qualify Biological, 351-027), 10 mM glucose (Sigma, D9434) and 10 mM HEPES (Corning, 25-060-CI). After the cells ($1\times10^6$ cells/mL) were stained with 25 µM DRAQ5 (BioLegend, San Diego, CA; 424101) for 60 minutes and 2 µg propidium iodide (ThermoFisher, P3566) for 15 minutes, analysis was performed on a FACSCantoII (BD Biosciences, Franklin Lakes, NJ; 338962). Results were analyzed by FloJo software (FlowJo LLC, Ashland, OR).

Cell viability was also measured by detection of cell-associated cleaved caspase-3. Cells were grown on gelatin-coated glass chamber slides, fixed in 4% paraformaldehyde, immune-stained with rabbit monoclonal antibody to cleaved Caspase 3 (1:100 Cell Signaling Technology) followed by Alexa Fluor 488-conjugated anti-rabbit IgG (1:400 Invitrogen) and mounted with Vectastain containing DAPI (Vector Laboratories). The slides were imaged through a Zeiss LSM780 confocal microscope. Image quantification (cleaved Caspase-3$^+$ nuclei/total nuclei) was performed by CellProfiler software.

Autophagy-related cell death was assessed by evaluation of LC3 autophagy-associated protein. The cells were first induced to stably express fluorescent pK (pHluorin-mKate2) LC3 by lentiviral infection. The cells were subsequently grown on glass coverslips (ThermoFisher, 12-545-81) until 50% confluent. Coverslips were washed with PBS −/−, fixed with 4% PFA for 15 minutes at room temperature, washed with TBS, mounted with DAPI-containing mounting media, allowed to harden overnight and sealed. Coverslips were imaged on a confocal Zeiss 780 microscope. Images were analyzed by CellProfiler using automatic thresholding to calculate the number of nuclei (DAPI staining) and the number of puncta. The results are expressed as the percent cells with two or more puncta. Images were colorized with Fiji software. Monolayer cell confluency overtime was measured by IncuCyte HD (Essen BioSciences) imaging.

Cell cycle was assessed by flow cytometry. Adherent cells were harvested, washed with PBS and fixed for 30 minutes in cold 70% ethanol at 4° C. Cells were washed twice with PBS, treated with 2.5 µg/mL RNaseA (ThermoFisher, 12091039) for 30 minutes at room temperature, and then stained with 10 µg propidium iodide for 15 minutes prior to analysis performed on FACS Canton (BD Biosciences; San Jose, CA) and cell cycled analyzed (FloJo software).

Western blotting. Protein lysates were separated by SDS-PAGE and then transferred to a nitrocellulose membrane. After blocking, membranes were incubated overnight with antibodies to LC3 (rabbit Monoclonal antibody, Cell Signaling). After washing with TBS-T (TBS with 0.05 Tween-20), membranes were incubated with the HRP (Horseradish peroxidase)-linked secondary antibody (IgG donkey anti-rabbit IgG (NA934) (GE LifeSciences, Marlborough, MA). Blots were developed using ECL prime (GE LifeSciences, RPN2232) and digitally captured on an LAS4000 (GE LifeSciences). After stripping, the membrane was re-probed with a mouse monoclonal antibody to GAPDH (Santa Cruz) followed by a secondary IgG sheep anti-mouse IgG (NA931). Western blot bands were quantified using Fiji (Schindelin et al., 2012).

ELISA. ELISA plates (ThermoFisher Scientific, Immulon 4HBX, 3855) were coated overnight at 4° C. with capture antibody 75 ng/well in PBS, and blocked with 5% BSA (Sigma-Aldrich, St. Louis, MO) in PBS for two hours at room temperature. Capture antibodies for EphB4 was goat polyclonal antibody (R&D Systems AF3038); for EphA2 was goat polyclonal antibody (R&D Systems AF3035); 10 ug of cell lysate was applied to the ELISA well for two hours at room temperature. The amount of tyrosine phosphorylation was measured with pTyr-HRP antibody (R&D Systems, HAM1676). The ELISA was developed with 3,3',5, 5'-Tetramethylbenzidine (TMB) (ThermoFisher Scientific, 7588927) for 15 minutes and stopped with 1M $H_2SO_4$ (Sigma-Aldrich, 258105). Absorbance at 450 nm was measured using POLARstar Optima plate reader (BMG Labtech, Cary, NC). All conditions were tested in duplicate. pEphB2 was measured by ELISA (Ray Biotech, PEL-EphB2-Y) according to the manufacturer's recommendations.

Immunostaining and microscopy. Tumor tissue sections were fixed with 4% PFA (Electron Microscopy Science, Hatfield, PA; 15713) and processed for histology to generate 10 µm sequential tumor sections on glass slides (Histoserve, Germantown, MD) as described (Kwak et al., *J Clin Invest* 2016, 126:4554-4568). After thawing, sections were incubated with Uni-Trieve solution (Innovex Biosciences, Richmond, CA; NB325) at 75° C. for 45 minutes. After washing three times with wash buffer (PBS/1% Triton X-100), blocking (10% glycerol, 5% donkey serum [Sigma, D9663], TBS, 0.4% Triton X-100) for one hour at room temperature, washing once with wash buffer, tissues were incubated overnight at 4° C. with primary antibody diluted in buffer (TBS, 10% glycerol, 0.5% BSA, 0.4% Triton X-100) (Table S3). Slides were then washed three times with wash buffer, and incubated with secondary antibodies (Alexa Fluor 488 donkey anti rat IgG [ThermoFisher, A21208] and Alexa Fluor 594 donkey anti rabbit IgG [ThermoFisher, A21207]) for one hour at 4° C. The slides were washed three times with wash buffer, fixed with 4% PFA/PBS for 15 minutes at room temperature, washed once with wash buffer and mounted with DAPI containing mounting media (Southern Biotech, Birmingham, AL; 0100-20). Sections from five tumors closest in weight to the average group weight were imaged using a 780 confocal microscope (Carl Zeiss, Oberkochen, Germany) at 20× magnification. Three regions (5×5, 20× objective, tiled area with 3 z-slices reflecting 4.5 µm) were imaged from each tumor section. Maximum intensity projections (Zen Software 2.3 Blue Edition; Carl Zeiss) were used for quantification using CellProfiler software (Kamentsky et al., *Bioinformatics* 2011, 27:1179-1180) with automatic thresholding. Integrated intensity of CD31 was measured. The percent Ki-67 positive cells was measured by calculating the number of Ki-67 positive cells/total number DAPI$^+$ nuclei. The area of cleaved Caspase-3 positive area/total area was calculated by CellProfiler with automatic threshold. For LC3 quantification, cells stably expressing fluorescent pK (pHluorin-mKate2) LC3 after lentiviral infection with pk-LC were grown on autoclaved glass coverslips (ThermoFisher, 12-545-81) until 50% confluent. Coverslips were washed with PBS −/−, fixed with 4% PFA for 15 minutes at room temperature, washed with TBS, mounted with DAPI-containing mounting media, allowed to harden overnight and sealed. Coverslips were imaged on a confocal Zeiss 780 microscope or an Olympus IX51 (Shinjuku, Tokyo, Japan) inverted microscope. Images were analyzed by CellProfiler using automatic thresholding to calculate the number of nuclei (DAPI staining) and the number of puncta. The results are expressed as the average number of puncta/cell or as percent cells with two or more puncta. Images were colorized with Fiji software. Antibodies are listed in Table 1.

TABLE 1

List of antibodies used

| Target | Host | Clonality[A] | Source | Catalog number | Western dilution | 1F[B] dilution | IP[C] per 250 µg lysate |
|---|---|---|---|---|---|---|---|
| EphrinB2 | rabbit | mono | Abcam | ab150411 | 1:1000 | 1:100 | |
| EphrinB | rabbit | poly | Santa Cruz | sc-910 | | | 1 µg |
| pEphrinB | rabbit | poly | Cell Signaling | 3481 | | 1:100 | |
| EphA4 | rabbit | poly | Abcam | ab5396 | 1:1000 | | |
| EphB1 | rabbit | poly | Stratagene | | 1:500 | | |
| EphB2 | goat | poly | R&D Systems | AF467 | 1 µg/mL | | |
| pEphB1 + B2 (pY594 + pY604) | rabbit | poly | Abcam | ab61791 | 1:500 | | |
| EphB4 | goat | poly | R&D Systems | AF3038 | 1 µg/mL | 5 µg/mL | 1 µg |
| GAPDH | mouse | mono | Santa Cruz | sc-47724 | 1:1000 | | |
| B-actin | mouse | mono | Santa Cw | sc-47778 | 1:1000 | | |
| pTyr (4G10) | mouse | mono | Millipore-Sigma | 05-1050 | 1:1000 | | |
| CD31 | rat | mono | HistoRiotec | SZ31 | | 1:20 | |
| K167 | rabbit | mono | Cell Signaling | 9129 | | 1:400 | |
| cleaved Caspase-3 | rabbit | mono | Cell Signaling | 9579 | | 1:200 | |
| LC3 A/B | rabbit | mono | Cell Signaling | 12741 | 1:1000 | | |
| ATG5 | rabbit | mono | Cell Signaling | 12994 | 1:1000 | | |
| p-mTor (S2448) | rabbit | poly | Cell Signaling | 2971 | 1:1000 | | |
| mTor | mouse | mono | Cell Signaling | 4517 | 1:1000 | | |

[A]mono, monoclonal; poly, polyclonal;
[B]immunofluorescence;
[C]IP, immunoprecipitation Immunoprecipitation, immunoblotting and measurement of phospho-EphB4. Lysates from cells, harvested from dishes by scraping with ice-cold PBS, were suspended in freshly prepared TNTC lysis buffer (1×TBS (Quality Biological, Gaithersburg, MD; 351-086-101), 1% Triton X100 (Sigma, T9284), 20% glycerol (ThermoFisher, 17904), 1× protease inhibitor cocktail (ThermoFisher, 78425) and 1× phosphatase inhibitor, (Sigma, P5726). After incubation (one hour at 4° C.), lysates were spun (10,000×g, 20 minutes) and supernatants stored at −20° C. For immunoprecipitation, cell lysates (250 µg) pre-cleared with 25 µL protein G DynaBeads (ThermoFisher, 10004D) for 30 minutes at 4° C. rotating, were incubated with 1 µg immunoprecipitating antibody (Table 1) overnight at 4° C. rotating. After incubation, 25 µL of protein G DynaBeads, were added to the antibody/lysate complex for one hour at 4° C. rotating. The beads/antibody/protein complex was washed twice with TNG buffer, twice with HNTG high salt buffer (20 mM HEPES, 500 mM NaCl, QualityBiological, 351-036-101, 1% TritonX100, 10% glycerol), twice with HNTG low salt (20 mM HEPES, 150 mM NaCl, 1% TritonX100, 10% glycerol). Protein was eluted from the beads by incubation with sample buffer (1×LDS, ThermoFisher, NP0007) containing 5% beta-mercaptoethanol (Sigma, M3148) at 100° C. for 5 minutes. Protein lysates and immunoprecipitates were separated by SDS-PAGE using NuPage 4-12% Bis-Tris gels (ThermoFisher, NP0321, NP0323), with either MOPS (ThermoFisher, NP0001) or MES (ThermoFisher, NP0002) running buffer, Separated proteins were transferred to a nitrocellulose membrane using the iBlot dry transfer system (ThermoFisher, IB1001). Membranes were blocked in TBS supplemented with 0.05% Tweet) 20 (Sigma, P1379) and 5% non-fat dry milk (Lab Scientific, Highlands, NJ; M0841) for at least one hour at room temperature. Membranes were incubated overnight at 4° C. with primary antibody at appropriate dilutions (Table 1). After washing with TBS-T (TBS with 0.05 Tween-20), membranes were incubated with the appropriate HRP (Horseradish peroxidase)-linked secondary antibody, IgG sheep anti-mouse IgG (NA931), IgG donkey anti-rabbit IgG (NA934) (both from GE LifeSciences, Marlborough, MA) or IgG rabbit anti-goat (ThermoFisher, A27014). Blots were developed using ECL prime (GE LifeSciences, RPN2232) and digitally captured on an LAS4000 (GE LifeSciences). Western blot bands were quantified using Fiji (Schindelin et al., *Nat Methods* 2012, 9:676-682). Human phosphotyrosine EphB4 content was measured by ELISA (R&D Systems, DYC4057) in tumor lysates prepared with TissueLyser LT (Qiagen, 85600) in TNTG lysis buffer, according to manufacturer's recommendations. Total EphB4 content in the tumor lysates was measured by immunoblotting with human EphB4-specific antibody (Table 1).

EphrinB2-Fc cell stimulation. Cells were plated at 50% confluency 24 hours prior to stimulation. Human EphrinB2-Fc (R&D Systems, Minneapolis, MN; 7397-EB-050) and human IgG-Fc (JacksonImmuno Research, West Grove, PA; 009-000-008) were individually clustered with anti-human IgG-Fc-specific antibody (ThermoFisher, 628400) for one hour at 37° C. by incubating individually EphrinB2-Fc and human IgG-Fc (200 µg/mL) with anti-human IgG-Fc (200 µg/mL). Clustered EphrinB2-Fc and control IgG-Fc (1 µg/mL clustered EphrinB2-Fc final concentration) was used to stimulate cells for 15 minutes at 37° C. To help preserve protein phosphorylation, cells were treated with 100 µM pervanadate for 15 minutes at 37° C. prior to preparation of cell lysates. Pervanadate was generated by combining 100 mM sodium orthovanadate (Sigma, 56508) with 3% hydrogen peroxide (Sigma. 216763) for 30 minutes at 37° C.

Tumor model. All animal studies were approved by the Institutional Animal Care and Use Committee of the CCR, National Cancer Institute (NCI), NIH. The studies were conducted in adherence to the *NIH Guide for the Care and Use of Laboratory Animals* (National Academies Press, 2011), Female Nu/Nu mice (6-10-week old, Charles River Laboratories') bearing subcutaneous tumors with an average tumor volume of 100 mm³ (V=D(d²)/2, where (D) and (d) are respectively the longest and shortest perpendicular dimensions) were randomized to receive drug (NVP-Iso 15 mg/kg) or diluent control as daily intraperitoneal injections (0.1 ml). Mice were euthanized when any tumor reached a maximum diameter of 20 mm in any direction. In more detail, female Nu/Nu mice six to ten weeks old were purchased from Charles River Laboratories (Wilmington, MA; strain code 088). Mice were inoculated with tumor cells (10×10⁶ cells/mouse/0.1 ml volume) subcutaneously (s.c.) in the flank. Tumor volume (V) was calculated from caliper measurements as V=D(d²)/2, where (D) and (d) are respectively the longest and shortest perpendicular dimensions. Mice were randomized to receive drug or formulation buffer when the average tumor volume reached 100 mm³, Mice were dosed daily intraperitoneally (i.p.) with either formulation buffer (PBS/DMSO, 150:1150) or NVP-Iso (15 mg/kg diluted in formulation buffer). Total injection volume was 100 µl. The mouse diet was supplemented with gel meal (DietGel Boost, ClearH2O, Westbrook, ME) daring dosing. Mice were euthanized when any tumor reached a size of 20 mm in any direction. Tumors were removed in toto from the mice and tumor weight measured. Tissue samples were snap frozen in liquid nitrogen for protein preservation, fixed in 4% PFA overnight, washed in PBS and placed in sucrose solutions at increasing sucrose concentrations (10%-30%) prior to embedding in OCT (Sakura Finetek, Torrance, CA, 4583) for immunostaining.

Data analysis and statistics. Unpaired 2-tailed Student's t test, 2-tailed Mann-Whitney U-test, Mantel-Cox log rank test, Cochran-Armitage trend test (described in Supplemental Methods) were applied as needed. Data are expressed as mean±SD or ±SEM; P-values <0.05 were considered statistically significant.

Example 1

Evaluation of NVP-BHG712 and NVP-Iso

NVP-BHG712

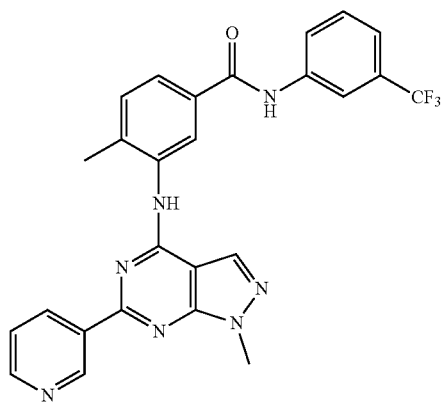

-continued

NVP-Iso

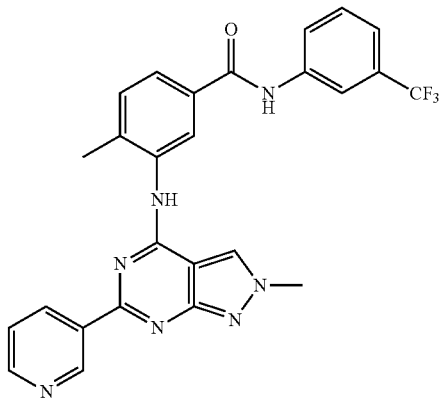

Figure 1D:
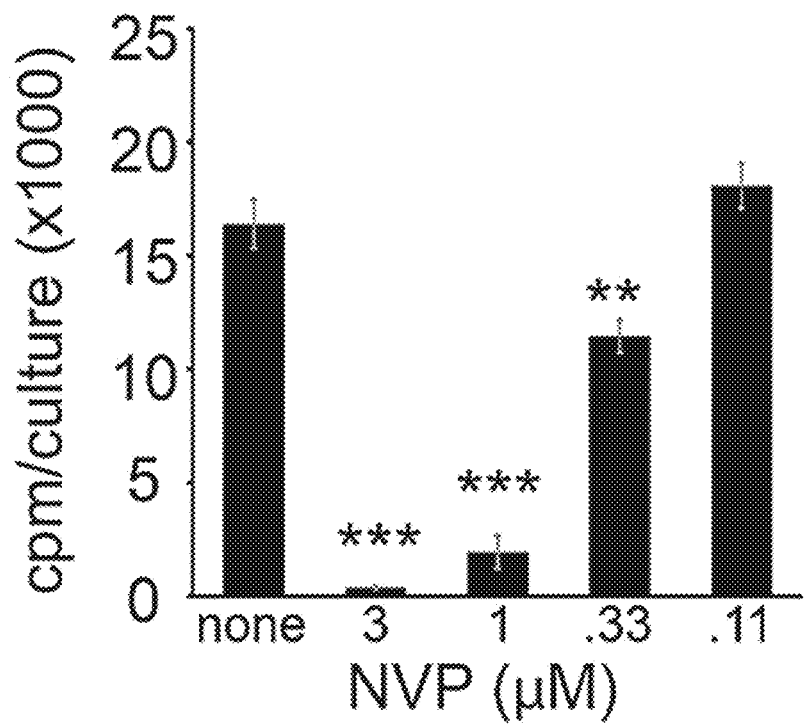

NVP-BHG712 is a small molecular weight tyrosine kinase inhibitor identified by modeling the EphB4 kinase domain and optimization for inhibition of EphB4 phosphorylation in cells, which showed great selectivity and potency for EphB receptors among a large panel of receptor tyrosine kinase receptors (Chen et al., 2017; Martiny-Baron et al., 2010). In validation experiments, 1 µM NVP-BHG712 (NVP) and its regioisomer NVP-Iso (Troster et al., 2018) were found to reduce endogenous EphB4 tyrosine phosphorylation in the EphB4⁺ HT-29 cells (FIG. 1A), and specifically reduce EphB2 tyrosine phosphorylation induced by clustered EphrinB2-Fc in the EphB2⁺ Colo205 cells (FIG. 1B). Consistent with NVP specificity for targeting tyrosine kinase receptors. 1 µM NVP and 1 µM NVP-Iso did not reduce endogenous EphrinB2 phosphorylation in HT-29 cells FIG. 1C). EphrinB2 does not possess an intrinsic catalytic activity for signaling, relying instead on the recruitment of other molecules to transmit phosphorylation-dependent and independent signals (Daar, 2012).

Figure 1E:
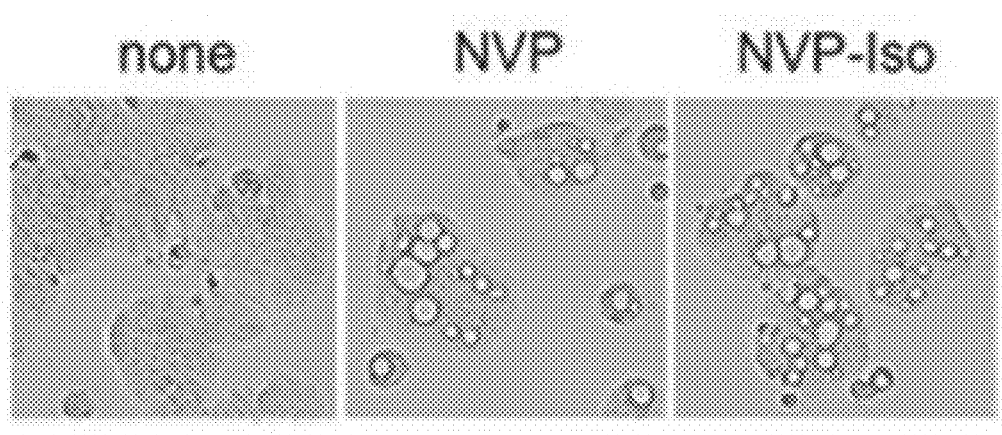
Figure 1F:
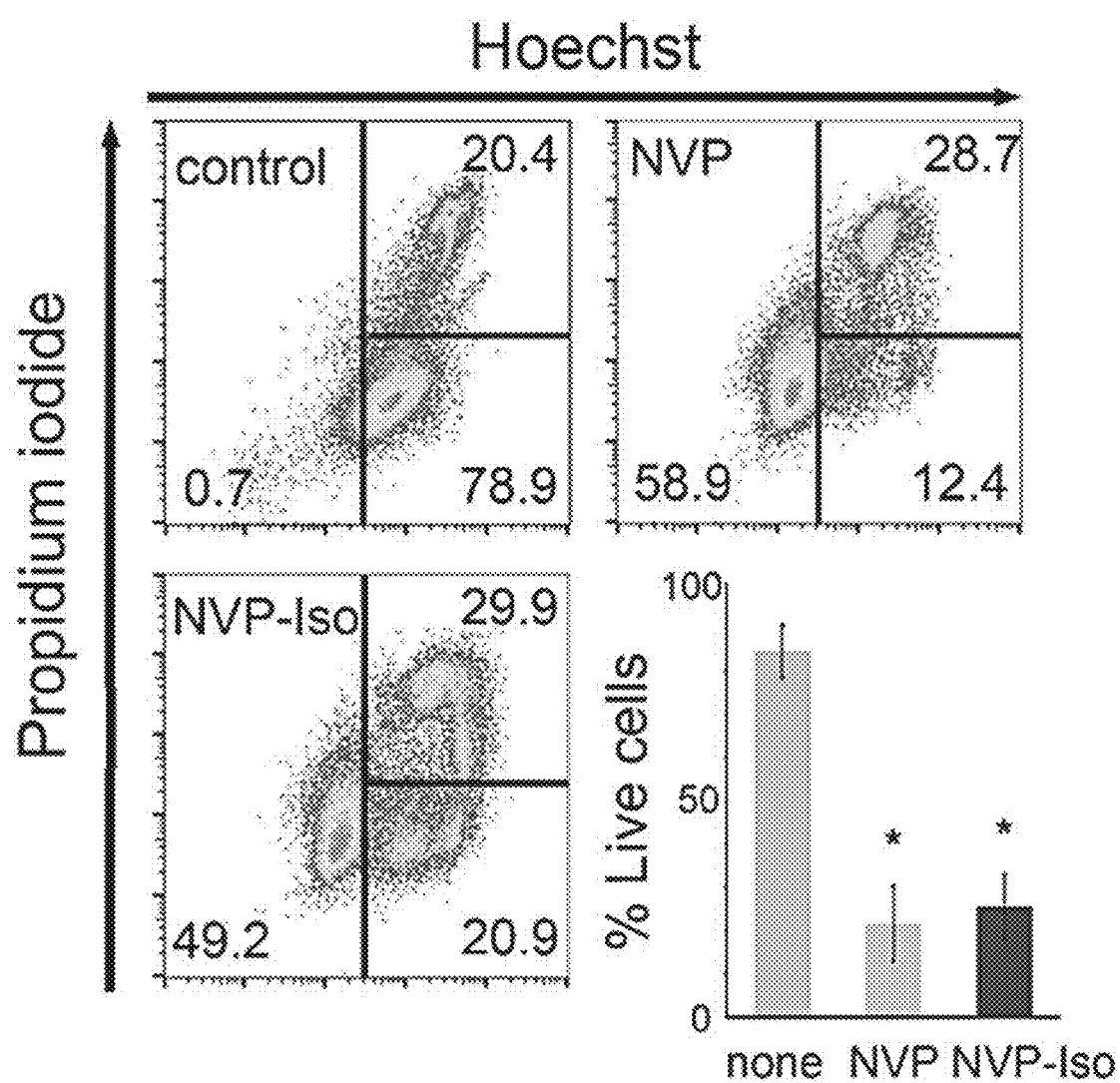
Figure 1G:
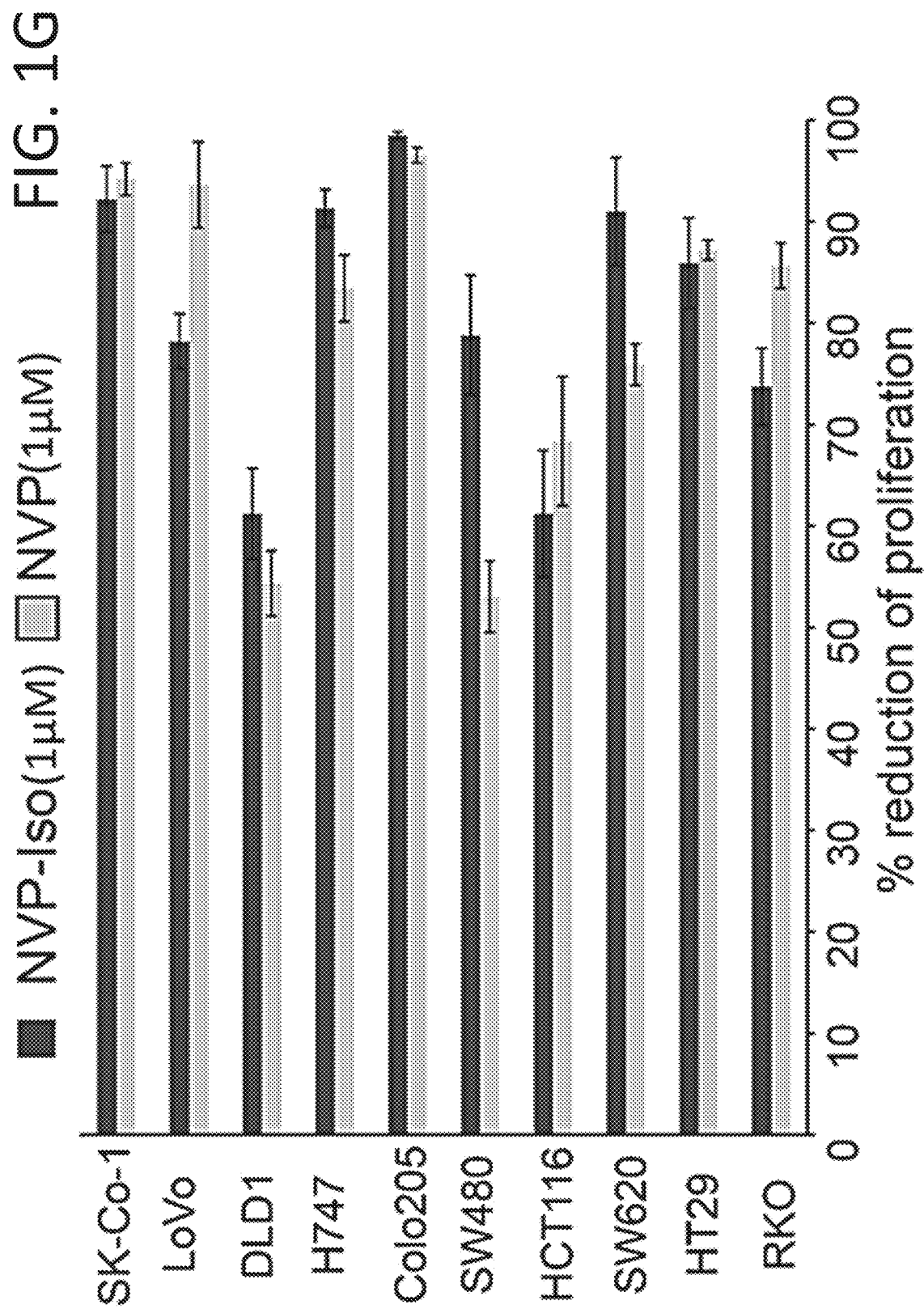
Figure 2A:
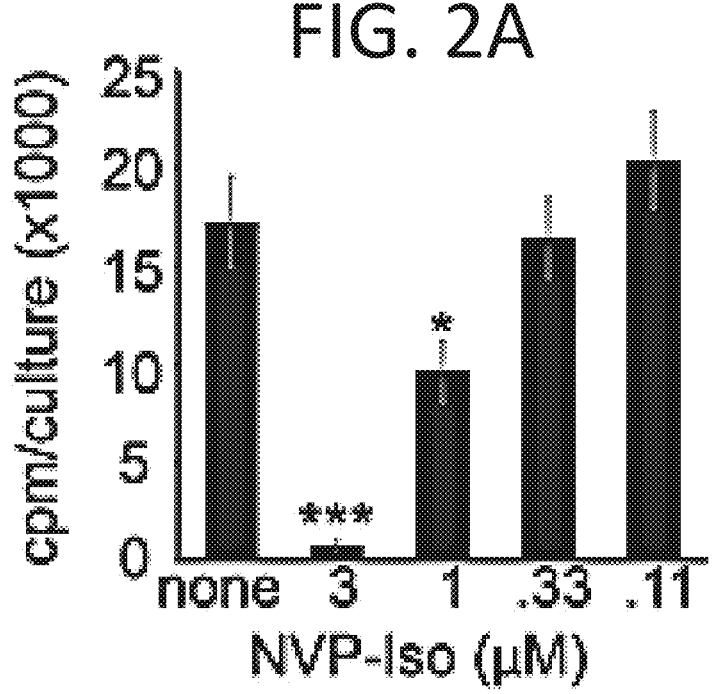
Figure 2B:
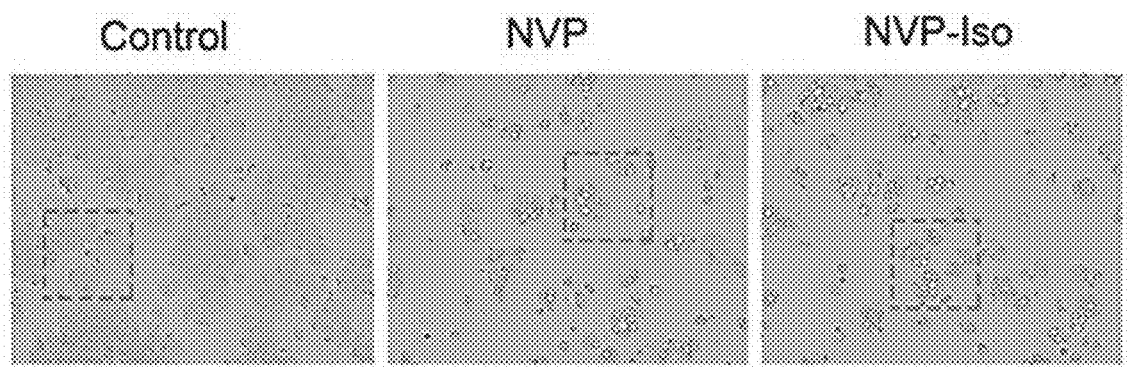
Figure 2C:
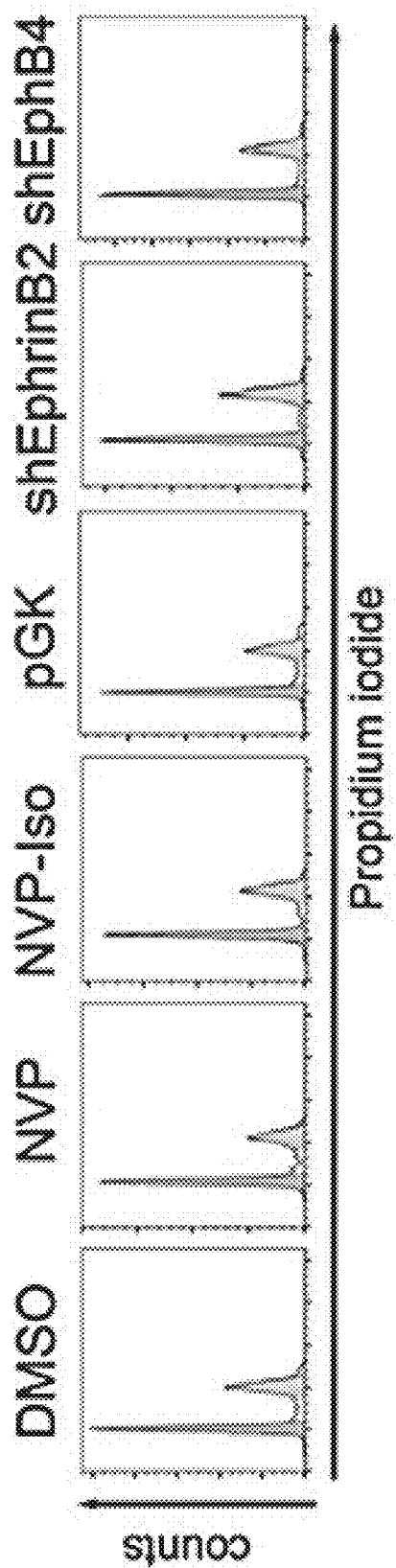

NVP (FIG. 1D) and NVP-Iso (FIG. 2A) dose-dependently reduced HT-29 cell proliferation. At 1 µM, NVP and NVP-Iso reduced HT-29 cell monolayer coverage (FIG. 2B), caused development of vesicular-like structures in HT-29 cells (FIG. 1E) and promoted significant cell death, as assessed by flow cytometry (FIG. 1F). Neither compound altered cell cycle distribution of HT-29 cells (FIG. 2C). Analysis of the effects of NVP and NVP-iso on cell proliferation was extended to include 10 colorectal carcinomas cell lines in which the silencing EphrinB2, EphB2 or EphB4 significantly reduced cell proliferation. NVP and NVP-Iso (1 µM) reduced substantially (>50% reduction) the proliferation of all colorectal carcinoma cell lines (FIG. 1G), The degree of growth reduction induced by NVP and NVP-Iso across all colorectal carcinoma cell lines in some cases surpassed the degree of inhibition induced by the silencing of EphrinB2 or the silencing of its individual receptors. This is likely attributable to the expression of Eph tyrosine kinase receptors that are not EphrinB2 receptors (Kania and Klein, 2016) in colorectal carcinoma cells (Herath 2012) and to the broad Eph targeting of the tyrosine kinase inhibitor NVP (23). In contrast, NVP and NVP-Iso minimally reduced the proliferation of primary human endothelial cells (human umbilical vein endothelial cells, HUVEC and human dermal microvascular endothelial cells, hDMEC) and the human osteosarcoma MG63 cell line at the effective dose (104) (FIG. 2D). Noteworthy, HUVEC express EphrinB2 and EphB4, but HUVEC survival in vitro is independent of EphB4 signaling (Salvucci et al., 2015).

Figure 1I:
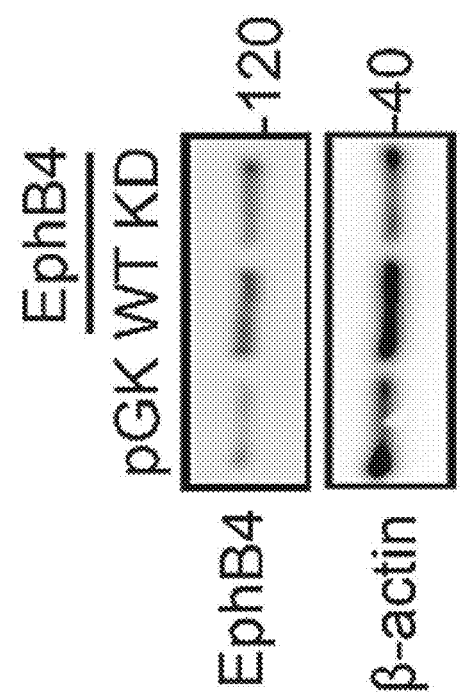
Figure 1H:
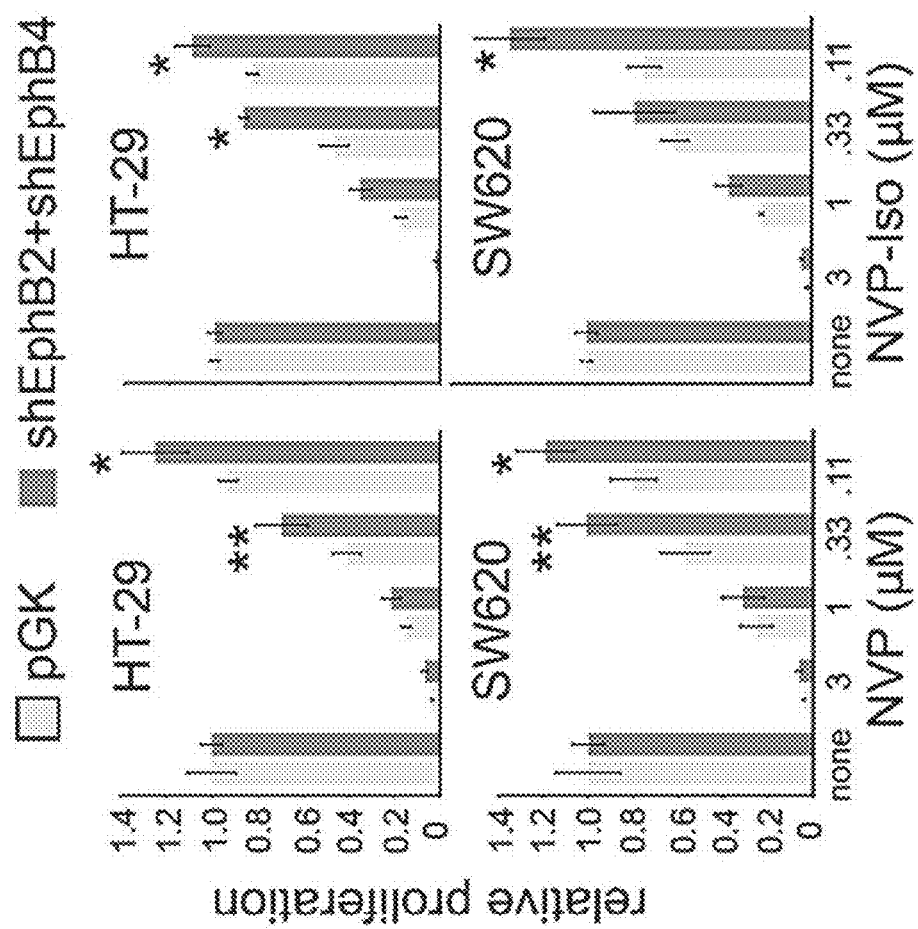
Figure 1J:
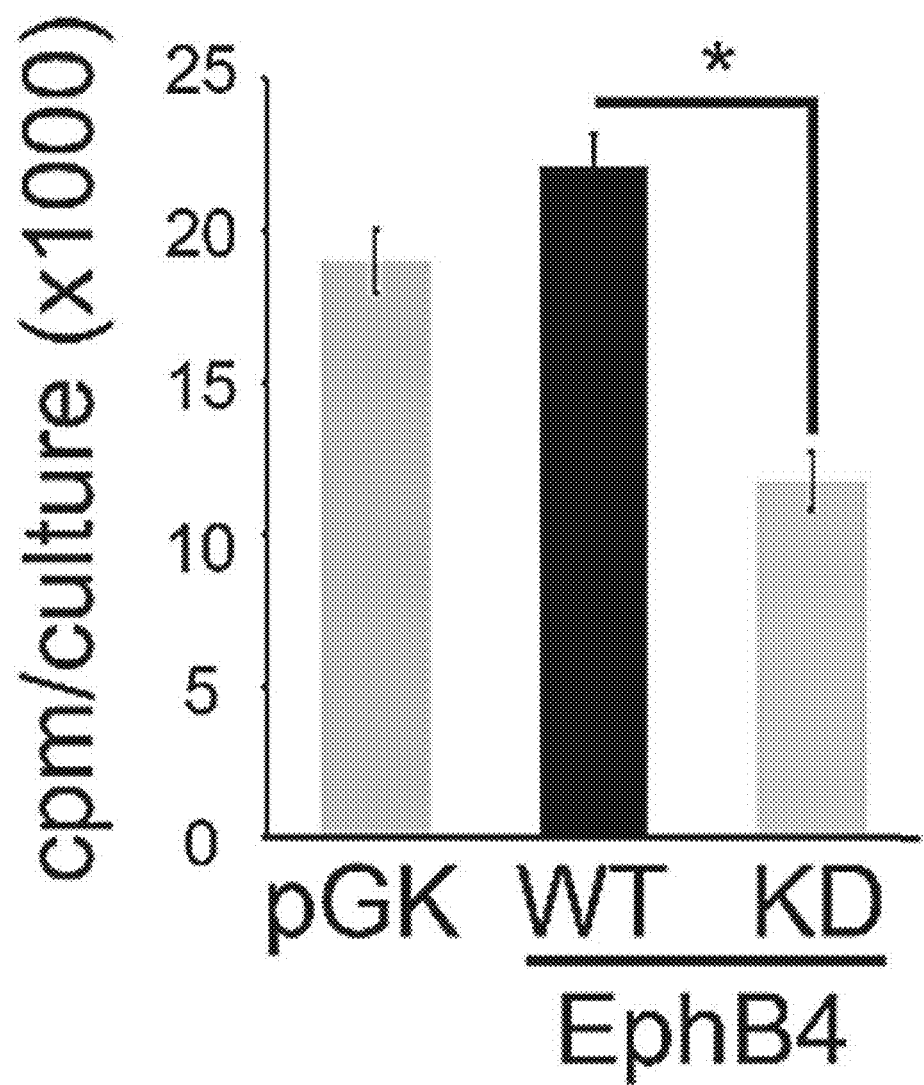

To assess further the Eph specificity of NVP and NVP-Iso, the effects of these inhibitors were tested prior to and after the silencing EphB2 and EphB4 receptors. The results show that NVP and NVP-iso were significantly less effective at reducing the proliferation of HT-29 and SW620 colorectal carcinoma cells after EphB2 (sh424) and EphB4 (sh774) were both silenced compared to the control cells (FIG. 1H). A kinase-dead (KD) EphB4 mutant was also expressed (K647R/kdEPHB4; contains a single K647R mutation in the kinase domain), which acts as a dominant negative for the endogenously expressed EphB4 while retaining the ability to activate EphrinB2 signaling (Yang et al., 2006) (FIG. 1I and FIG. 2E). Compared with wild-type (WT) EphB4, the mutant EphB4 reduced the spontaneous proliferation of HT-29 cells (FIG. 1J). Overall, these results support a critical role of Eph tyrosine kinase signaling in controlling the survival and growth of colorectal carcinoma cells.

NVP and NVP-Iso were evaluated for their ability to induce autophagy, a cellular stress response that principally serves to regulate the turnover of damaged cell organelles and proteins that become engulfed into autophagosomes (Marino et al., 2014). Although autophagy generally promotes cell survival, it can lead to cell death in contexts in which the intensity or duration of the stress response is above a certain threshold (Fulda and Kogel, 2015; Marino et al., 2014).

Figure 3E:
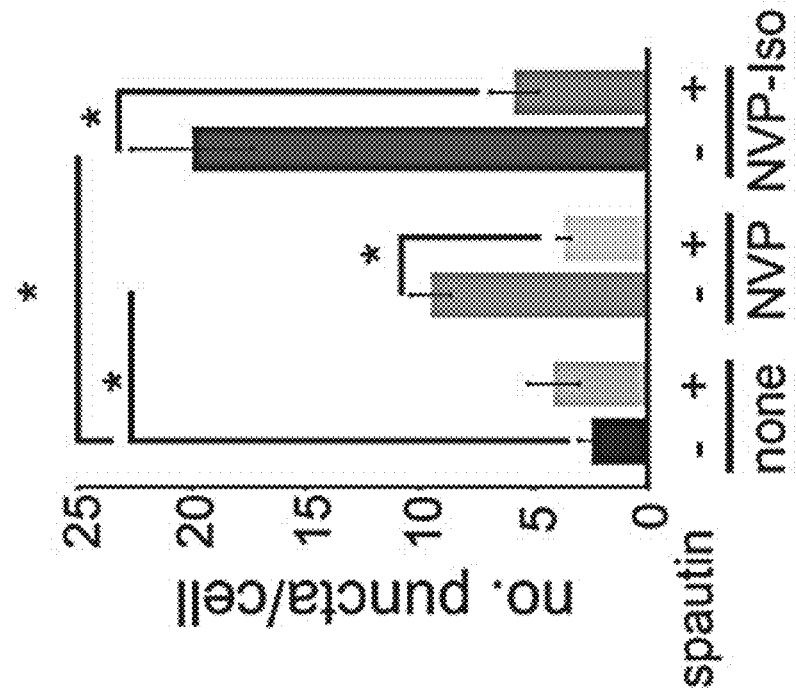
Figure 4A:
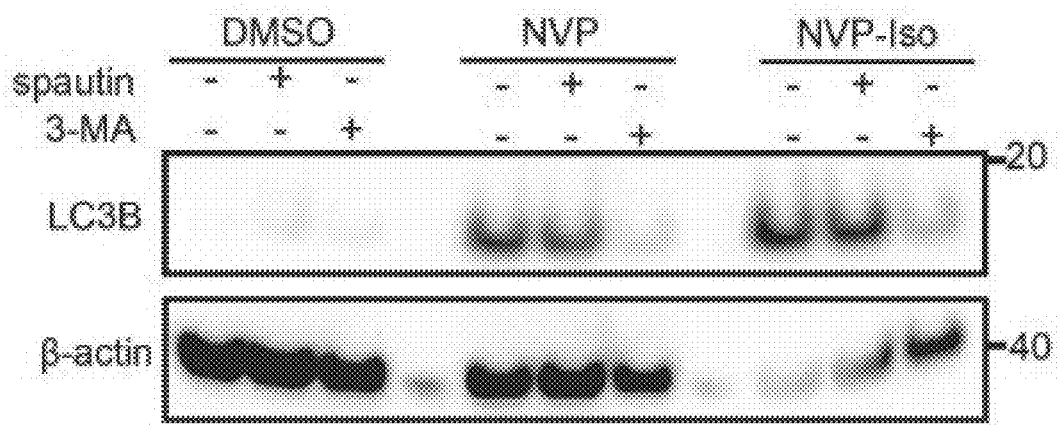
Figure 4B:
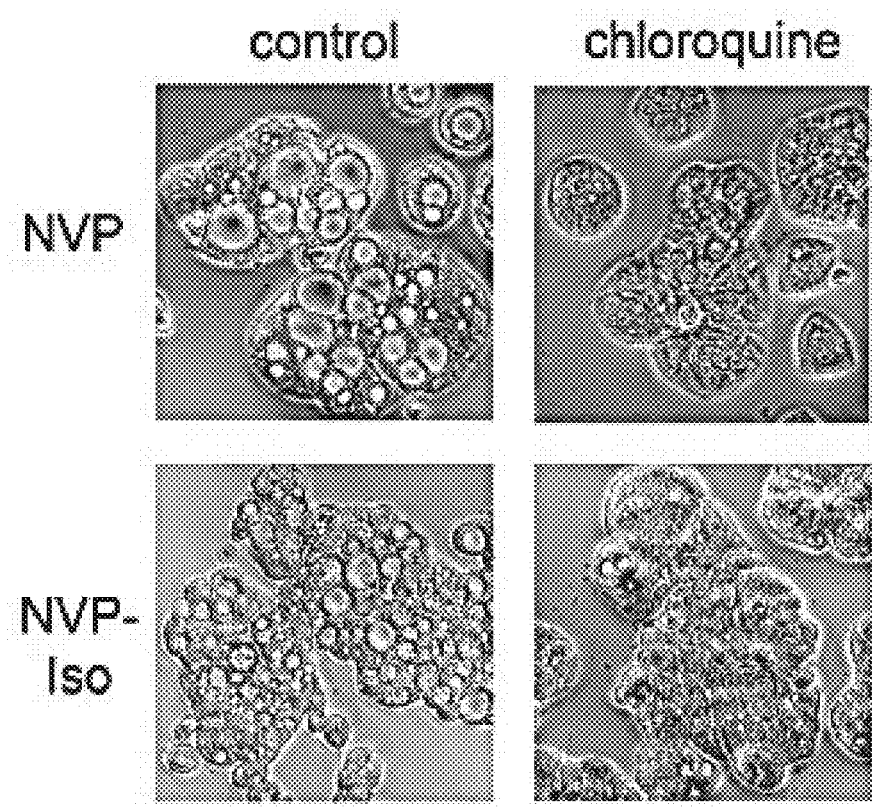
Figure 4E:
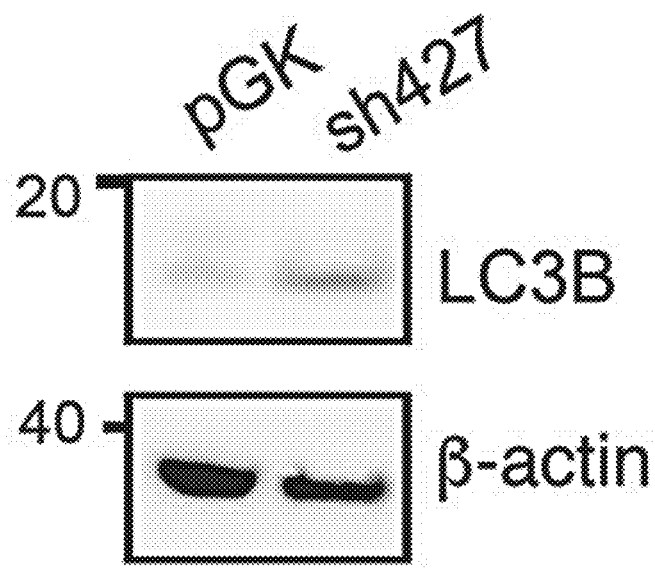

The light chain 3 (LC3) of microtubule-associated proteins exists in two forms, LC3A and its lipidated form LC3B that is associated with autophagosomal membranes (Kabeya et al., 2000). NVP and NVP-Iso were found to reproducibly induce accumulation of the autophagosome marker LC3B in HT-29 cells (FIG. 3A). Spautin (5 µM) and 3-Methyladenine (3-MA; 5 mM), inhibitors of early steps in the autophagic pathway, reduced accumulation of LC3B in HT-29 cells and other colorectal carcinoma cells treated with 1 µM NVP or NVP-Iso (FIG. 3B, FIG. 4A). Instead, the autophagic flux inhibitor, chloroquine (CQ; 10 µM), enhanced the accumulation of LC3B in colorectal carcinoma cells treated with 1 µM NVP or NVP-iso (FIG. 3C) but decreased autophagy (FIG. 4B) and mitigated the anti-proliferative effects of NVP and NVP-Iso in these cells (FIGS. 4C, 4D). By imaging HT-29 cells that were stably transduced with pK-fluorescent LC3, the accumulation of LC3 in autophagic "puncta" was visualized after treatment with NVP or NVP-Iso, which was reduced by spautin (FIG. 3D). Image quantitation showed that 1 µM NVP and NVP-Iso increase significantly the average number of LC3-related puncta/cell and that spautin reduces this drug-effect (FIG. 3E).

Figure 4G:
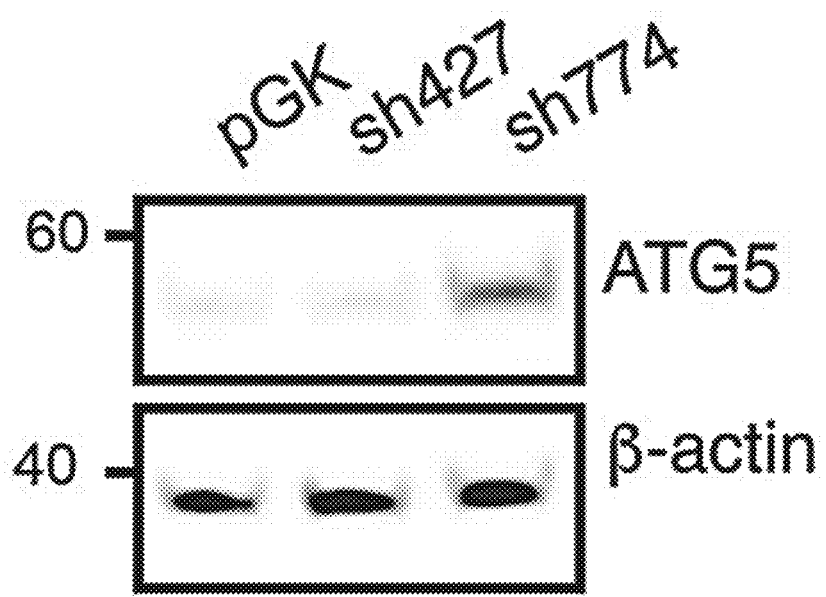
Figure 4F:
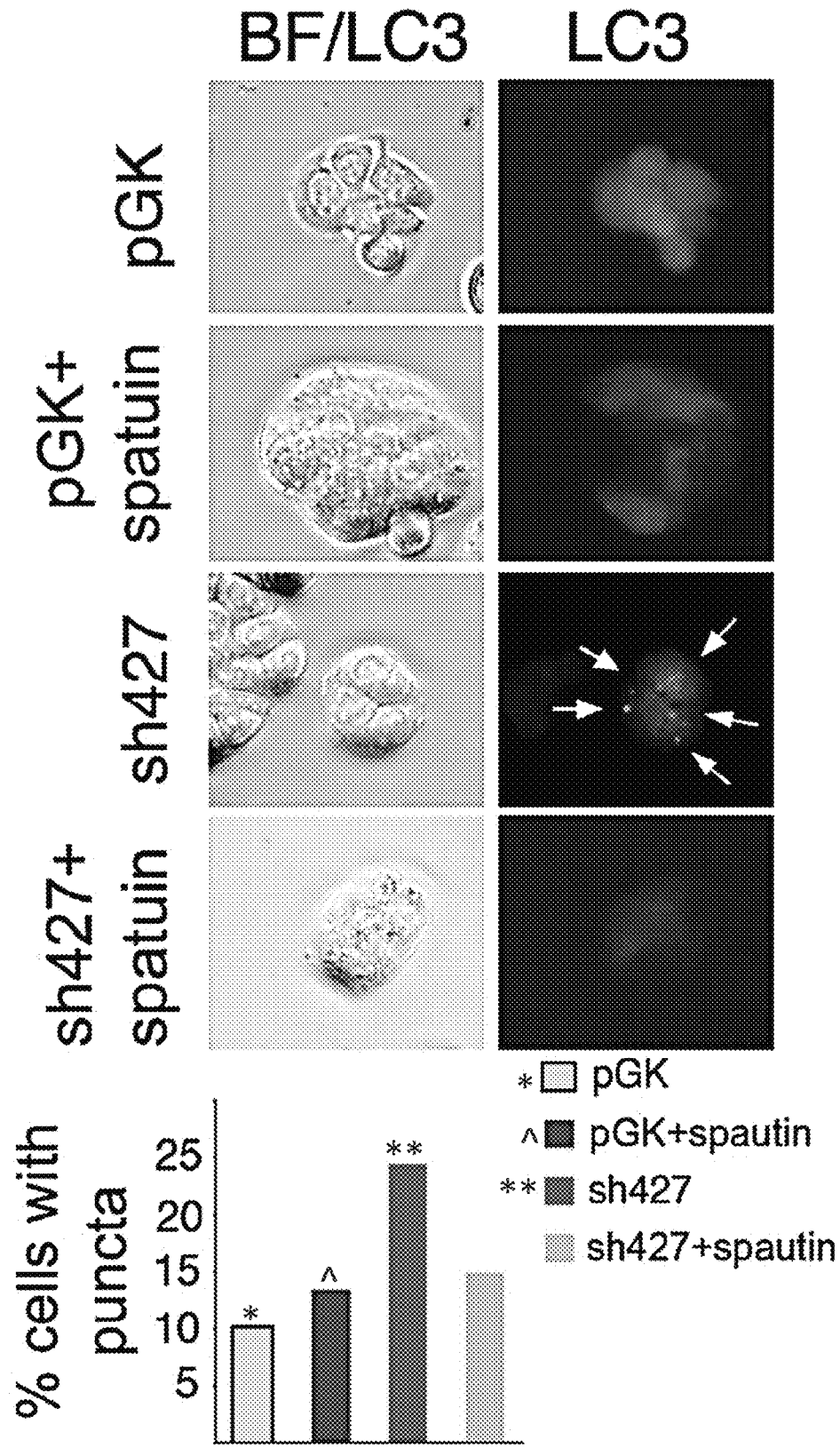

EphrinB2 silencing was documented to induce the accumulation of LC3B in HT-29 cells (FIG. 4E) and the accumulation of LC3 autophagic "puncta", which were inhibited by spautin (FIG. 4F). EphB4 silencing in HT-29 cells induced the accumulation of Atg5 (Autophagy related 5), a protein required for autophagic vesicles formation (FIG. 4G). Thus, NVP, NVP-iso and EphrinB2 silencing induce autophagy in colorectal carcinoma cells.

Figure 3I:
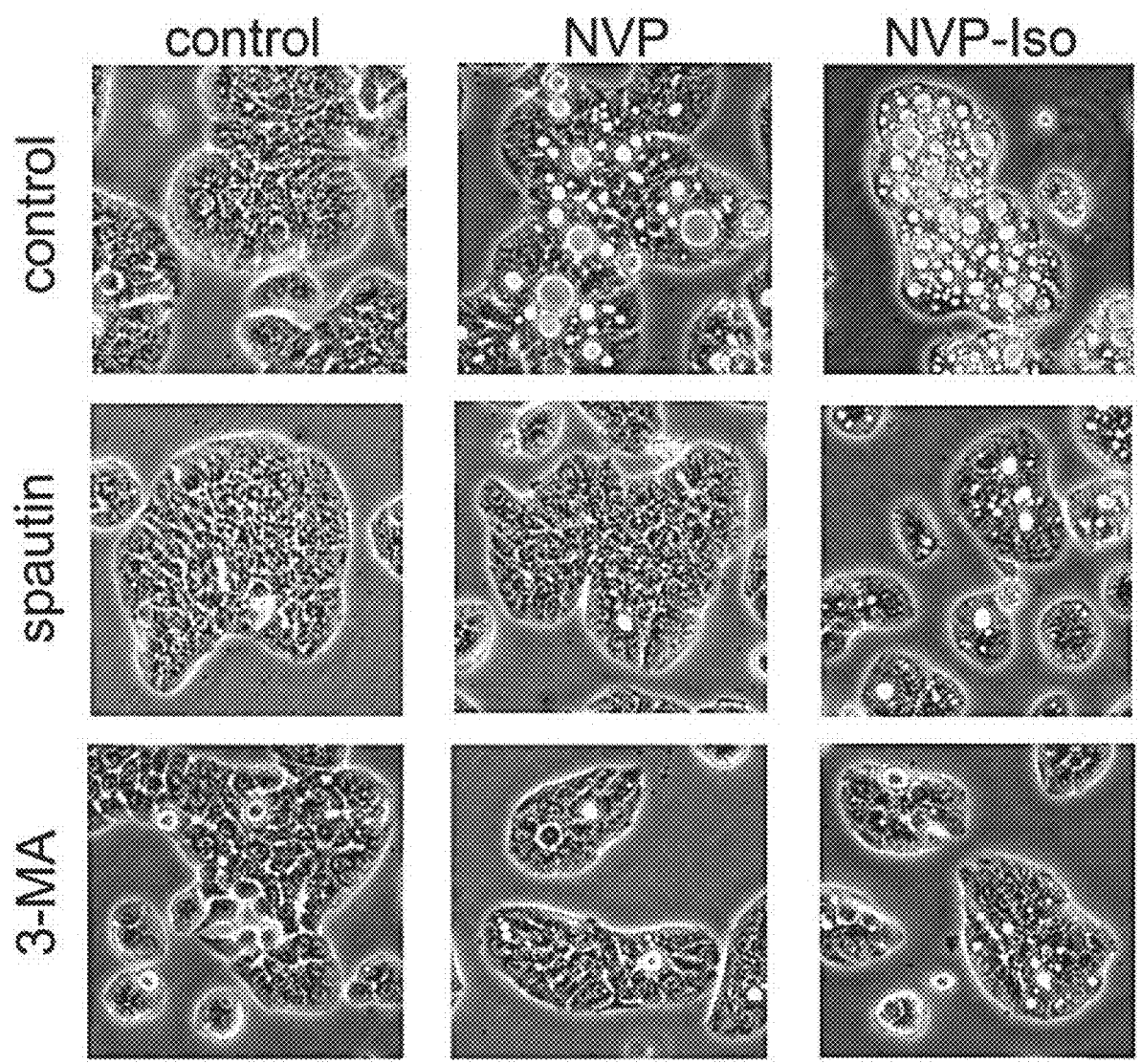
Figure 4I:
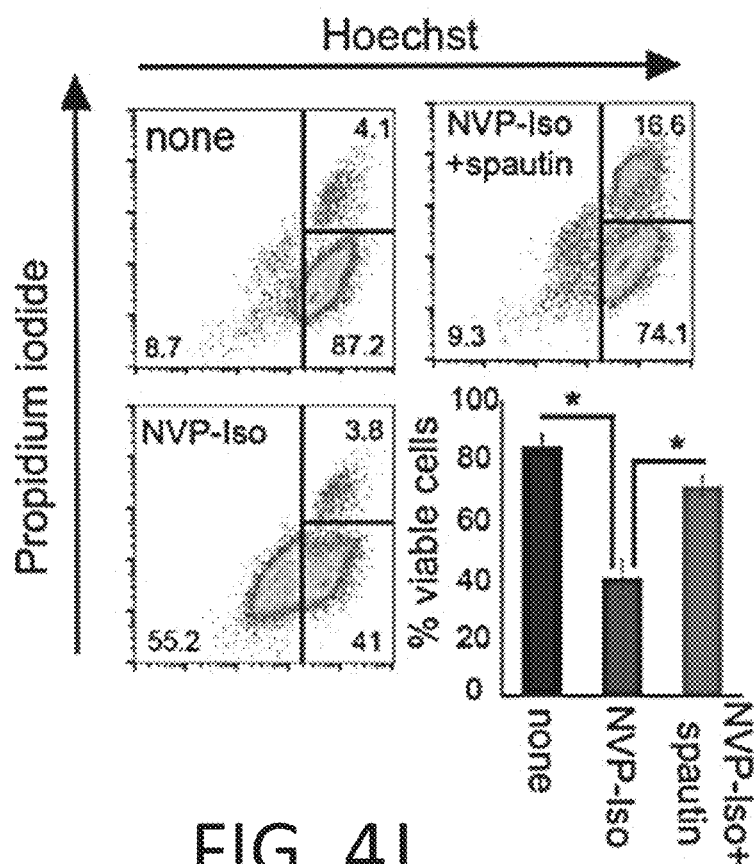
Figure 4J:
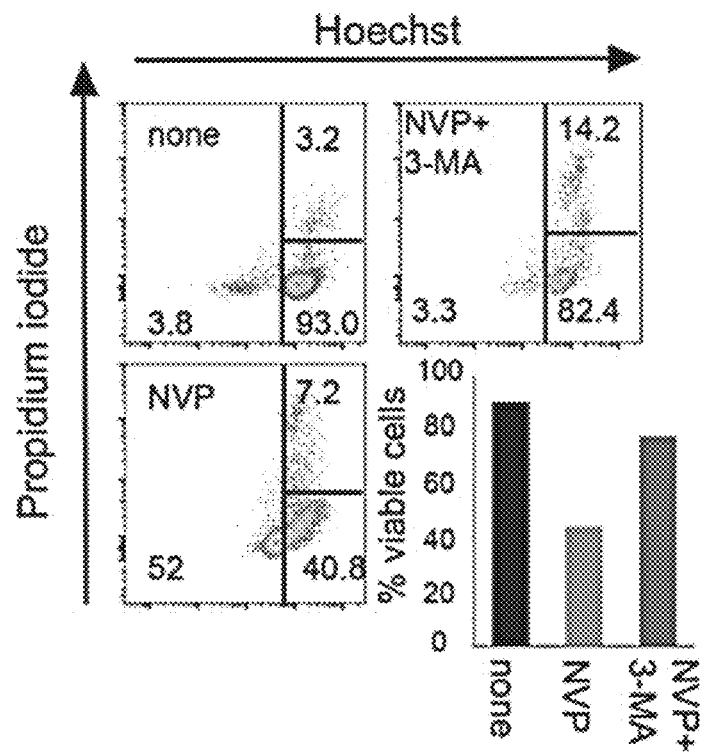

Autophagy was evaluated to determine whether it plays a causal role in the induction of cell death/reduced cell proliferation induced by NVP and NVP-Iso. If autophagy plays such role, inhibitors of early events in the autophagic pathway, such as spautin and 3-MA, would be expected to mitigate the anti-proliferative and pro-apoptotic effects of NVP and NVP-Iso. Both inhibitors mitigated the anti-proliferative (FIG. 3F, FIG. 4H) and death-promoting effects of NVP and NVP-Iso (FIGS. 3G and 3H; FIGS. 4I and 4J) in colorectal cancer cells. In addition, bright-field imaging documented that spautin and 3-MA protect colorectal carcinoma cells from acquiring the typical vesicular appearance induced by treatment with NVP or NVP-Iso and allows the cells to grow (FIG. 3I).

Since a mouse model reproducing key features of human colorectal carcinoma is not currently available (Romano et al., 2018), the effects of NVP-Iso were tested on the growth of human colorectal carcinoma cells in immunodeficient mice (BALB/c nu/nu; female; 6-10 weeks of age). Subcutaneous (s.c.) Colo205 and HT-29 colorectal carcinoma cells ($10 \times 10^6$ cells/mouse) were separately injected. After the tumors reached an average volume of 100 mm$^3$ (V=½×D× d$^2$), the mice were randomized to receive daily intraperitoneal (i.p.) injections of NVP-Iso (15 mg/kg; 10 mice), NVP (40 mg/kg or 60 mg/kg) or vehicle only (10 mice). The diet was supplemented with gel meal. The experimental endpoint was time for any tumor to reach a maximum diameter of 20 mm in any direction. A daily regimen was selected on the basis of prior pharmacokinetics studies (Martiny-Baron et al., 2010), and the dose and route of administration were selected on the basis of OUT preliminary experiments showing that a dose of 30 mg/kg i.p. caused significant reduction of body weight and that the oral route of administration previously tested (Martiny-Baron et al., 2010) was poorly tolerated (not shown).

NVP-Iso and NVP reduced significantly Colo205 tumor growth as determined by tumor measurements (FIGS. 5A, 6A) and tumor weight (FIGS. 5B, 6A). NVP-Iso also reduced significantly the growth of HT-29 colorectal carcinoma cells in mice (FIGS. 5C and 5D). Although significant, the anti-tumor effect of NVP-Iso in vivo was lower in magnitude than expected from the results in vitro with the tumor cell lines. Tyrosine-phosphorylated Eph in tumor tissue extracts was examined. As shown (FIG. 5E), the relative levels of tyrosine-phosphorylated EphB4 were significantly lower in HT-29 tumor extracts from NVP-Iso-treated mice compared to controls, but residual tyrosine phosphorylation was detected despite treatment. This suggested insufficient dosing through the i.p. route of administration, which could not be rectified due to drug toxicity at higher concentrations.

Based on the in vitro results showing that NVP and NVP-Iso promote cell death and reduce cell proliferation, these parameters were examined in tumors removed from the mice at the end of treatment. Representative HT-29 sections encompassing entire tumors through their maximum diameter show that cleaved caspase-3 (cell death marker) is more widely detected in the NVP-Iso-treated tumor compared to the control (representative tumor, FIG. 5F), and that the cell replication marker Ki67 is more widely detected in the control compared to the NVP-Iso-treated tumor (same representative tumor, FIG. 5G, magnified panels a and b). Confirming these observations, quantitative results show that the mean % cleaved caspase-3$^+$ area is significantly greater in NVP-Iso-treated mice (n=5) compared to control (n=5) (FIG. 5H), and that the average % Ki67$^+$ cells in the control (n=5) is significantly higher compared to the NVP-Iso-treated (n=5) tumors (FIG. 5I). Within viable portions of the HT-29 tumors, the distribution and morphology of the vasculature, based on immunostaining of the endothelial CD31 marker, appear similar in the control and drug-treated tumors (FIG. 5G). This interpretation was confirmed by measurement of the average CD31-fluorescence intensity in control (n=5) and NVP-Iso-treated tumors (n=5) (FIG. 5J), indicating that NVP-Iso has no measurable effect on the tumor vasculature. Consistent with these findings, CD31+ vascular structures with normal morphology were visualized even within cleaved-caspase-3+ tumor areas of drug-treated mice, and NVP-Iso did not reduce the proliferation of primary endothelial cells in culture (FIG. 2B), suggesting that tumor tissue degeneration is not attributable to a primarily vascular effect of the drug. Overall, these results show that inhibition of the Eph tyrosine kinase inhibits the growth of human colorectal carcinomas.

Example 2

Evaluation of Pyrazolopyrimidine and Triazine Derivatives

The binding affinities of the compounds to EphA2 were investigated by microscale thermophoresis (MST) (M. Jerabek-Willemsen et al., *J. Mol. Struct.* 2014, 1077, 101-113). The dissociation constants of compounds @1 and @3 determined by MST (towards EphA2) are in the low nanomolar range ($K_D$=3-4 nM), whereas the corresponding NVPiso derivative @2 ($K_D$=132 nM) shows 44-fold lower binding affinity towards EphA2. The derivatives @4 and @5 are less potent than the pyrazolopyrimidine derivatives @1 and @3, showing an increased $K_D$ of 86 and 225 nM, respectively (Table 2). The affinities of the triazine derivatives towards EphA2 cover a broad range from low nanomolar to micromolar. Correlation with the substitution patterns indicates that a nitrogen at position 3 (3-pyridyl or imidazole) of the triazine substituent may be important for generating affinity.

TABLE 2

Overview of affinities of the synthesized derivatives @1-@14 towards EphA2 in comparison to NVP and NVPiso determined by MST ([a] The values for NVP and NVPiso were previously published (Tröster et al., *ChemMedChem* 2018, 13, 1629-1633.)

| Compound | MST $K_D$ [nM] | Compound | MST $K_D$ [nM] |
|---|---|---|---|
| NVP[a] | 13 | @7 | ~2880 |
| NVPiso[a] | 73 | @8 | ~950 |
| @1 | 3 | @9 | 34 |
| @2 | 132 | @10 | 191 |
| @3 | 4 | @11 | 443 |
| @4 | 86 | @12 | 132 |
| @5 | 225 | @13 | 97 |
| @6 | 24 | @14 | ~850 |

The effects of the compounds on the proliferation of different colorectal carcinoma cell lines were investigated. For these in vitro experiments, the less promising triazine derivatives @7 and @8 were excluded based on their low affinity binding to EphA2. The remaining twelve new derivatives were first tested in proliferation assays at three concentrations (3000, 1000 and 333 nM) in five cell lines (HT29 results are shown in FIGS. 7A-7B; HCT116, SK-CO1, SW480 and DKD1 results not shown). The results show that the compounds most structurally related to the parent compounds NVP and NVP-Iso are generally inhibitory to a similar degree as the parent compounds, with the exception of compounds ATJA17-@2 and AT137-@4. In contrast, most triazine-based compounds are less inhibitory than the parent compounds NVP and NVP-Iso, except for the morpholine substituted triazine ATHA01-@10.

The four most promising compounds (AT158-@1, AT156-@3, AT155-@5 and ATHA01-@10) were selected for dose-dependent experiments (125-2000 nM) in seven human colorectal cancer cell lines (representative results shown in FIGS. 7A-7B summary results for all seven cell lines are shown in FIG. 9). Within this compound series, the triazine ATHA01-10 revealed the highest inhibition of cell proliferation (IC50: 528 nM), which was similar to that of the parent compound NVP (IC50: 545 nM). The NW derivatives AT158-@1 (IC50: 1686 nM) and AT156-@3 (IC50: 1975 nM), and the pyridopyrimidine AT155-@5 (IC50: 1769 nM) induced a somewhat more modest reduction of proliferation than the parent compound NVP. As specificity controls, the ability of these derivatives to inhibit the proliferation of HUVECs (human umbilical vein endothelial cells) and MG63 (human osteosarcoma cells line), which are not dependent on Eph signaling for proliferation and survival, was investigated. All inhibitors, including NVP and NVP-Iso, showed minimal or no reduction of HUVECs and MG63 cell proliferation at all concentrations tested (125-2000 nM), except for ATHA01-@10, which was moderately inhibitory for both control cells.

The new compounds were also examined for cell death inducement. Using flow cytometry to identify cell death after staining with DRAQ5/PI, AT158-@1 and AT156-@3 were found to induce no or minimal colorectal cancer cell death, and thus differ from the prototypes NVP and NVP-Iso; instead, ATHA01-@10 and AT155-@5 induced similar or slightly reduced cell death as the prototypes (FIG. 8A), Confirming these results, the cell-death marker cleaved caspase-3 was detected by immunofluorescence microscopy in most colorectal cancer cells treated with the prototypes NVP and NVP-Iso, and with ATHA01-@10, and AT155-@5, but only in a minority of cells treated with AT158-@1 and AT156-@3 (FIG. 8B). In additional experiments, autophagy was a specific focus. As expected, the parent compounds caused an accumulation of the microtubule-associated protein 1 light chain 3B (LC3B)-associated autophagy puncta in colorectal carcinoma cells. The compounds ATHA01-@10 and to a lower degree AT155-@5 also induced LC3B-related puncta, whereas AT158-@1 and AT156-@3 did not (FIGS. 8C-8D). This failure of AT158-@1 and AT156-@3 to induce LC3B in colorectal cancer cells was confirmed by immunoblotting (FIG. 8E).

These results suggest that compounds AT158-@1 and AT156-@3 are effective at reducing the proliferation of colorectal cancer cells by targeting the cell cycle rather than by inducing cell death, as typically induced by the prototypes NVP and NVP-iso. Cell cycle analysis in AT158-@1 and AT156-@3-treated colorectal cancer cells documented a significant change in the distribution of cells within the cell cycle, showing a marked reduction of the proportion of cells within the G2M phase of the cell cycle compared to control cells and cells treated with the prototypes NVP and NVP-Iso (FIG. 8F). These results confirm that compounds AT158-@1 and AT156-@3 reduce colorectal cancer cell proliferation by restraining progression to cell division, rather than by inducing cell death. These differences in cell death induction are unexpected because the pyrazolopyrimidine derivatives have a high degree of structural similarities; NVP, AT158-@1 and AT156-@3 have a different azine substituent; the morpholine ATHA01-@10 and hydroxy piperidine ATDL13-@14 have a different cyclic amine substituent.

Phosphorylation of kinases directly correlates with their activation status and therefore is an important measure of the activity of kinase inhibitors in cells. In the previous study, it was shown that NVP and NVP-Iso reduce endogenous Eph receptor tyrosine phosphorylation. In this cell-based assay, compared NVP, NVP-Iso and new compounds were compared for their ability to reduce endogenous EphB4, EphB2 and EphA2 tyrosine phosphorylation in colorectal cancer cells. The derivatives AT158-@1 and AT156-@3 that are structurally highly related to NVP revealed a comparable or only slightly reduced inhibitory activity for p-EphB4, p-EphB2 and p-EphA2 compared to NVP (FIG. 10). In contrast, derivatives AT155-@5 and ATHA01-@10 showed a marginal reduction of EphB4, EphB2 and EphA2 phosphorylation at 2 µM, despite their promising results from affinity and proliferation assays.

Example 3

Compound Synthesis

For the synthesis of certain compounds, the following synthesis sequence was utilized: 1. Preparation of the precursors (benzamide and amino modified heterocycle substructures, FIG. 11) and 2. Amination using Buchwald-Hartwig conditions (see FIG. 12). The scope of triazine derivatives also was enlarged to asymmetric molecules using the well-established synthesis strategy of temperature controlled nucleophilic substitutions on cyanuric chloride (see FIG. 11).

Synthesis of the following precursors were performed according to earlier published procedures:
5-Amino-1-methyl-1H-pyrazole-4-carbonitrile 19[1]
1-Methyl-6-(pyridin-3-yl)-1H-pyrazolo[3,4-d]pyrimidine-4-amine 18[1]
3-Amino-1-methyl-1H-pyrazole-4-carbonitrile 31[1]
2-Methyl-6-(pyridine-3-yl)-2H-pyrazolo[3,4-d]pyrimidin-4-amine 30[1]
3-Bromo-4-methyl-N-(3-(trifluoromethyl)phenyl)benzamide 22[1]
4,6-Dichloro-1,3,5-triazin-2-amine[3]

1. N-(3-Chlorophenyl)-4-methyl-3-((1-methyl-6-(pyridin-3-yl)-1H-pyrazolo[3,4-d]pyrimidin-4-yl)amino)benzamide (NVP-Cl; 1)

3-Bromo-N-(3-chlorophenyl)-4-methylbenzamide 17

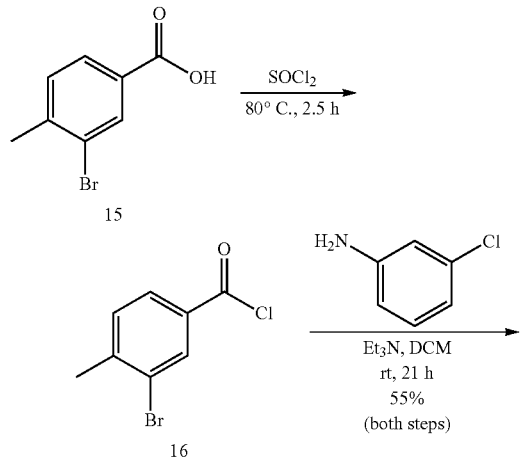

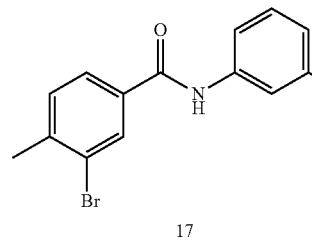

15 (2.50 g, 11.6 mmol) was placed in a baked Schlenk flask, suspended in SOCl2 (15 mL, 0.20 mol) and heated to 80° C. for 2.5 h. The resulting solution was cooled to room temperature. Excess SOCl2 was removed under reduced pressure, the resulting colorless solid was dried in an oil-pump vacuum for 30 min. The crude acyl chloride 16 was dissolved in dry CH2Cl2 (15 mL) and dry Et3N (3.2 mL, 23 mmol). 3-Chloroaniline (1.34 mL, 12.8 mmol) was added dropwise at 0° C. After addition the reaction mixture was stirred for further 30 min at 0° C. and 19 h at room temperature. Water was added, the organic layer was separated and washed with water, the combined aqueous layers were extracted with CH2Cl2. The combined organic layers were dried over MgSO4, filtered and all volatiles were removed under reduced pressure. The crude product was recrystallized from MeOH and the obtained off-white solid was dried for 4 h under reduced pressure. Yield: 2.08 g (6.41 mmol, 55%).

N-(3-Chlorophenyl)-4-methyl-3-((1-methyl-6-(pyridin-3-yl)-1H-pyrazolo[3,4-d]pyrimidin-4-yl)amino)benzamide (NVP-Cl, 1)

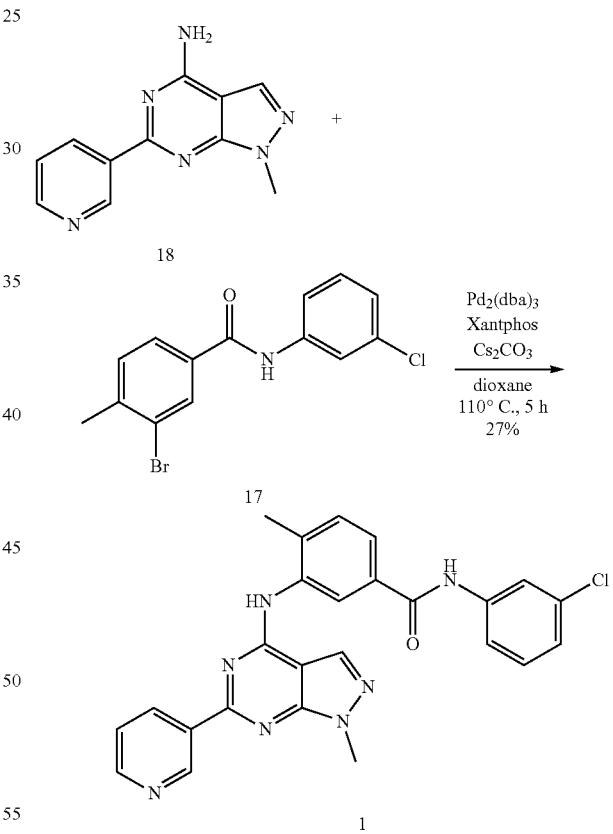

18 (250 mg, 1.11 mmol), 17 (358 mg, 1.11 mmol) and Cs₂CO₃ (1.44 g, 4.42 mmol) were placed in a Schlenk tube. Dry dioxane (15 mL) was added and the mixture was degassed with argon for 5 min. Pd₂(dba)₃ (91 mg, 99 µmol) and Xantphos (95 mg, 0.16 mmol) were added and the mixture was heated to reflux for 5 h. After cooling to room temperature, the suspension was filtered over celite and eluted with MeOH. The filtrate was adsorbed on silica gel and purified by column chromatography (silica gel, cyclohexane:EtOAc=1:1→EtOAc), For further purification, the solid was suspended in EtOAc, the suspension was centrifuged, and the supernatant was discarded. The obtained solid was again suspended in MeOH:DCM the suspension was centrifuged and the supernatant was discarded. The off-white solid was dried for 8 h at 60° C. under reduced pressure. Yield: 141 mg (0.300 mmol, 27%).

2. 4-Methyl-3-((1-methyl-6-(pyrimidin-5-yl)-1H-pyrazolo[3,4-d]pyrimidin-4-yl)amino)-N-(3-(trifluoromethyl)phenyl)benzamide (NVP-Pyrimidine; 2 or @3)

1-Methyl-6-(pyrimidin-5-yl)-1H-pyrazol[3,4-d]pyrimidin-4-amine 21

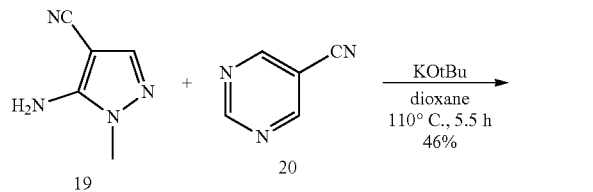

KOtBu (64 mg, 0.57 mmol) was added to a suspension of 18 (174 mg, 1.43 mmol) and pyrimidine-5-carbonitrile 20 (1.50 mg, 1.43 mmol) in dry dioxane (3 mL). The reaction mixture was immersed into a 110° C. oil bath and heated for 5.5 h. After cooling to room temperature, the mixture was stirred for 20 h. 15 mL methanol was added, and the mixture was adsorbed on silica gel. After column purification (silica, cyclohexane:EtOAc=1:3→1:4→1:6→EtOAc) the product was obtained as yellow solid. Yield: 0.15 g (0.66 mmol, 46%).

4-Methyl-3-((1-methyl-6-(pyrimidin-5-yl)-1H-pyrazolo[3,4-d]pyrimidin-4-yl)amino)-N-(3-(trifluoromethyl)phenyl)benzamide (NVP-Pyrimidine; 2 or @3)

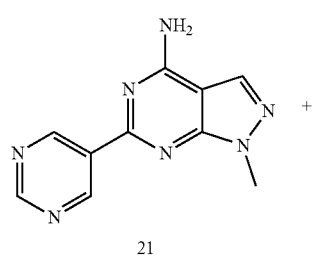

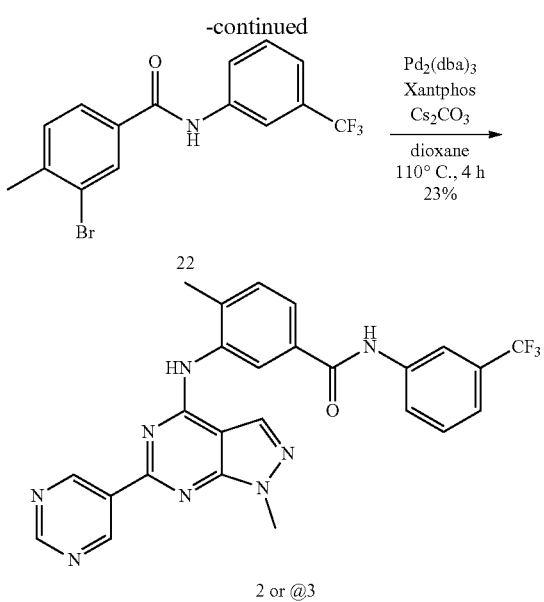

21 (70.0 mg, 0.308 mmol), 22 (110 mg, 0.307 mmol) and Cs$_2$CO$_3$ (401 mg, 1.23 mmol) were placed in a Schlenk tube. Dry dioxane (3.5 mL) was added and the mixture was degassed with argon for 5 min. Pd$_2$(dba)$_3$ (25 mg, 28 μmol) and Xantphos (26 mg, 46 μmol) were added and the mixture was heated to reflux for 4 h. After cooling to room temperature, the suspension was filtered using a Buchner funnel and washed with 20 mL cyclohexane. The filtrate was adsorbed on silica gel and purified by column chromatography (silica gel, cyclohexane:EtOAc=1:1→EtOAc).

For further purification, the light-yellow solid was suspended in MeOH and sonicated for 10 minutes. The suspension was centrifuged, and the supernatant was discarded. The obtained colorless solid was dried for 10 h under reduced pressure. Yield: 36 mg (71 μmol, 23%).

3. 4-Methyl-3-((1-methyl-6-(pyrazin-2-yl)-1H-pyrazolo[3,4-d]pyrimidin-4-yl)amino)-N-(3-(trifluoromethyl)phenyl)benzamide (NVP-Pyrazine 3 or @1)

1-Methyl-6-(pyrazin-2-yl)-1H-pyrazolo[3,4-d]pyrimidin-4-amine 24

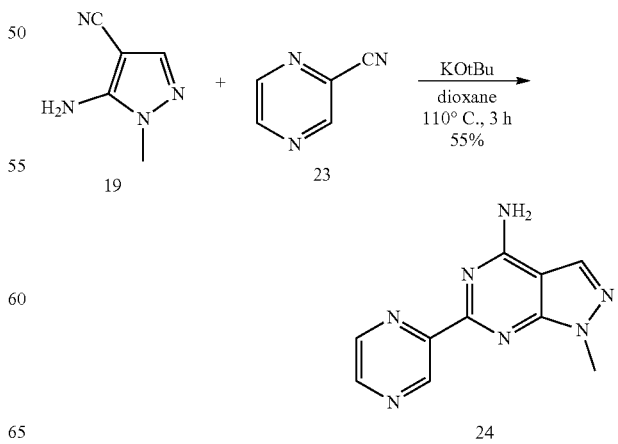

KOtBu (92 mg, 0.82 mmol) was added to a suspension of 19 (500 mg, 4.09 mmol) and pyrazine-2-carbonitrile 23 (431 mg, 4.09 mmol) in dry dioxane (9 mL). The reaction mixture heated to reflux for 3 h. After cooling to room temperature, the solids were isolated over a Buchner funnel and washed with a little amount of distilled water. The crude product was heated to reflux in EtOH (~70 mL) and insoluble solids were filtered while still hot. The light brown precipitate from the filtrate was collected by filtration and was dried for 4 h under reduced pressure. Yield: 468 mg (2.06 mmol, 55%).

4-Methyl-3-((1-methyl-6-(pyrazin-2-yl)-1H-pyrazolo[3,4-d]pyrimidin-4-yl)amino-N-(3-(trifluoromethyl)-phenyl)benzamide (NVP-Pyrazine, 3 or @1)

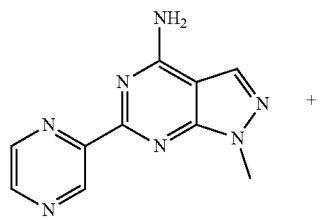

24

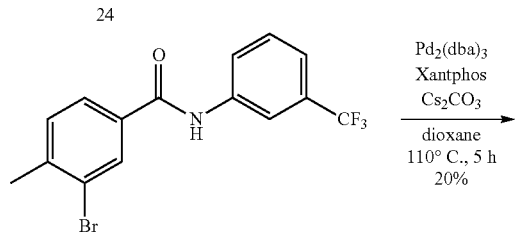

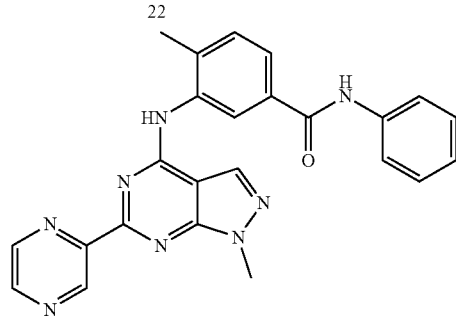

3 or @1

24 (150 mg, 0.660 mmol), 22 (236 mg, 0.660 mmol) and Cs$_2$CO$_3$ (860 mg, 2.64 mmol) were placed in a Schlenk tube. Dry dioxane (5 mL) was added and the mixture was degassed with argon for 5 min. Pd$_2$(dba)$_3$ (54 mg, 59 µmol) and Xantphos (57 mg, 99 µmol) were added and the mixture was heated to reflux for 5 h. After cooling to room temperature, the suspension was filtered over celite and eluted with MeOH. The filtrate was adsorbed on silica gel and purified by column chromatography (silica gel, EtOAc→EtOAc: MeOH=250:1). For further purification, the solid was suspended in MeOH. The mixture was centrifuged, and the supernatant was discarded. The obtained light-yellow solid was dried for 4 h under reduced pressure. Yield: 67 mg (0.13 mmol, 20%).

4. 4-Methyl-3-((2-(pyridin-3-yl)quinazolin-4-yl)amino)-N-(3-(trifluoromethyl)pheny)-benzamide (Quinazoline; 4 or @4)

2-(Pyridin-3-yl)quinazolin-4-amine 27

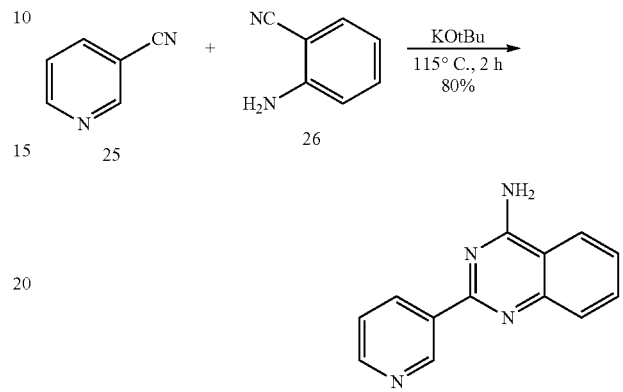

The following synthesis of compound 27 was adapted from a procedure developed by J. A. Seijas et al.: differing from the original publication the reaction was performed without the use of a microwave oven.[4]

25 (1.32 g, 12.7 mmol), 26 (1.50 g, 12.7 mmol) and KOtBu (142 mg, 1.27 mmol) were placed in a baked Schlenk flask. The reaction mixture heated to 115° C. (oil bath temperature) for 2 h. After cooling to room temperature, the solidified mixture was re-suspended in water and methanol. A light-yellow solid was collected by filtration, washed with water and dried for 5 h under reduced pressure. Yield: 2.25 g (10.1 mmol, 80%).

4-Methyl-3-((2-(pyridin-3-yl)quinazolin-4-yl)amino)-N-(3-(trifluoromethyl)phenyl)benzamide (Quinazoline 4 or @4)

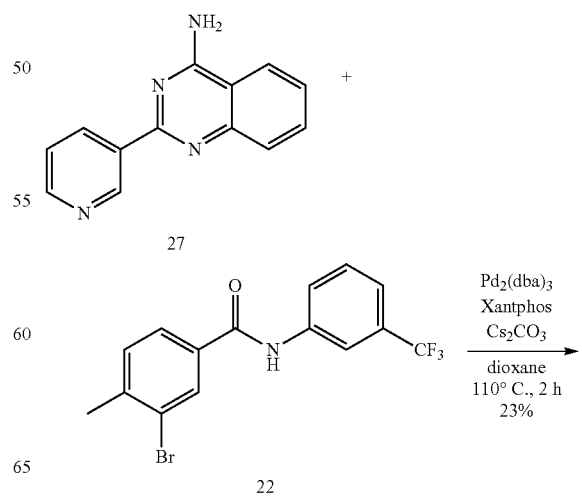

-continued

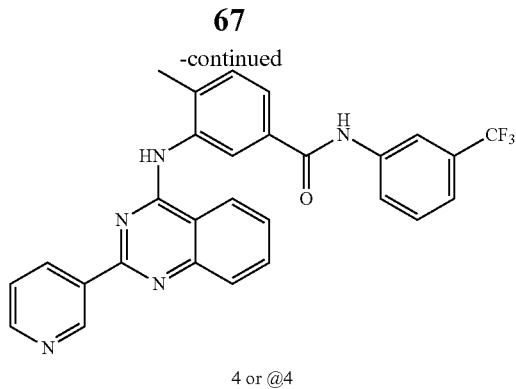

4 or @4

27 (250 mg, 1.12 mmol), 22 (366 mg, 1.02 mmol) and Cs$_2$CO$_3$ (1.33 g, 4.09 mmol) were placed in a Schlenk tube. Dry dioxane (9 mL) was added and the mixture was degassed with argon for 5 min. Pd$_2$(dba)$_3$ (84 mg, 92 µmol) and Xantphos (89 mg, 153 nmol) were added and the mixture was heated to reflux for 2 h. After cooling to room temperature, the suspension was filtered over celite and eluted with MeOH. The filtrate was adsorbed on silica gel and purified by column chromatography (silica gel, cyclohexane:EtOAc=1:1→1:2). For further purification, the light-yellow solid was heated to reflux in MeOH and insoluble solids were filtered while still hot. The colorless solid was dried for 4 h under reduced pressure. Yield: 117 mg (0.23 mmol, 23%).

5. 4-Methyl-3-((2-(pyridin-3-yl)pyrido[2,3-d]pyrimidin-4-yl)amino)-N-(3-(trifluoromethyl)-phenyl)benzamide (Pyrido[2,3-d]pyrimidine; 5 or @5)

2-(Pyridin-3-yl)pyrido[2,3-d]pyrimidin-4-amine 29

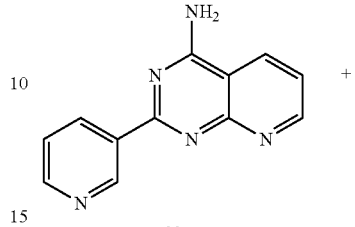

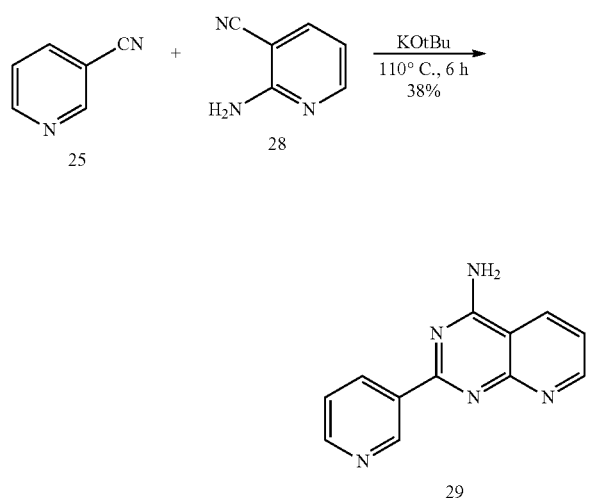

25 (1.23 g, 11.8 mmol), 28 (398 mg, 3.34 mmol) and KOtBu (113 mg, 1.01 mmol) were placed in a baked Schlenk flask. The reaction mixture heated to 110° C. (oil bath temperature) for 6 h. After cooling to room temperature, the solidified mixture was re-suspended in ethyl acetate and methanol. A light gray solid was collected by filtration, washed with water and dried for 4 h under reduced pressure. Yield: 283 mg (1.27 mmol, 38%).

4-Methyl-3-((2-(pyridin-3-yl)pyrido[2,3-d]pyrimidin-4-yl)amino)-N-(3-(trifluoromethyl)phenyl)benzamide (Pyrido[2,3-d]pyrimidine: 5 or @5)

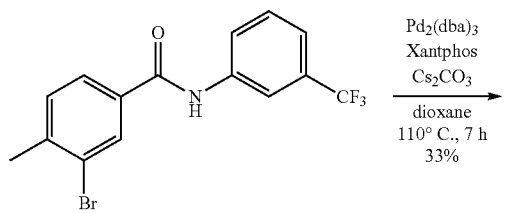

29 (200 mg, 0.896 mmol), 22 (320 mg, 0.894 mmol) and Cs$_2$CO$_3$ (1.17 g, 3.58 mmol) were placed in a Schlenk tube. Dry dioxane (6.5 mL) was added and the mixture was degassed with argon for 5 min. Pd$_2$(dba)$_3$ (74 mg, 81 µmol) and Xantphos (78 mg, 134 µmol) were added and the mixture was heated to reflux for 7 h. After cooling to room temperature, the suspension was filtered over celite and eluted with MeOH. The filtrate was adsorbed on silica gel and purified by column chromatography (silica gel, DCM:MeOH=99:1→98:1→95:1→93:1), For further purification, the product fraction was suspended in MeOH The mixture was centrifuged, and the supernatant was discarded. The light-yellow solid was dried for 6 h at 60° C. under reduced pressure. Yield: 146 mg (0.29 mmol, 33%).

6. N-(3-Chlorophenyl)-4-methyl-3-((2-methyl-6-(pyridin-3-yl)-2H-pyrazolo[3,4-d]pyrimidin-4-yl)amino)benzamide (NVPisoCl: 6)

N-(3-Chlorophenyl)-4-methyl-3-((2-methyl-6-(pyridin-3-yl)-2H-pyrazolo[3,4-d]pyrimidin-4-yl)amino)benzamide (NVPisoCl, 6)

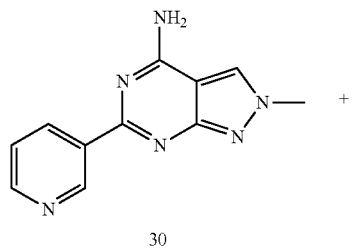

30

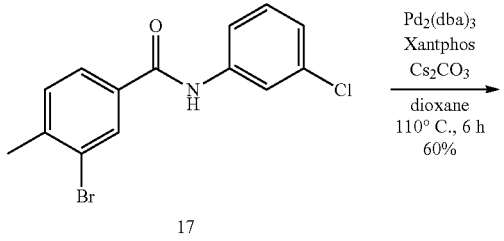

17

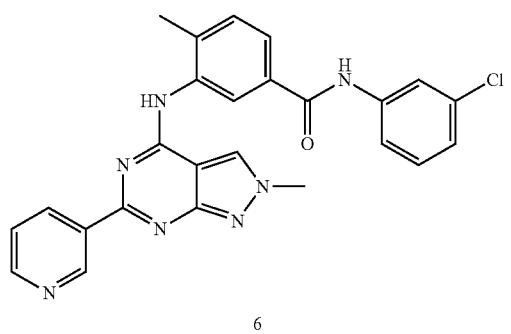

6

30 (150 mg, 0.663 mmol), 17 (215 mg, 0.663 mmol) and Cs₂CO₃ (864 mg, 2.65 mmol) were placed in a Schlenk tube. Dry dioxane (8 mL) was added and the mixture was degassed with argon for 5 min. Pd₂(dba)₃ (55 mg, 60 µmol) and Xantphos (58 mg, 99 mop were added and the mixture was heated to reflux for 6 h. After cooling to room temperature, the suspension was filtered over celite and elated with MeOH. The filtrate was adsorbed on silica gel and purified by column chromatography (silica gel, DCM:MeOH=95:5→90:10). For further purification, the solid was suspended in MeOH and afterwards collected by filtration. The obtained light-yellow solid was dried under reduced pressure. Yield: 188 mg (0.400 mmol, 60%).

7. 4-Methyl-3-((2-methyl-6-(pyrazin-2-yl)-2H-pyrazolo[3,4-d]pyrimidin-4-yl)amino-N-(3-(trifluoromethyl)phenyl)benzamide (NVPiso-Pyrazine, 7 or (@2)

2-Methyl-6-(pyrazin-2-yl)-2H-pyrazolo[3,4-d]pyrimidin-4-amine 32

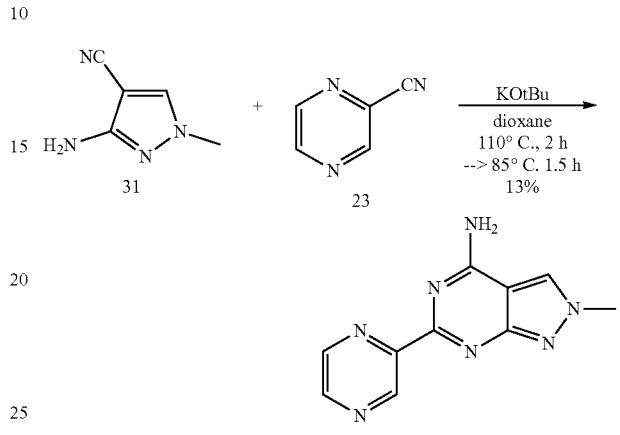

KOtBu (184 mg, 1.64 mmol) was added to a suspension of 31 (400 mg, 3.28 mmol) and pyrazine-2-carbonitrile 23 (344 mg, 3.28 mmol) in dry dioxane (9 mL). The mixture heated to reflux for 2 h. Additional 4 mL dry dioxane and 23 (172 mg, 1.64 mmol) were added. The reaction mixture was heated for 1.5 h to 85° C. After cooling to room temperature, the mixture was stirred for 16 h at room temperature. The mixture was adsorbed on silica gel and purified by column chromatography (silica, CH₂Cl₂:MeOH=9:1→8:2). The product was obtained as red solid. Yield: 95 mg (0.42 mmol, 13%).

4-Methyl-3-((2-methyl-6-(pyrazin-2-yl)-2H-pyrazolo[3,4-d]pyrimidin-4-yl)amino)-N-(3-(trifluoromethyl)-phenyl)benzamide (NVPiso-Pyrazine, 7 or @2)

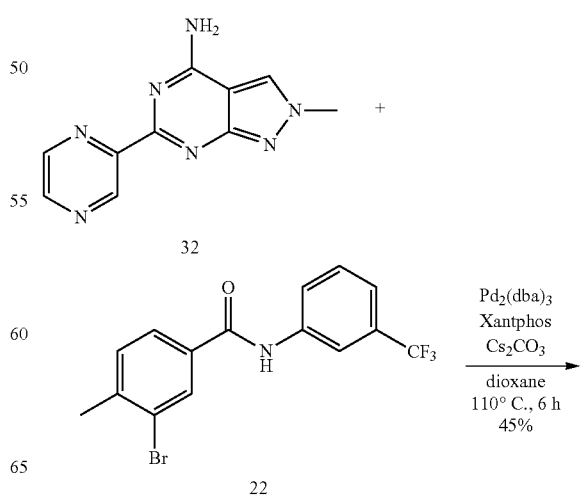

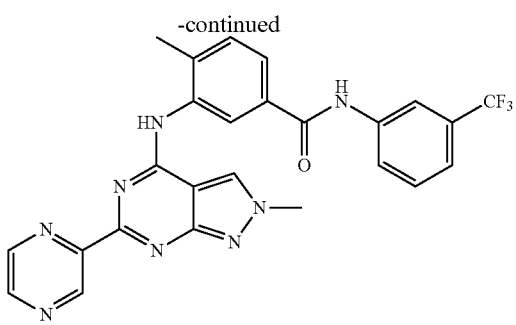

7 or @2

32 (80.0 mg, 0.352 mmol), 22 (126 mg, 0.352 mmol) and Cs$_2$CO$_3$ (458 mg, 1.41 mmol) were placed in a Schlenk tube. Dry dioxane (4 mL) was added and the mixture was degassed with argon for 5 min. Pd$_2$(dba)$_3$ (29 mg, 32 µmol) and Xantphos (31 mg, 54 µmol) were added and the mixture was heated to reflux for 6 h. After cooling to room temperature, the suspension was filtered over celite and eluted with MeOH. The filtrate was adsorbed on silica gel and purified by column chromatography (silica gel, DCM:MeOH=9:1). For further purification, the solid was suspended in MeOH. The mixture was centrifuged, and the supernatant was discarded. The obtained light-yellow solid was dried for 5 h under reduced pressure. Yield: 81 mg (0.16 mmol, 45%).

3-((4,6-Di(pyridin-3-yl)-1,3,5-triazin-2-yl)amino)-4-methyl-N-(3-(trifluoromethyl)phenyl)-benzamide 40 or @6

4,6-Di(pyridin-3-yl)-1,3,5-triazin-2-amine 39

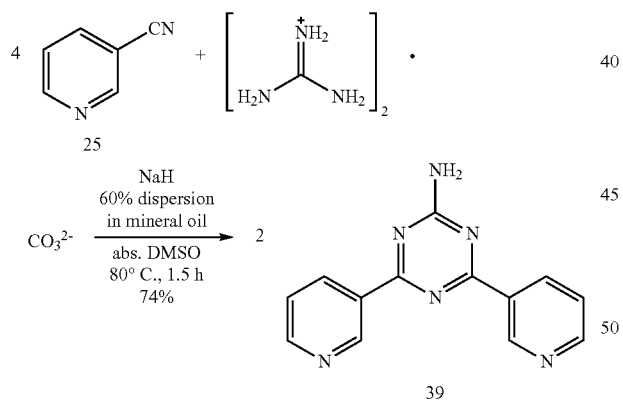

Compound 39 was synthesized according to a procedure described in the patent DE 197 35 800 A1.[5] Additional safety instructions to the use of NaH in DMSO are given in Q. Yang et al.[6]

25 (693 mg, 6.66 mmol) and guanidine carbonate (300 mg, 1.67 mmol) were placed in a baked Schlenk flask and suspended in 8 mL dry DMSO followed by the addition of NaH (60% dispersion in mineral oil; 160 mg, 4.00 mmol). The reaction mixture was stirred for 1 h at room temperature and afterwards heated to 80° C. for 1.5 h. After cooling to room temperature, 20 mL H$_2$O were added to the reaction mixture. The precipitated light-yellow solid was collected by filtration, washed with water. For further purification, the solid was suspended in MeOH, stirred for 2 h at room temperature. The suspension was filtrated, washed with H$_2$O and dried for 15 h under reduced pressure. The product was obtained as a light-yellow solid. Yield: 621 mg (2.48 mmol, 74%).

3-((4,6-Di(pyridin-3-yl)-1,3,5-triazin-2-yl)amino)-4-methyl-N-(3-(trifluoromethyl)phenyl)benzamide 40 or @6

39 (20 mg, 80 µmol), 22 (31 mg, 87 µmol) and Cs$_2$CO$_3$ (104 mg, 319 µmol) were placed in a Schlenk tube. Dioxane (2 mL) was added and the mixture was degassed with argon for 5 min. Pd$_2$(dba)$_3$ (6.5 mg, 7.1 µmol) and Xantphos (6.9 mg, 12 µmol) were added and the mixture was heated to reflux for 3.5 h. After cooling to room temperature, the suspension was filtered over celite and eluted with EtOAc. The filtrate was adsorbed on silica gel and purified by column chromatography (silica gel, EtOAc). The product was obtained as a light yellow solid and dried under reduced pressure for 6 h. Yield: 18 mg (34 µmol, 43%).

General Synthesis Triazine Derivatives

4-Chloro-6-(1H-imidazol-1-yl)-1,3,5-triazin-2-amine 42

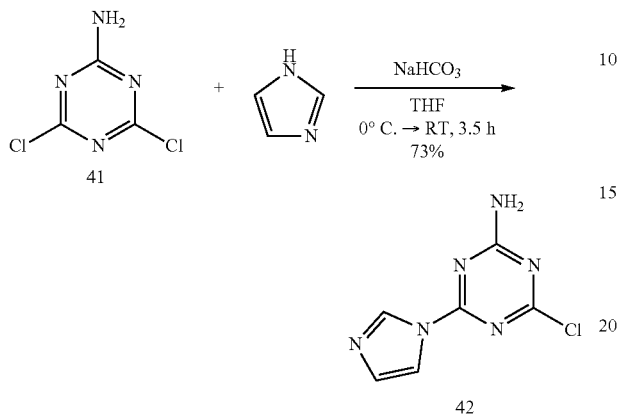

41 (1.50 g, 9.09 mmol) and NaHCO₃ (1.15 g, 13.7 mmol) were suspended in 42 mL THF and cooled to 0° C., followed by the addition of imidazole (0.93 g, 13.7 mmol mmol). After 2 h the ice bath was removed, and the mixture was stirred for 1.5 h at room temperature. The reaction mixture was poured onto crushed ice. A colorless solid was collected by filtration, washed with water and dried for 7 h under reduced pressure. Yield: 1.31 g (6.66 mmol, 73%).

Asymmetric Substituted Triazine Derivatives

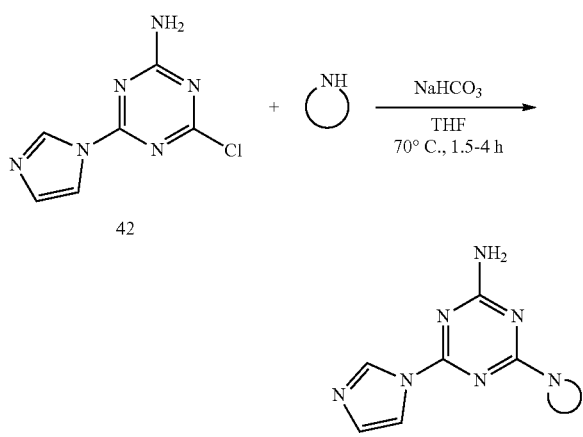

42 (1 eq.) and NaHCO₃ (1.5 eq.) were suspended in THF, followed by the addition of the cyclic amine (1. eq.). The reaction mixture was heated to 70° C. for 1.5-4 h. After cooling to room temperature different purifications strategies were applied. Strategy A: The mixture was poured onto crushed ice. A solid was collected by filtration, washed with water and dried under reduced pressure. Strategy B: Water and EtOAc were added to the reaction mixture. The aqueous phase was extracted with EtOAc. The combined organic layers were washed with water, dried over MgSO₄, filtered and all volatiles were removed under reduced pressure. The product was obtained as a solid and dried under reduced pressure. Yield: 33-91%.

Buchwald-Hartwig Coupling Triazine Derivatives

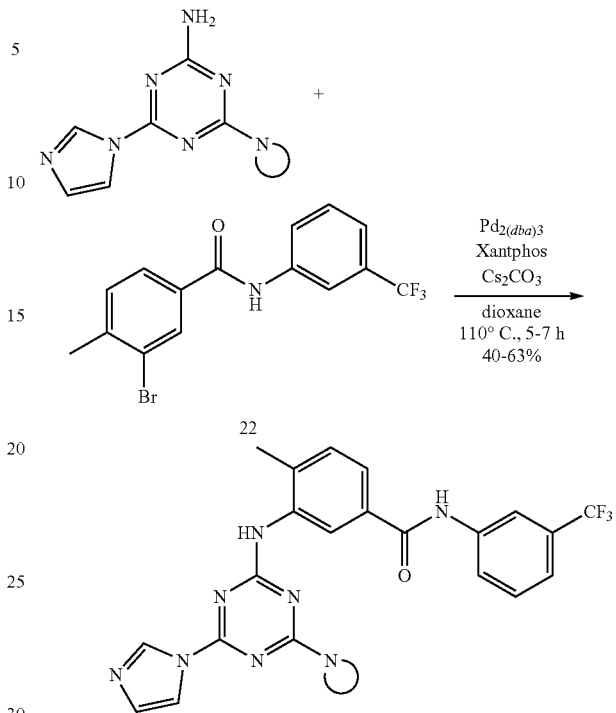

Amine (1.05 eq.), 22 (1.00 eq.) and Cs₂CO₃ (4.00 eq.) were placed in a Schlenk tube. Dioxane was added and the mixture was degassed with argon for 5 min. Pd₂(dba)₃ (0.08 eq.) and Xantphos (0.12 eq.) were added and the mixture was heated to reflux for 5-7 h. After cooling to room temperature, the suspension was filtered over celite and eluted with MeOH. The filtrate was adsorbed on silica gel and purified by column chromatography (silica; solvent depending on the molecule (mixtures cyclohexane:EtOAc or CH₂Cl₂:MeOH). The product was obtained as a solid and dried under reduced pressure. Yield: 40-63%

In a subsequent step the Boc-protected piperazine was dissolved in DCM. Followed by the addition of TFA (50 eq.) at 0° C. After the addition was complete, the reaction mixture was stirred for 30 min at room temperature. After removing all volatiles under reduced pressure, water was added, and the pH adjusted to 14. The aqueous phase was extracted with DCM. The combined organic layers were washed with water and dried over MgSO₄, filtered and all volatiles were removed under reduced pressure. The product was obtained as a solid. Yield: 86%

Literature for Compound Synthesis

[1] A. Tröster, S. Heinzlmeir, B. Berger, S. L. Gande, K. Saxena, S. Sreeramulu, V. Linhard, A. H. Nasiri, M. Bolte, S. Müller, et al., *ChemMedChem* 2018, 3, 1629-1633.

[2] C. Afonso, N. Lourenco, A. Rosatella, *Molecules* 2006, 11, 81-102.

[3] M. List, H. Puchinger, H. Gabriel, U. Monkowius, C. Schwarzinger, *J. Org. Chem.* 2016, 81, 4066-4075.

[4] J. A. Seijas, M. P. Vazquez-Tato, M Montserrat Martinez, *Tetrahedron Lett* 2000, 41, 2215-2217.

[5] U. Kuefher-Muehl, S. W. Scheuplein, G. Pohl, W. Gaida, E. Lehr, J. Mierau, C. J. M. Meade. 1997.

[6] Q. Yang, M. Sheng, J. J. Henkelis, S. Tu, E. Wiensch, H. Zhang, Y. Zhang, C. Tucker, D. E. Ejeh, *Org. Process Res. Dev.* 2019, 23, 2210-2217.

Synthesis of 0.2 Grams Each of 4-methyl-3-((1-methyl-6-(pyrazin-2-yl)-1H-pyrazolo[3,4-d]pyrimidin-4-yl)amino)-N-(3-(trifluoromethyl)phenyl)benzamide (1, @1, AT158); 4-methyl-3-((1-methyl-6-(pyrimidin-5-yl)-1H-pyrazolo[3,4-d]pyrimidin-4-yl)amino)-N-(3-(trifluoromethyl)phenyl)benzamide (2, @3 AT156); N-(3-chlorophenyl)-4-methyl-3-((1-methyl-6-(pyridin-3-yl)-1H-pyrazolo[3,4-d]pyrimidin-4-yl)amino)benzamide (3, AT144); 4-methyl-3-(2-methyl-6-(pyrazin-2-yl)-2H-pyrazolo[3,4-d]pyrimidin-4-yl)amino)-N-(3-(trifluoromethyl)phenyl)benzamide (4, @2, ATJA17); N-(3-chlorophenyl)-4-methyl-3-((2-methyl-6-(pyridin-3-yl)-2H-pyrazolo[3,4-d]pyrimidin-4-yl)amino)benzamide (5, ATJA07)

Of each target is required: 0.2 Grams, 95% or greater purity, no single impurity >2.0% by HPLC, and acceptable combustion analysis.

1, @1

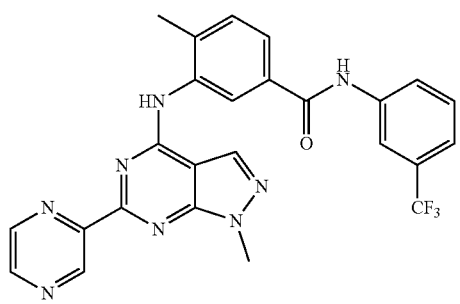

AT158

2, @3

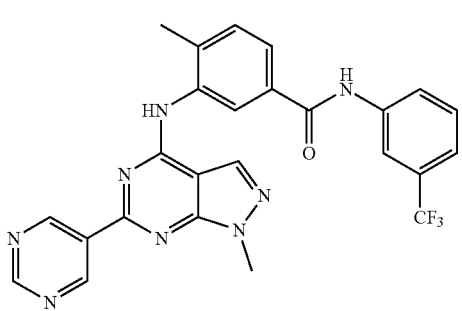

AT156

3

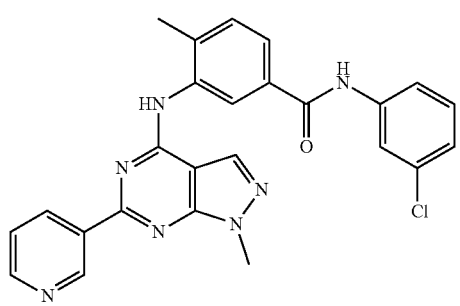

AT144

4, @2

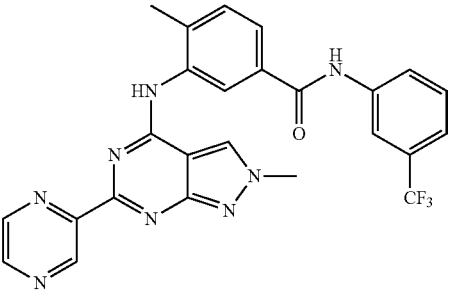

ATJA17

5

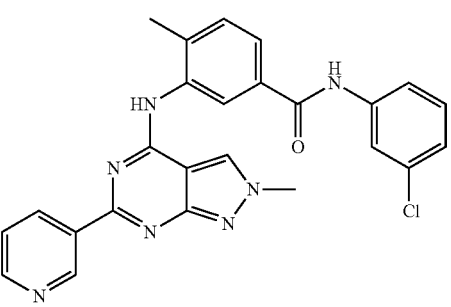

ATJA07

Using the sequence shown in schemes 1-5 (see FIGS. 13-14) and the relevant experimental procedures outlined in WO 2007/062805 A1, PCT 2009097446, PCT 2010118367, and WO 2019/024908 A1, 0.2 grams will be synthesized of each of 4-methyl-3-((1-methyl-6-(pyrazin-2-yl)-1H-pyrazolo[3,4-d]pyrimidin-4-yl)amino)-N-(3-(trifluoromethyl)phenyl)benzamide (1, AT158), 4-methyl-3-((1-methyl-6-(pyrimidin-5-yl)-1H-pyrazolo[3,4-d]pyrimidin-4-yl)amino)-N-(3-(trifluoromethyl)phenyl)benzamide (2, AT156); N-(3-chlorophenyl)-4-methyl-3-((1-methyl-6-(pyridin-3-yl)-1H-pyrazolo[3,4-d]pyrimidin-4-yl)amino)benzamide (3, AT144); 4-methyl-3-((2-methyl-6-(pyrazin-2-yl)-2H-pyrazolo[3,4-d]pyrimidin-4-yl)amino)-N-(3-(trifluoromethyl)phenyl)benzamide (4, ATJA7); N-(3-chlorophenyl)-4-methyl-3-((2-methyl-6-(pyridin-3-yl)-2H-pyrazolo[3,4-d]pyrimidin-4-yl)amino)benzamide (5, ATJA07).

Synthesis of 0.2 Grams Each of 3-((4-(1H-imidazol-1-yl)-6-morpholino-1,3,5-triazin-2-yl)amino)-4-methyl-N-(3-(trifluoromethyl)phenyl)benzamide (1, @10, ATHA01); (S)-N-(3-chlorophenyl)-3-((4-(3-hydroxypyrrolidin-1-yl)-6-(1H-imidazol-1-yl)-1,3,5-triazin-2-yl)amino)-4-methylbenzamide (2, @13, ATSW15); (S)-3-((4-(3-hydroxypyrrolidin-1-yl)-6-(1H-imidazol-1-yl)-1,3,5-triazin-2-yl)amino)-4-methyl-N-(3-(trifluoromethyl)phenyl)benzamide (3, ATSW16)

Of each target is required: 0.2 Grams, 95% or greater purity, no single impurity >2.0% by HPLC, and acceptable combustion analysis.

1, @10

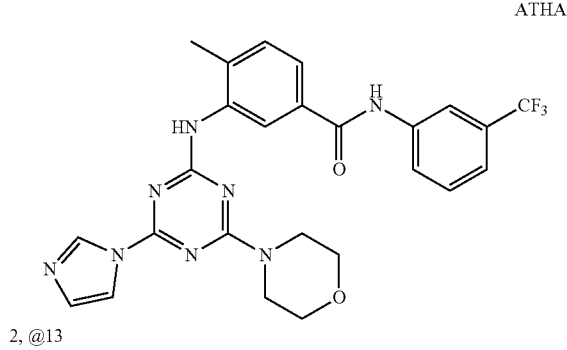

ATHA01

2, @13

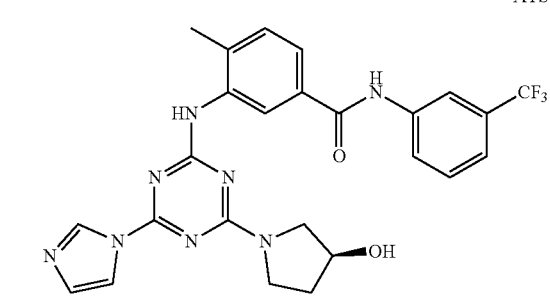

ATSW15

3

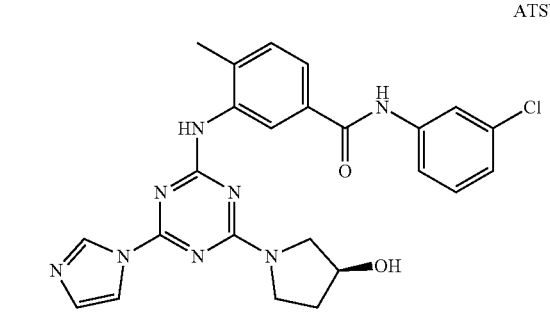

ATSW16

Using the sequence shown in Schemes 1 and 2 (see FIG. 15) and the analogous experimental procedures outlined in Medicinal Chemistry Letters, 2013, 4, 1108-13 and the Supplementary Information supplied therein, 0.2 grams will be synthesized of each of H-imidazol-1-yl)-6-morpholino-1,3,5-triazin-2-yl)amino)-4-methyl-N-(3-1-N-(3-(trifluoromethyl)phenyl)benzamide (1, ATHA01); (S)-N-(3-chlorophenyl)-3-((4-(3-hydroxypyrrolidin-1-yl)-6-(1H-imidazol-1-yl)-1,3,5-triazin-2-yl)amino)-4-methylbenzamide (2, ATSW15); (S)-3-((4-(3-hydroxypyrrolidin-1-yl)-6-(1H-imidazol-1-yl)-1,3,5-triazin-2-yl)amino)-4-methyl-N-(3-(trifluoromethyl)phenyl)benzamide (3, ATSW16) with 95% or greater purity, no single impurity >2.0% by HPLC, and acceptable combustion analysis.

It is recognized that exact conditions for the proposed serial displacement reactions on cyanuric chloride are not available in the literature. However, such reactions are very well-precedented in the literature. The first two proposed displacements proceed under mild conditions. The order of the first two displacements could readily be reversed for convenience and greater convergence. Given the relatively small scale of the final displacement the final reaction could conveniently be accomplished neat with amine as solvent/base.

A synthesis of phenylbenzamide precursors is shown in FIG. 16. A general synthesis scheme for additional pyrazolopyrimidine derivatives is shown in FIG. 17.

N-(3-Cyanophenyl)-4-methyl-3-((1-methyl-6-(pyridin-3-yl)-1H-pyrazolo[3,4-d]pyrimidin-4-yl)amino-benzamide (NVP-CN; 9)

3-Bromo-N-(3-cyanophenyl)-4-methylbenzamide 33

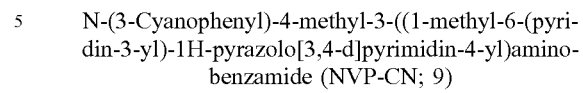

15

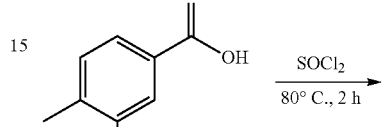

16

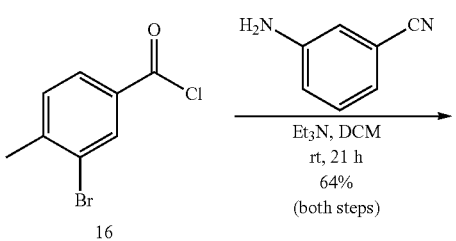

33

5 (1.00 g, 4.65 mmol) was placed in a baked Schlenk flask, suspended in SOCl2 (5.7 mL, 79 mmol) and heated to 80° C. for 2 h. The resulting solution was cooled to room temperature. Excess SOCl2 was removed under reduced pressure, the resulting colorless solid was dried in an oil-pump vacuum for 30 min. The crude acyl chloride 16 was dissolved in dry CH2Cl2 (10 mL) and cooled to 0° C., followed by the addition of dry Et3N (1.3 mL, 9.3 mmol). A solution of 3-cyanoaniline (0.77 g, 6.5 mmol) in 10 mL dry CH2Cl2 was added dropwise. After warming to room temperature, the reaction mixture was stirred overnight. Water was added, the organic layer was separated and washed with water, the combined aqueous layers were extracted with CH2Cl2 and once with EtOAc. The combined organic layers were washed with water, dried over MgSO4, filtered and all volatiles were removed under reduced pressure. The crude product was recrystallized from MeOH. The product could be obtained as a beige solid. Yield: 935 mg (2.97 mmol, 64%).

N-(3-Cyanophenyl)-4-methyl-3-((1-methyl-6-(pyridin-3-yl)-1H-pyrazolo[3,4-d]pyrimidin-4-yl)amino)-benzamide (NVP-CN, 9)

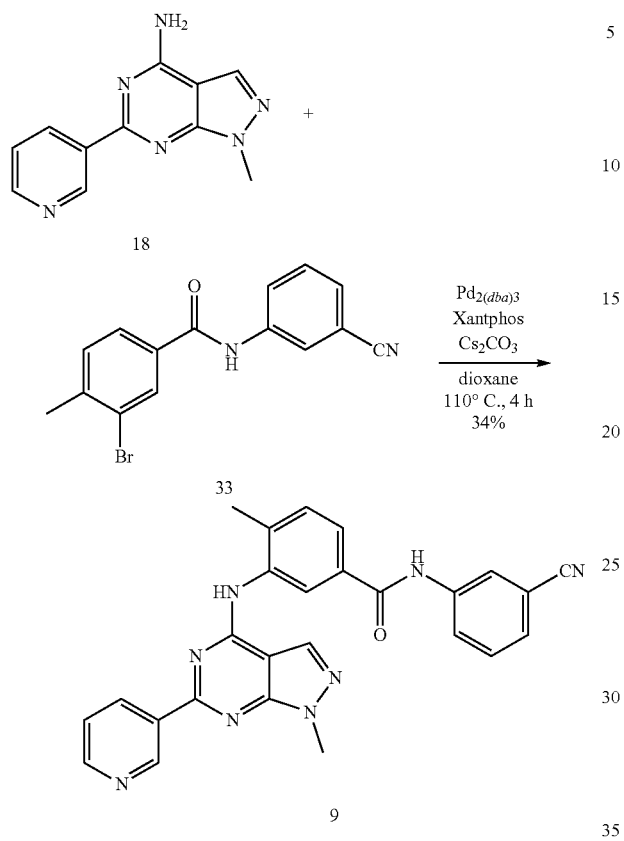

18 (93 mg, 0.41 mmol), 33 (130 mg, 0.411 mmol) and Cs₂CO₃ (538 mg, 1.65 mmol) were placed in a Schlenk tube. Dry dioxane (5 mL) was added and the mixture was degassed with argon for 5 min. Pd₂(dba)₃ (34 mg, 37 µmol) and Xantphos (36 mg, 62 µmol) were added and the mixture was heated to reflux for 4 h. After cooling to room temperature, the mixture was stirred overnight. The suspension was filtered over celite and eluted with MeOH. The filtrate was adsorbed on silica gel and purified by column chromatography (silica gel, cyclohexane:EtOAc=1:1→EtOAc). The obtained colorless solid was dried at 60 for 4 h under reduced pressure. Yield: 65 mg (0.14 mmol, 34%).

Ethyl 4-(4-methyl-3-((1-methyl-6-(pyridin-3-yl)-1H-pyrazolo[3,4-d]pyrimidin-4yl)amino)benzamido)benzoate 10

Ethyl 4-(3-bromo-4-methylbenzamido)benzoate 34

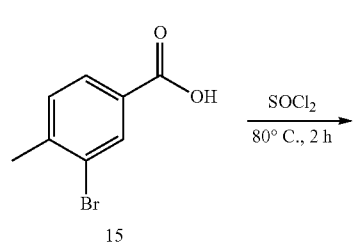

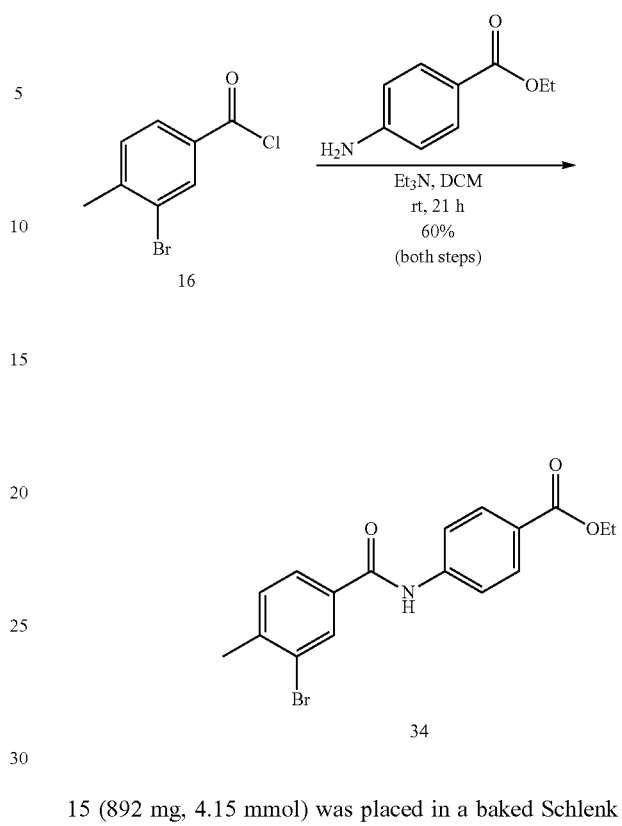

15 (892 mg, 4.15 mmol) was placed in a baked Schlenk flask, suspended in SOCl₂ (5.1 mL, 70 mmol) and heated to 80° C. for 2 h. The resulting solution was cooled to room temperature. Excess SOCl₂ was removed under reduced pressure, the resulting colorless solid was dried in an oil-pump vacuum for 30 min. The crude acyl chloride 16 was dissolved in dry CH₂Cl₂ (10 mL) and cooled to 0° C., followed by the addition of dry Et3N (1.15 mL, 8.3 mmol). A solution of Ethyl 4-aminobenzoate (0.96 g, 5.8 mmol) in 8 mL dry CH₂Cl₂ was added dropwise. After warming to room temperature, the reaction mixture was stirred overnight. After adding water, the layers were separated. The aqueous layer was extracted with CH₂Cl₂. The combined organic layers were washed with water, dried over MgSO₄, filtered and all volatiles were removed under reduced pressure. The product could be obtained as a colorless solid. Yield: 898 mg (2.48 mmol, 60%).

Ethyl 4-(4-methyl-3-((1-methyl-6-(pyridin-3-yl)-1H-pyrazolo[3,4-d]pyrimidin-4yl)amino)benzamido)-benzoate 10

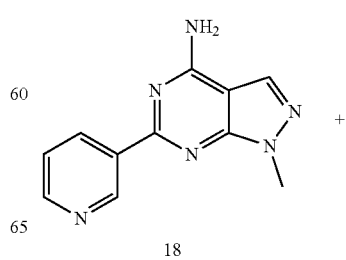

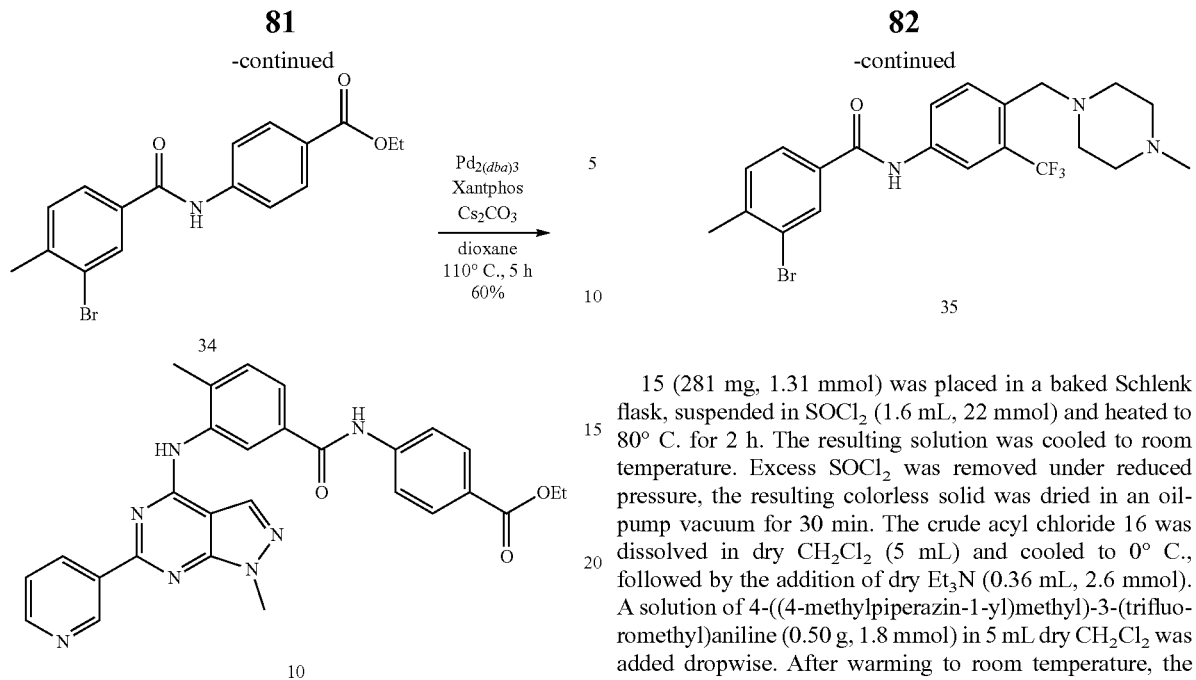

18 (95 mg, 0.42 mmol), 34 (152 mg, 0.420 mmol) and Cs₂CO₃ (547 mg, 1.68 mmol) were placed in a Schlenk tube. Dry dioxane (7 mL) was added and the mixture was degassed with argon for 5 mm. Pd₂(dba)₃ (35 mg, 38 μmol) and Xantphos (37 mg, 63 μmol) were added and the mixture was heated to reflux for 5 h, After cooling to room temperature, the mixture was stirred overnight. The suspension was filtered over celite and eluted with EtOH, The filtrate was adsorbed on silica gel and purified by column chromatography (silica gel, EtOAc). The obtained light-yellow solid was dried for 4 h under reduced pressure. Yield: 128 mg (0.252 mmol, 60%).

4-Methyl-3-((1-methyl-6-(pyridin-3-yl)-1H-pyrazolo [3,4-d]pyrimidin-4-yl)amino-N-(4-((4-methylpiperazin-1-yl)methyl)-3-(trifluoromethyl)phenyl)benzamide 11

3-Bromo-4-methyl-N-(4-((4-methylpiperazin-1-yl)methyl)-3-(trifluoromethyl)phenyl)benzamide 35

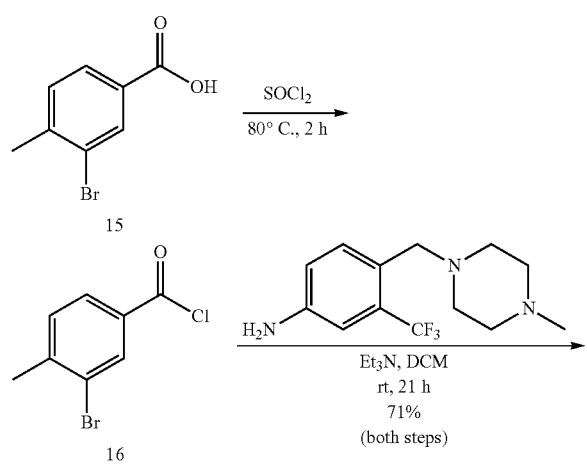

15 (281 mg, 1.31 mmol) was placed in a baked Schlenk flask, suspended in SOCl₂ (1.6 mL, 22 mmol) and heated to 80° C. for 2 h. The resulting solution was cooled to room temperature. Excess SOCl₂ was removed under reduced pressure, the resulting colorless solid was dried in an oil-pump vacuum for 30 min. The crude acyl chloride 16 was dissolved in dry CH₂Cl₂ (5 mL) and cooled to 0° C., followed by the addition of dry Et₃N (0.36 mL, 2.6 mmol). A solution of 4-((4-methylpiperazin-1-yl)methyl)-3-(trifluoromethyl)aniline (0.50 g, 1.8 mmol) in 5 mL dry CH₂Cl₂ was added dropwise. After warming to room temperature, the reaction mixture was stirred overnight. After adding water, the layers were separated. The aqueous layer was extracted with CH₂Cl₂. The combined organic layers were washed with water, dried over MgSO4, filtered and all volatiles were removed under reduced pressure. The crude product was adsorbed on silica gel and purified by column chromatography (silica gel, CH₂Cl₂:MeOH=9:1). The obtained colorless solid was dried for 5 h under reduced pressure. Yield: 436 mg (0.919 mmol. 71%).

4-Methyl-3-((1-methyl-6-(pyridin-3-yl)-1H-pyrazolo [3,4-d]pyrimidin-4-yl)amino)-N-(4-((4-methyl-piperazin-1-yl)methyl)-3-(trifluoromethyl)phenyl)benzamide 11

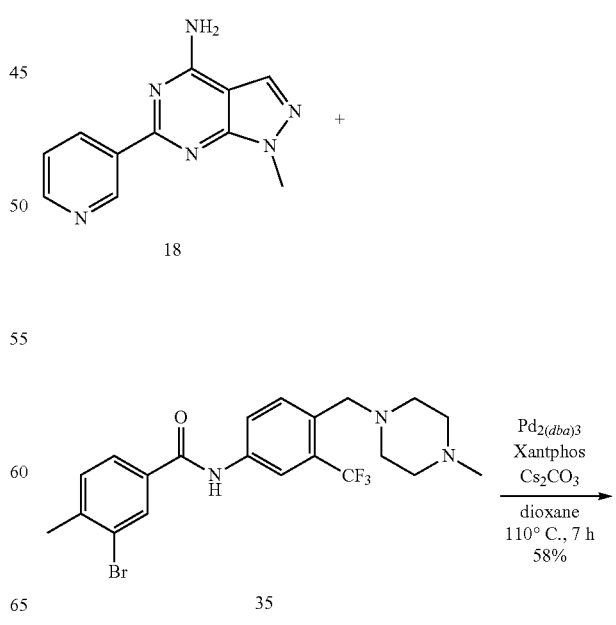

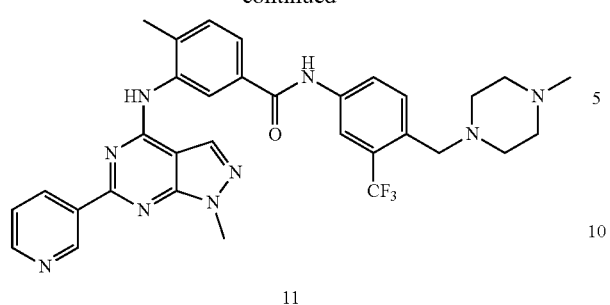

11

18 (100 mg, 0.442 mmol), 35 (208 mg, 0.442 mmol) and Cs$_2$CO$_3$ (576 mg, 1.77 mmol) were placed in a Schlenk tube. Dry dioxane (7 mL) was added and the mixture was degassed with argon for 5 min. Pd$_2$(dba)$_3$ (36 mg, 39 μmol) and Xantphos (38 mg, 66 μmol) were added and the mixture was heated to reflux for 7 h. After cooling to room temperature, the suspension was filtered over celite and eluted with MeOH. The filtrate was adsorbed on silica gel and purified by column chromatography (silica gel, CH$_2$Cl$_2$:MeOH=9:1). The obtained light-orange solid was dried for 6 h under reduced pressure. Yield: 157 mg (0.255 mmol, 58%).

4-Methyl-N-(3-(4-methyl-1H-imidazol-1-yl)-5-(trifluoromethyl)phenyl)-3-((1-methyl-6-(pyridin-3-yl)-1H-pyrazolo[3,4-d]pyrimidin-4-yl)amino)benzamide
12

3-Bromo-4-methyl-N-(3-(4-methyl-1H-imidazol-1-yl)-5-(trifluoromethyl)phenyl)benzamide 36

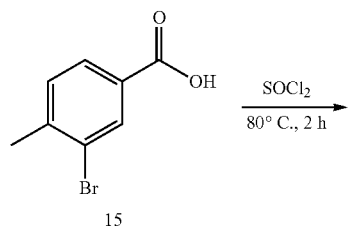

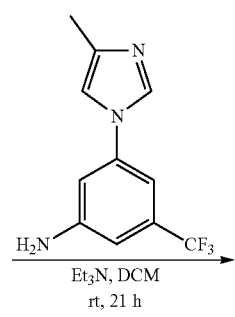

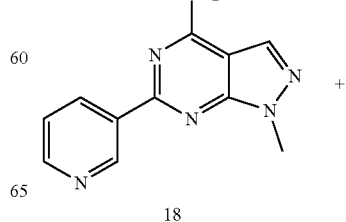

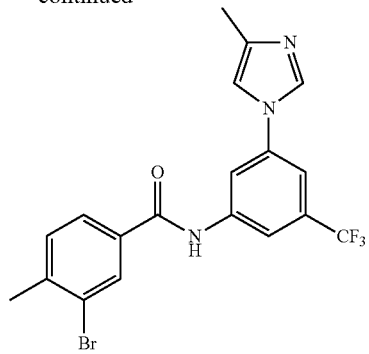

36

15 (318 mg, 1.48 mmol) was placed in a baked Schlenk flask, suspended in SOCl$_2$ (1.8 mL, 25 mmol) and heated to 80° C. for 2 h. The resulting solution was cooled to room temperature. Excess SOCl$_2$ was removed under reduced pressure, the resulting colorless solid was dried in an oil-pump vacuum for 30 min. 3-(4-Methyl-1H-imidazol-1-yl)-5-(trifluoromethyl)aniline (0.50 g, 1.8 mmol) was dissolved in 5 mL dry CH$_2$Cl$_2$ and cooled to 0° C. Dry Et3N (0.41 mL, 3.0 mmol) was added dropwise to the mixture, followed by the dropwise addition of a solution of crude acyl chloride 16 in 5 mL dry CH$_2$Cl$_2$. After warming to room temperature, the reaction mixture was stirred overnight. After adding water, the layers were separated. The aqueous layer was extracted with CH$_2$Cl$_2$. The combined organic layers were washed with water, dried over MgSO$_4$, filtered and all volatiles were removed under reduced pressure. The crude product was adsorbed on silica gel and purified by column chromatography (silica gel, cyclohexane:EtOAc=1:1→EtOAc). The product could be obtained as a colorless solid. Yield: 253 mg (0.580 mmol, 39%).

4-Methyl-N-(3-(4-methyl-1H-imidazol-1-yl)-5-(trifluoromethyl)phenyl)-3-((1-methyl-6-(pyridin-3-yl)-1H-pyrazolo[3,4-d]pyrimidin-4-yl)amino)benzamide
12

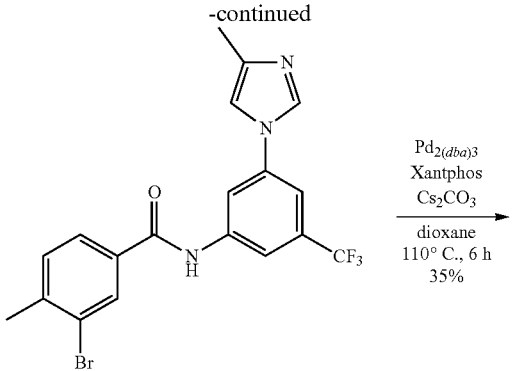

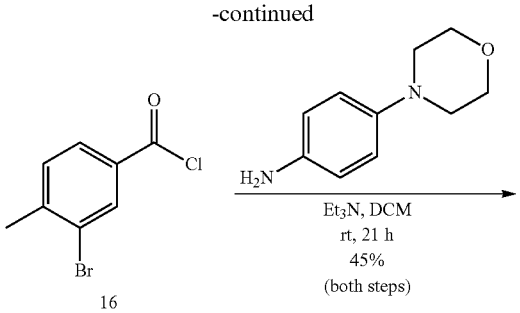

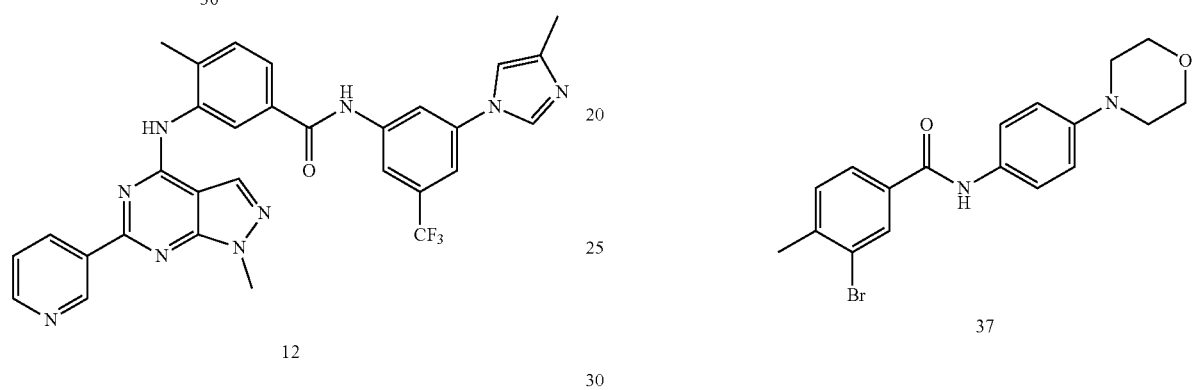

18 (48.5 mg, 0.215 mmol), 36 (94.0 mg, 0.215 mmol) and Cs$_2$CO$_3$ (280 mg, 0.859 mmol) were placed in a Schlenk tube. Dry dioxane (5 mL) was added and the mixture was degassed with argon for 5 min. Pd$_2$(dba)$_3$ (18 mg, 19 µmol) and Xantphos (19 mg, 32 µmol) were added and the mixture was heated to reflux for 6 h. After cooling to room temperature, the suspension was filtered over celite and eluted with MeOH. The filtrate was adsorbed on silica gel and purified by column chromatography (silica gel, CH$_2$Cl$_2$:MeOH=95: 5→92:8). The obtained solid was dried for 6 h under reduced pressure. For further purification, the solid was suspended in 1.5 mL MeOH and sonicated for 3 minutes. The suspension was centrifuged, and the supernatant was discarded. This procedure was repeated once. The obtained colorless solid was dried for 6 h under reduced pressure, Yield: 44 mg (75 nmol, 35%).

4-Methyl-3-((1-methyl-6-(pyridin-3-yl)-1H-pyrazolo [3,4-d]pyrimidin-4-yl)amino)-N-(4-morpholinophenyl))benzamide 13

3-Bromo-4-methyl-N-(4-morpholinophenyl)benzamide 37

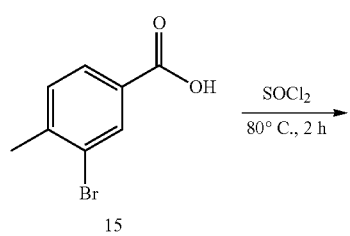

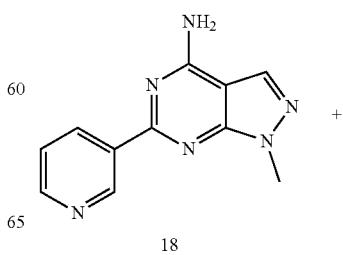

15 (1.07 g, 4.95 mmol) was placed in a baked Schlenk flask, suspended in SOCl$_2$ (6.1 mL, 84 mmol) and heated to 80° C. for 2 h. The resulting solution was cooled to room temperature. Excess SOCl$_2$ was removed under reduced pressure, the resulting colorless solid was dried in an oil-pump vacuum for 30 min. The crude acyl chloride 16 was dissolved in dry CH$_2$Cl$_2$ (10 mL) and cooled to 0° C., followed by the addition of dry Et$_3$N (1.37 mL, 9.90 mmol). A solution of 4-morpholinoaniline (1.24 g, 6.93 mmol) in 18 mL dry CH$_2$Cl$_2$ was added dropwise, After warming to room temperature, the reaction mixture was stirred overnight. The precipitated solid was collected by filtration, washed with water and dried under reduced pressure. The product could be obtained as a beige solid. Yield: 830 mg (2.21 mmol, 45%).

4-Methyl-3-((1-methyl-6-(pyridin-3-yl)-1H-pyrazolo [3,4-d]pyrimidin-4-yl)amino-N-(4-morpholino-phenyl)benzamide 13

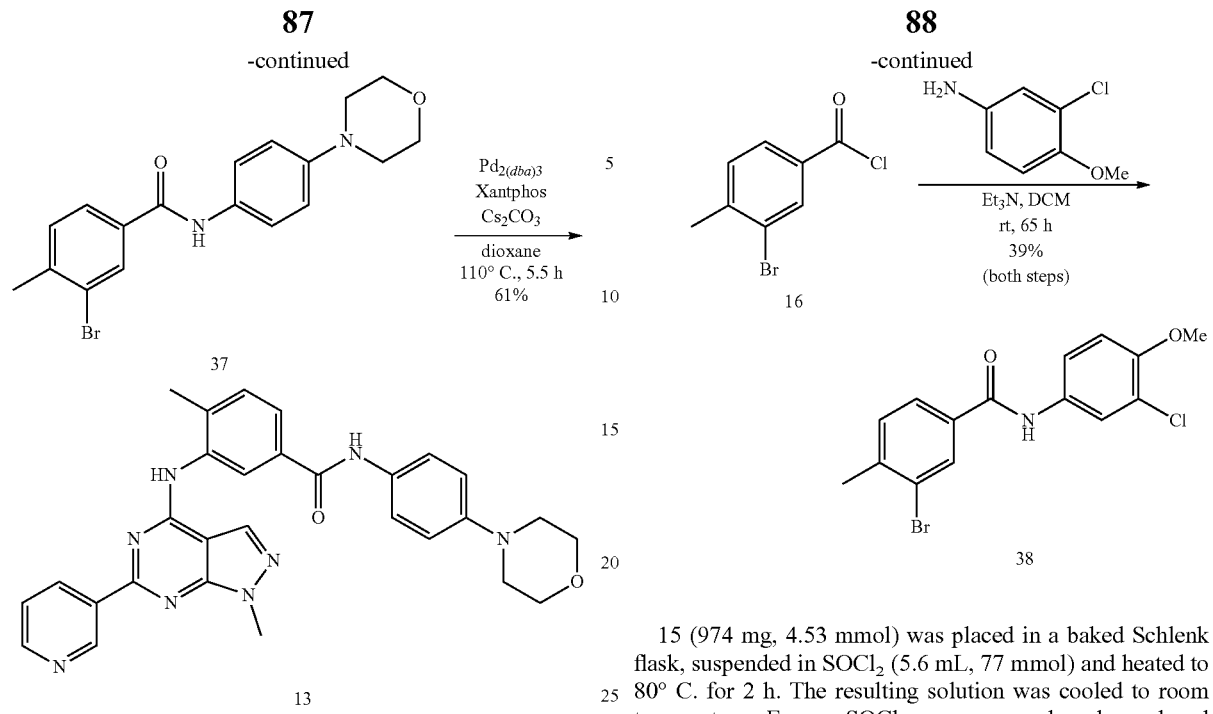

18 (110 mg, 0.486 mmol), 37 (182 mg, 0.486 mmol) and Cs$_2$CO$_3$ (633 mg, 1.94 mmol) were placed in a Schlenk tube. Dry dioxane (7 mL) was added and the mixture was degassed with argon for 5 min. Pd$_2$(dba)$_3$ (40 mg, 44 µmol) and Xantphos (42 mg, 73 µmol) were added and the mixture was heated to reflux for 5.5 h. After cooling to room temperature, the reaction mixture was stirred overnight. Due to incomplete conversion additional Pd$_2$(dba)$_3$ (20 mg, 22 µmol) and Xantphos (21 mg, 37 µmol) were added and the mixture was heated to reflux for 5 h. After cooling to room temperature, the suspension was filtered over celite and eluted with MeOH. The filtrate was adsorbed on silica gel and purified by column chromatography (silica gel, CH$_2$Cl$_2$: MeOH=99:1→95:5). For further purification, the crude product was suspended in 2 mL MeOH and sonicated for 5 min. The suspension was centrifuged, and the supernatant was discarded. The obtained colorless solid was dried under reduced pressure. Yield: 154 mg (296 µmol, 61%).

N-(3-Chloro-4-methoxyphenyl)-4-methyl-3-((1-methyl-6-(pyridin-3-yl)-1-H-pyrazolo[3,4-d]pyrimidin-4-yl)amino)benzamide 14

3-Bromo-N-(3-chloro-4-methoxyphenyl)-4-methyl-benzamide 38

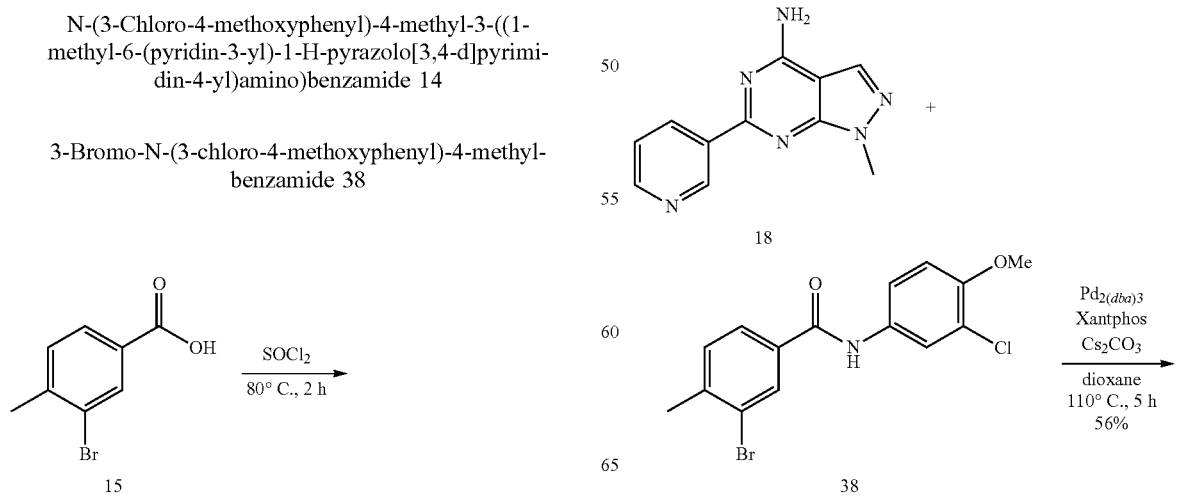

15 (974 mg, 4.53 mmol) was placed in a baked Schlenk flask, suspended in SOCl$_2$ (5.6 mL, 77 mmol) and heated to 80° C. for 2 h. The resulting solution was cooled to room temperature. Excess SOCl$_2$ was removed under reduced pressure, the resulting colorless solid was dried in an oil-pump vacuum for 30 min. The crude acyl chloride 16 was dissolved in dry CH$_2$Cl$_2$ (10 mL) and cooled to 0° C., followed by the addition of dry Et$_3$N (1.26 mL, 9.06 mmol). A solution of 3-chloro-4-methoxyaniline (995 mg, 6.34 mmol) in 10 mL dry CH$_2$Cl$_2$ was added dropwise. After warming to room temperature, the reaction mixture was stirred the weekend. Water was added to the reaction mixture. Precipitated solid was collected by filtration, washed with water and dried under reduced pressure. The crude product was recrystallized from MeOH. The product could be obtained as a colorless solid. Yield: 631 mg (1.78 mmol, 39%).

N-(3-Chloro-4-methoxyphenyl)-4-methyl-3-((1-methyl-6-(pyridin-3-yl)-1H-pyrazolo[3,4-d]pyrimidin-4-yl)amino)benzamide 14

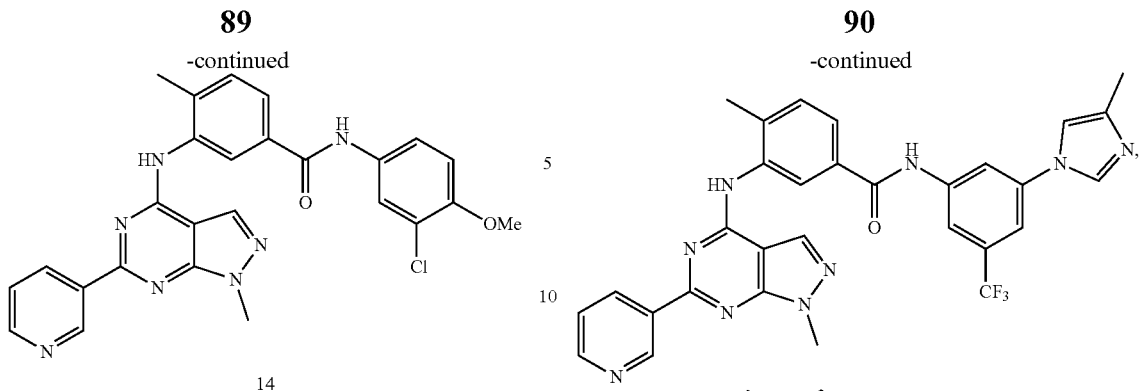

14

18 (94 mg, 0.42 mmol), 38 (148 mg, 0.417 mmol) and Cs$_2$CO$_3$ (544 mg, 1.67 mmol) were placed in a Schlenk tube. Dry dioxane (5 mL) was added and the mixture was degassed with argon for 5 min, Pd$_2$(dba)$_3$ (34 mg, 38 µmol) and Xantphos (36 mg, 63 µmol) were added and the mixture was heated to reflux for 5 h. After cooling to room temperature, the reaction mixture was stirred over the weekend. The suspension was filtered over celite and eluted with MeOH. The filtrate was adsorbed on silica gel and purified by column chromatography (silica gel, cyclohexane:EtOAc=1: 1→EtOAc), The product was obtained as a colorless solid. Yield: 117 mg (233 µmol, 56%).

In view of the many possible embodiments to which the principles of our disclosure may be applied, it should be recognized that illustrated embodiments are only examples of the invention and should not be considered a limitation on the scope of the invention. Rather, the scope of the invention is defined by the following claims. We therefore claim as our invention all that comes within the scope and spirit of these claims.

What is claimed is:

1. A method of treating colorectal cancer in a subject, comprising administering to the subject a therapeutically effective amount of a compound selected from

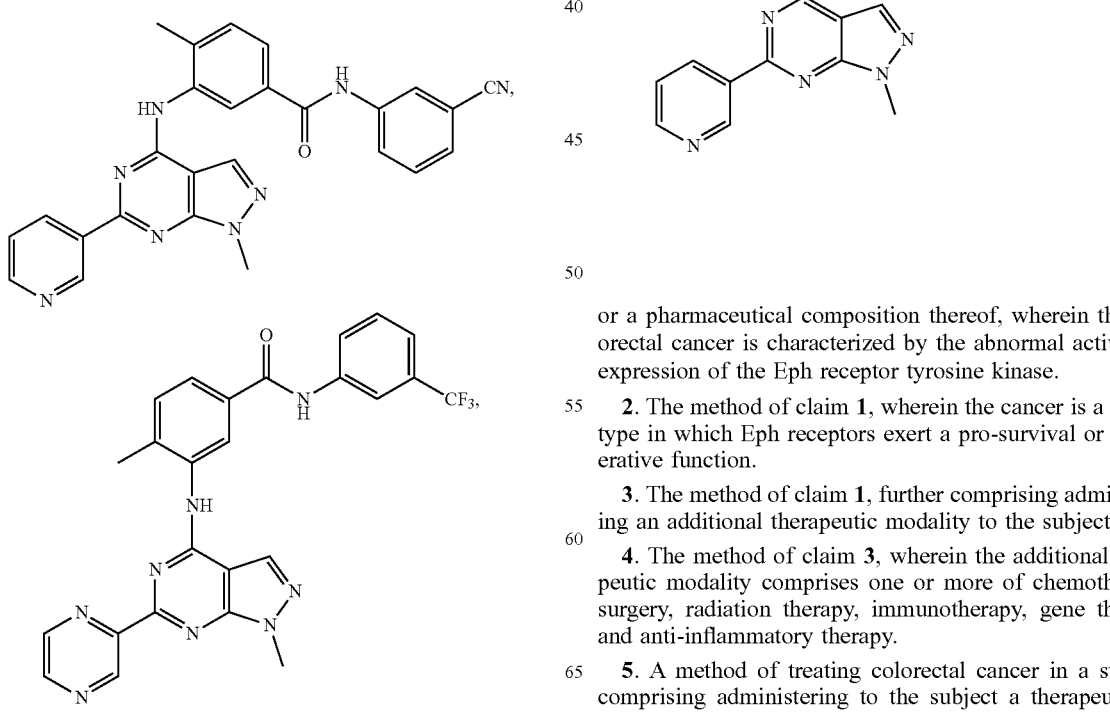

or a pharmaceutical composition thereof, wherein the colorectal cancer is characterized by the abnormal activity or expression of the Eph receptor tyrosine kinase.

2. The method of claim 1, wherein the cancer is a cancer type in which Eph receptors exert a pro-survival or proliferative function.

3. The method of claim 1, further comprising administering an additional therapeutic modality to the subject.

4. The method of claim 3, wherein the additional therapeutic modality comprises one or more of chemotherapy, surgery, radiation therapy, immunotherapy, gene therapy, and anti-inflammatory therapy.

5. A method of treating colorectal cancer in a subject, comprising administering to the subject a therapeutically effective amount of a compound selected from

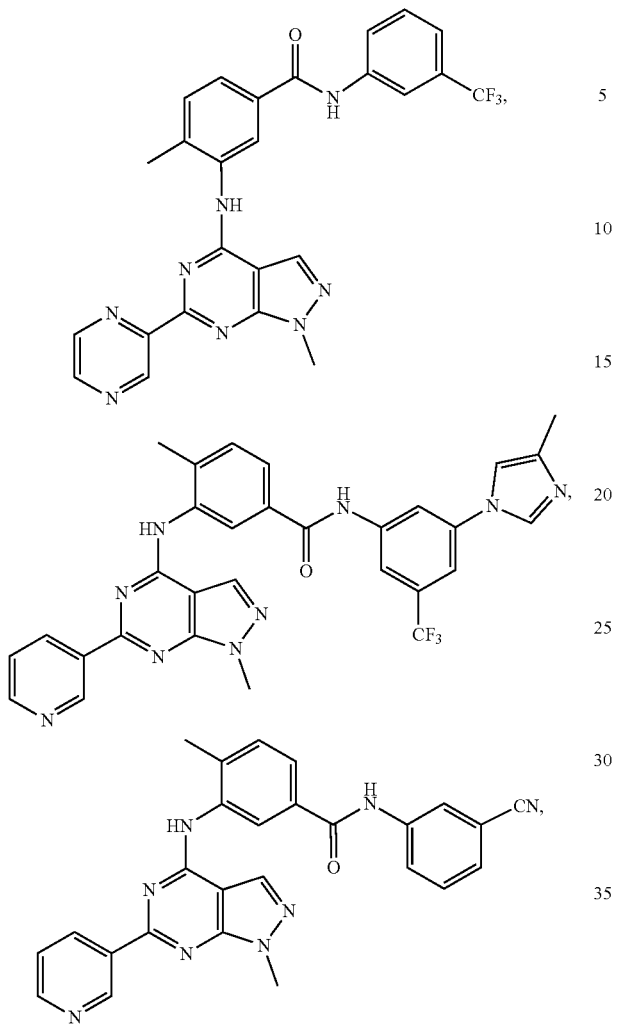
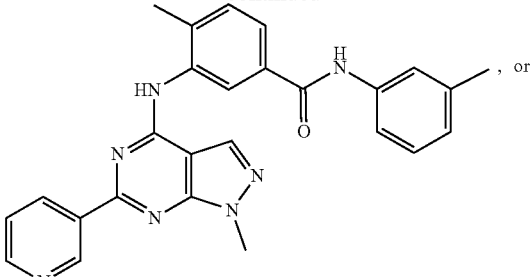
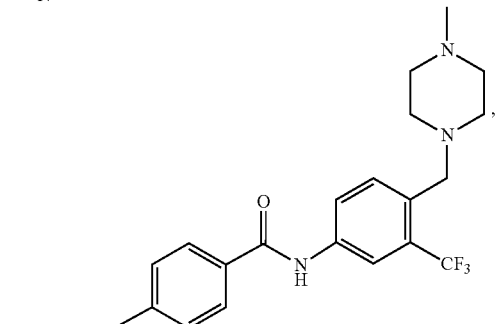
or a pharmaceutical composition comprising the compound, thereby treating the colorectal cancer.
* * * * *